Figure 1:
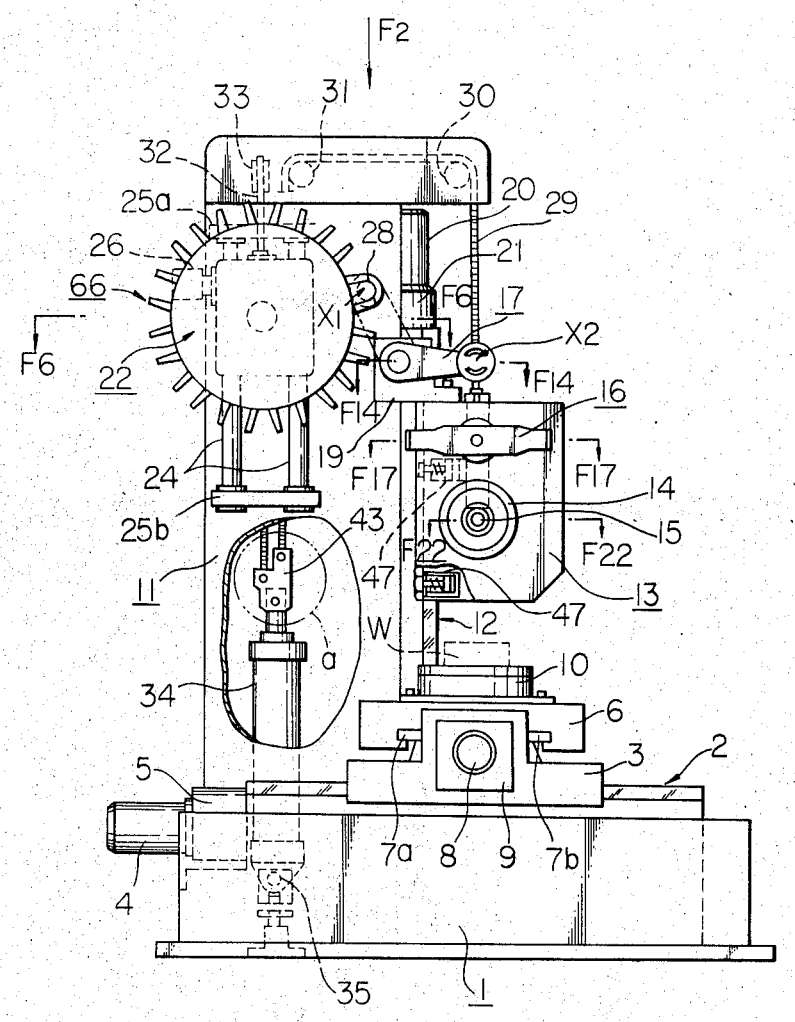

United States Patent [19]
Tomita et al.

[11] 3,775,837

[45] Dec. 4, 1973

[54] NUMERICALLY CONTROLLED MACHINE TOOL WITH AUTOMATIC TOOL CHANGING APPARATUS

[75] Inventors: Tamaki Tomita, Okazaki-shi; Takesi Kusakabe, Kariya-shi; Mikishi Kurimoto, Nagoya-shi; Tsuneo Iwami; Keniti Iwami, both of Kariya-shi; Kenzi Nomura; Yoshikazu Sano, both of Aichi-ken, all of Japan

[73] Assignee: Toyoda Machine Works, Limited, Aichi-ken, Japan

[22] Filed: Sept. 29, 1969

[21] Appl. No.: 861,666

[30] Foreign Application Priority Data
Sept. 30, 1968 Japan................................ 43/71024

[52] U.S. Cl.................................. 29/568, 318/593
[51] Int. Cl............................................ B23q 3/157
[58] Field of Search..................... 29/568, 26, 33 D; 318/592, 593, 594; 90/11

[56] References Cited
UNITED STATES PATENTS

| | | | |
|---|---|---|---|
| 3,277,569 | 10/1966 | Veehoeven | 29/568 |
| 3,451,125 | 6/1969 | Lehmkuhl | 29/568 |
| 3,516,149 | 6/1970 | Mickas | 29/568 |
| 3,358,360 | 12/1967 | Zankl et al. | 29/568 |
| 3,372,568 | 3/1968 | Lemelson | 29/33 P |
| 3,449,822 | 6/1969 | Launann et al. | 29/568 |
| 3,580,133 | 5/1971 | Berthicz | 90/11 R |
| 3,125,796 | 3/1964 | Brainard | 29/26 |
| 3,209,221 | 9/1965 | Puglsey et al. | 318/593 X |
| 3,276,116 | 10/1966 | Stark | 29/568 |
| 3,300,856 | 1/1967 | Daugherty | 29/568 |
| 3,323,030 | 5/1967 | Inaba et al. | 318/593 |
| 3,355,798 | 12/1967 | Drechsler | 29/568 |
| 3,458,924 | 8/1969 | Oslebo et al. | 29/568 |
| 3,492,717 | 2/1970 | Seidel et al. | 29/568 |
| 3,530,570 | 9/1970 | Shotter | 29/568 |

FOREIGN PATENTS OR APPLICATIONS

| | | | |
|---|---|---|---|
| 1,569,729 | 6/1969 | France | 29/568 |

*Primary Examiner*—Andrew R. Juhasz
*Assistant Examiner*—Z. R. Bilinsky
*Attorney*—Robert E. Burns and Emmanuel J. Lobato

[57] ABSTRACT

Numerically controlled machine tool with automatic tool changing apparatus is capable of carrying diverse tools in an interrelated relationship. The tool changing apparatus comprises a tool magazine and carrying means for both taking a new tool from a predetermined first position of the tool magazine to a predetermined second waiting position thereof after normal turning of the tool magazine by two angular pitch and for carrying a previously used tool positioned at the second waiting position to the first position, and a tool transfer arm for simultaneously removing the previously used tool from the spindle and removing the new tool from the carrying means at the second position and next transferring the new tool to the spindle. The previously used tool is transferred from the tool transfer arm to the carrying means and then to the magazine at the first position after an inverse turning of the tool magazine by one angular pitch.

30 Claims, 41 Drawing Figures

United States Patent
Tomita et al.
[11] 3,775,837
[45] Dec. 4, 1973
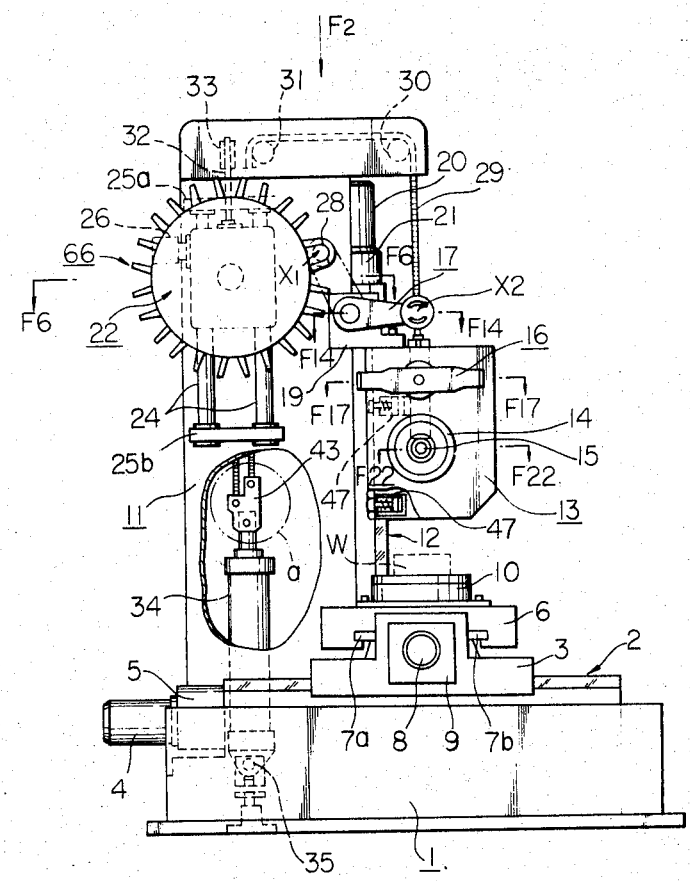

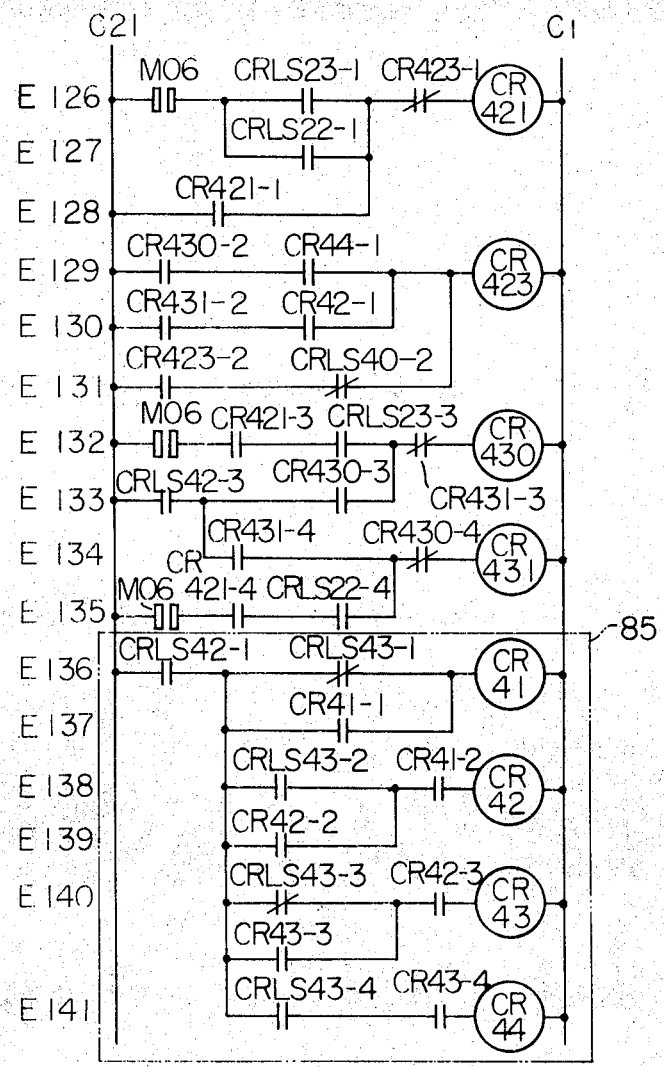
Fig. 38
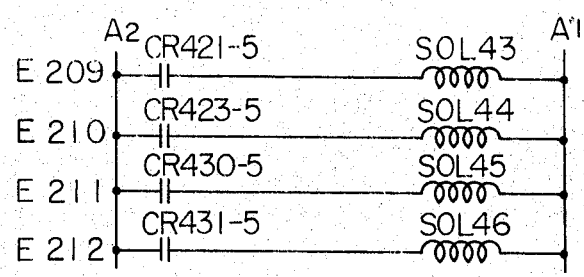

Fig. 40
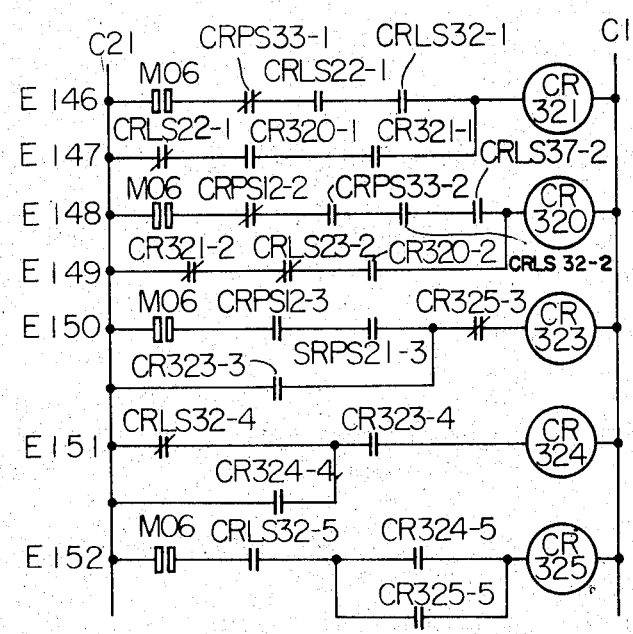
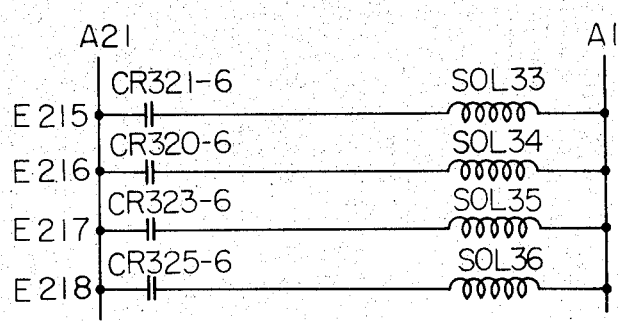

NUMERICALLY CONTROLLED MACHINE TOOL WITH AUTOMATIC TOOL CHANGING APPARATUS

The present invention relates generally to a numerically controlled machine tool with an automatic tool changing apparatus and more particularly to a numerically controlled machine tool with an automatic tool changing apparatus provided with a plurality of different types and sizes of tools which may automatically be mounted on a spindle in the sequence of their use in accordance with a predetermined program so as to carry out their machining operations on a workpiece.

In the conventional machine tool provided with an interchange means of tools, the spindle head is, in most cases, slidable so that the spindle head can be displaced to a suitable position for performing a machining operation according to a given command signal. Because of this constructional feature, when the interchange means of tools is mounted on a machine frame, the positional relationship between the interchange means of tool and a center of the spindle changes due to the above-mentioned displacement of the spindle head and it becomes impossible, at that machining position, to interchange a used tool with a new tool for the subsequent machining operation just after completion of the previous operation. To interchange the tools, that is, the spindle head has to return to the tool interchanging position. Consequently, the time required for the interchanging tends to be rather lengthy resulting in lowering of the operational efficiency. To eliminate the above-mentioned short comings, the following attempt was proposed. The positional relationship between the spindle head and the tool interchange means was maintained constant by mounting the tool interchange means upon the spindle head for shortening the time required for the tool interchange operation. However, in case of this attempt, since the tool interchange means having a comparatively large weight is mounted on the spindle head, breakage of the balance of the center of gravity of the spindle head results in that turning moment with respect to a supporting point of the sliding surface is applied to the spindle head and the center of the spindle is displaced leading to degrading in the machining accuracy.

In an automatic tool interchange machine wherein tools supported by a tool magazine are transferred to the spindle and the used tools are carried back to the tool magazine in the sequence of their use, the used tools carried back to the tool magazine are mounted again at their corresponding positions at one pitch distance from their previous mounted positions respectively. Consequently, the starting position of the tool magazine is subject to change by one pitch at every turning thereof at every tool interchange operation. Further, if it is required to restart the machining operation from the starting condition of the workpiece, for example in case the tool used for the operation is broken during the machining operation, and it is therefore required to start the operation from the first operation, the following troublesome operation becomes necessary. Firstly, the angular position of the tool magazine is subjected to return to its starting condition while supporting positions of the non-used tools are displaced by one pitch so that the original condition with respect to the tool magazine together with the tools is restored. these operation provide the operator with additional work.

In the above-mentioned machine tool provided with the tool interchange means, a tool transfer arm for interchnaging a tool mounted in the spindle and a tool carried to a tool interchange position is applied. This tool transfer arm performs a clamping motion for supporting a tool, a tool taking-off motion together with an inverse turning motion, a carrying motion toward an axial direction of a supporting axis thereof and a restoring motion to its original position. The turning direction of the tool transfer aim in a clamping motion should be reversed so that in the above-mentioned restaring motion because of the characteristic of tool clamping devices secured to both ends of the arm. To carry out the above-mentioned turning motion, the tool transfer arm includes a driving mechanism comprising a reciprocating hydraulic actuator and a pinion-rack mechanism for changing the reciprocal motion of the hydraulic actuator to a turning motion of the tool transfer arm. To attain the above-mentioned motion, a hydraulic actuator of double cylinder type should be used. As the turning direction of the transfer arm in its tool clamping motion is opposite to that in its restoring motion, the angular phase of the tool transfer arm is advanced by 180° in its turning motion. Consequently the turning direction of the arm in its successive transfer motion must be opposite. In other words, by the above-mentioned two separate turning motions, the tool transfer arm is restored to its original or starting angular position. Therefore, the mechanism for turning the tool transfer arm and its motion are so complicated that it is difficult to save the cost of the machine tool and the manufacturing of the tool interchange mechanism becomes very complex. Further, the tool interchange mechanism utilizing the above-mentioned double cylinder becomes so large and complex. Therefore various troubles being connected with a certain limitation of the machine space, accuracy of the machining operation etc. can not be obviated.

The principal object of the present invention is to provide a numerically controlled machine tool wherein the time required for interchanging tools between the magazine and the spindle and the time required for setting the position of the workpiece are minimized thereby the machining operations on the workpiece can be carried out with high efficiency.

Another object is to provide a tool changing apparatus capable of interchanging tools at any position of a spindle head of the machine tool, with a tool magazine which accomodates a plurality of tools and is capable of synchronous displacement with the movement of the spindle head.

A further object is to provide a tool magazine containing a mechanism for a two-pitch advance movement with rightward rotation and an one-pitch recession movement with reverse rotation so that previously used tools transferred from the spindle head can be constantly stored or accomodated at their original storage positions.

Still further object of the present invention is to provide a tool magazine containing tool grip means capable of gripping tools and releasing its grip at the tool change position.

Yet another object of the present invention is to provide a tool gripping means containing a tool positioning mechanism for preventing dropping of the tool or setting the tool aside from the normal gripping position of the tool caused by the centrifugal force of the tool magazine together with the weight of the tools so that each tool can be correctly engaged with a spindle and a still further object is to provide an intermediate transfer mechanism disposed at an intervened space between the tool magazine and the tool spindle to restore the previously used tools in their proper storage positions.

Still another object is to provide means secured to the intermediate transfer mechanism, capable of rotating freely without interference with the tools held by the tool magazine and tool transfer means, respectively, when the intermediate transfer mechanism is turned to interchange the tools in an intervened space between the tool magazine and the tool transfer mechanism.

Another object of the present invention is to provide a tool transfer mechanism provided with a combined rotary and reciprocating actuator which is capable of carrying out three turning motions and a reciprocating movement of a transfer arm for performing the tool interchanging motion.

Further object of the present invention is to provide a spindle positioner, for angular setting of a spindle, capable of precisely indexing a key of the top-end portion of the spindle at a predetermined angular position by means of utilizing a simple mechanism instead of applying a complex and expensive spindle positioner for angular setting of a spindle, so that the tool interchanging operation is carried out rapidly and reliably and the cost of the apparatus is reduced.

Still further object of the present invention is to provide an air jet cleaner for generating a jet air stream to prevent dust and very fine particles created by the cutting operation from adhering to the tapered shank of a tool holder and spindle receiver drying the tool interchanging operation thereby ensuring that the tools are exactly engaged with the spindle.

Another object is to provide a tool magazine capable of interchanging tools from the front side by means of setting the tool magazine at a 90° turn position from its normal position so that a manual tool change operation can be carried out simply and easily when a fresh set of tools for operating a different machining operation is required to be changed.

Still another object of the present invention is to provide a driving mechanism capable of satisfying the requirement of high speed rotation together with the requirement of the positioning accuracy by means of actuating a rotary servo valve by a compound electric motor composed of a digital motor capable of turning by an angle corresponding to an input pulse signal, and an analog motor for high speed rotation, so that an oil-pressure is distributed to an oil-pressure motor to drive thereof by a digital and an analog electrical inputs.

Still further object of the present invention is to provide a feed control means for controlling a movable body in accordance with numerical data memorized on a tape by utilizing a driving mechanism composed of the compound electrical motor and a rotary servo valve and a hydraulic motor.

Still another object is to provide a mechanism for controlling a feeding motion applied to a control system comprising detecting a coarse feedback pulse with respect to distance of a unit displacement of a movable body, driving the movable body at a lower speed by means of a digital input from a commencing point of feeding unit detecting a predetermined number of coarse feedback pulses, driving the movable body at a higher speed by means of an analog input after detecting pulses up to several pulses before a destination point, thereafter, again driving the movable body at a lower speed up to the destination point, thereby high accuracy of the positioning operation can be attained with high speed feeding.

Another object of the present invention is to provide a numerical data preset circuit which is capable of presetting numerical data recorded on a tape with punched holes or magnetism from higher or lower digit on a counter in the proper sequence corresponding to reading digits which are read by numerical data reading means.

Another object of the present invention is to provide means for checking the preset numerical data as to whether the numerical data are preset in each digit of the counter in a proper form or not.

Still another object of the present invention is to provide a means for controlling the feeding of the movable body provided with a circuit for detecting troubles of a pulse detector by means of a pulse frequency of a feedback pulse so as to prevent misoperation of the feeding system.

Figure 2:
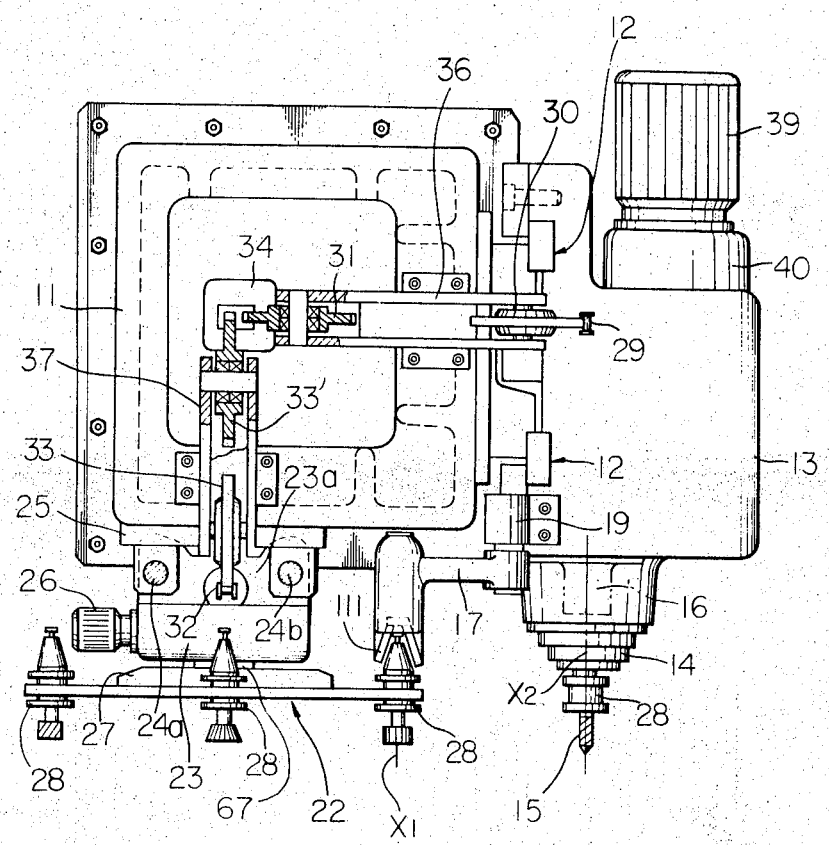
Figure 3:
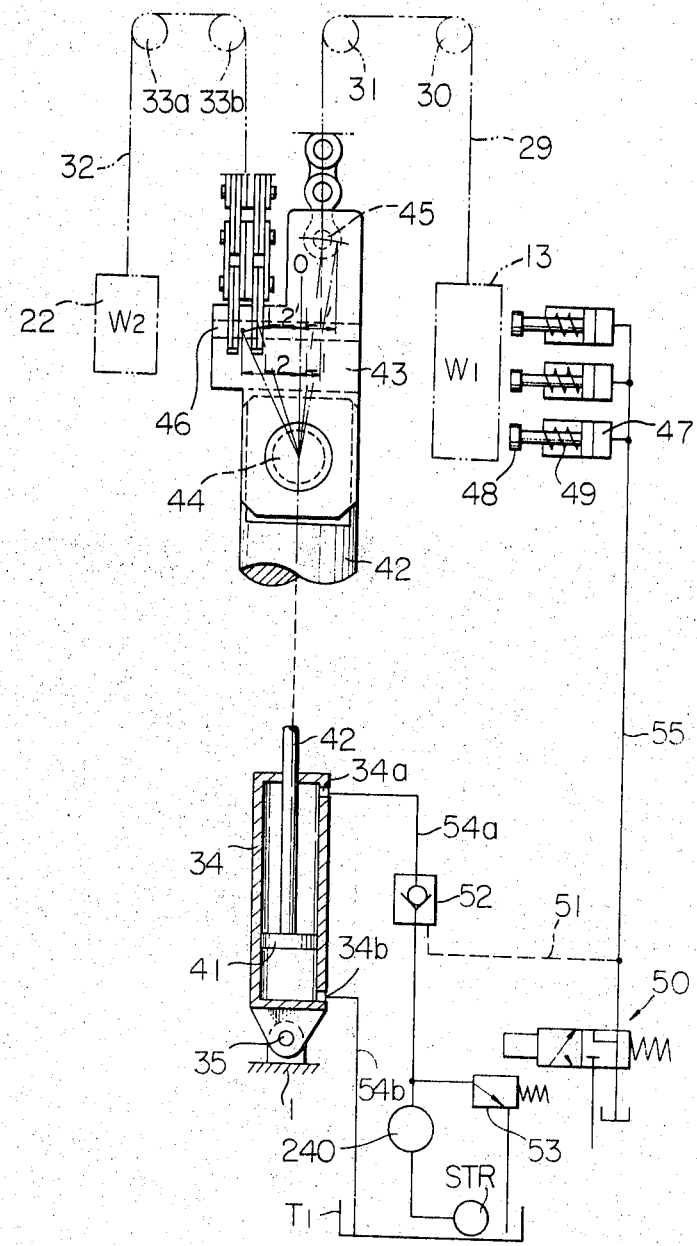
Figure 4:
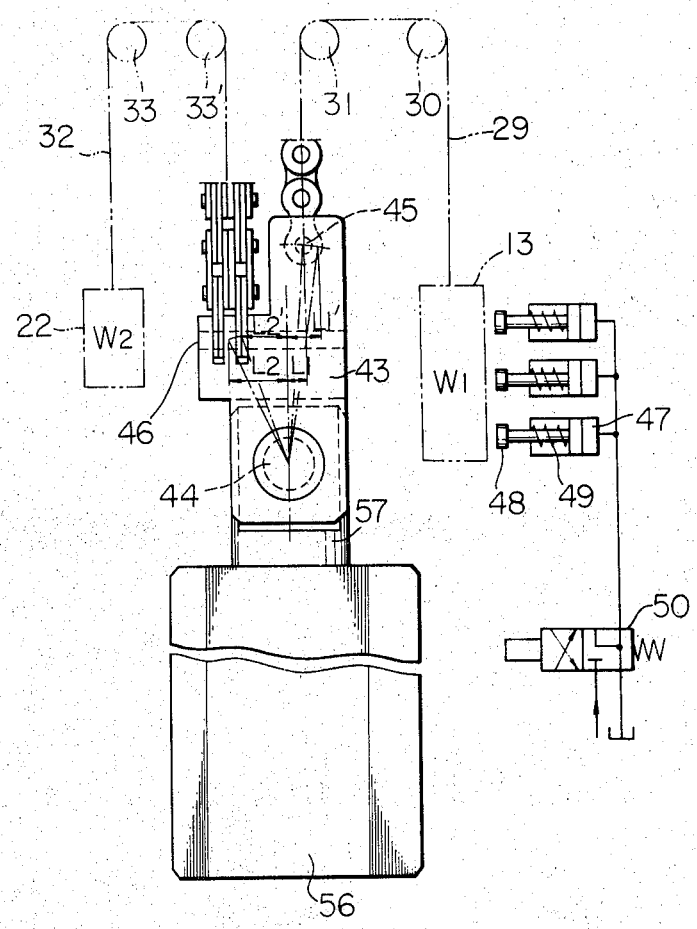
Figure 5:
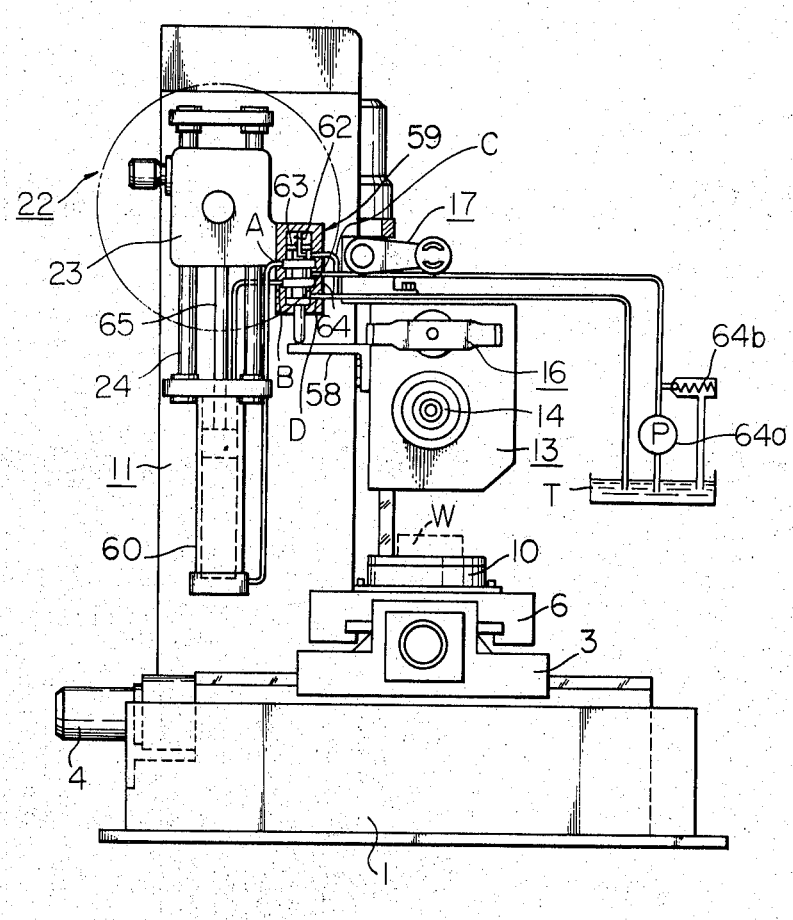
Figure 6:
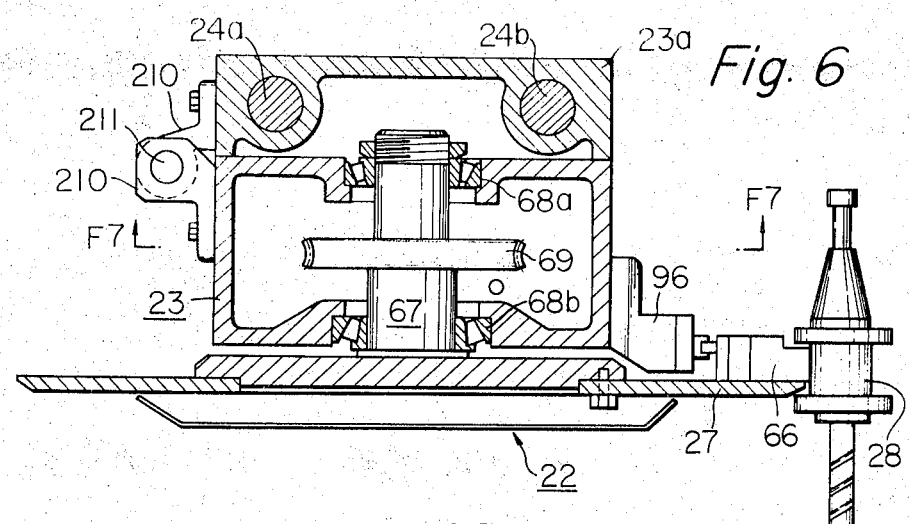
Figure 7:
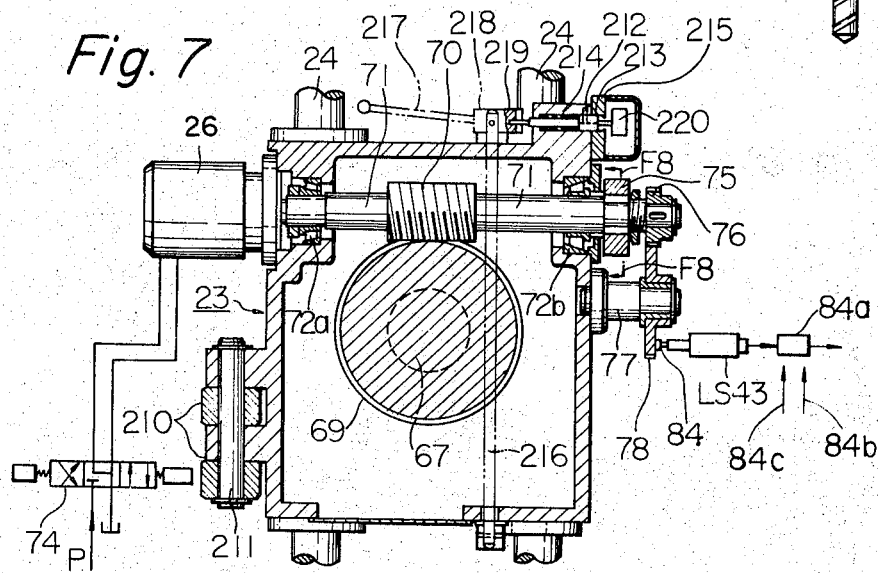
Figure 8:
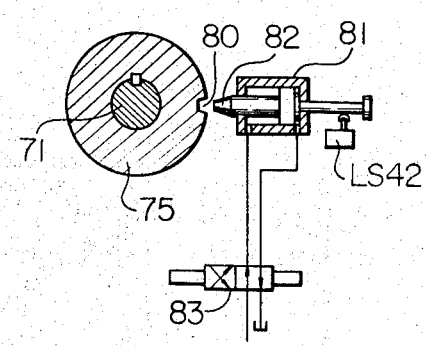
Figure 9:
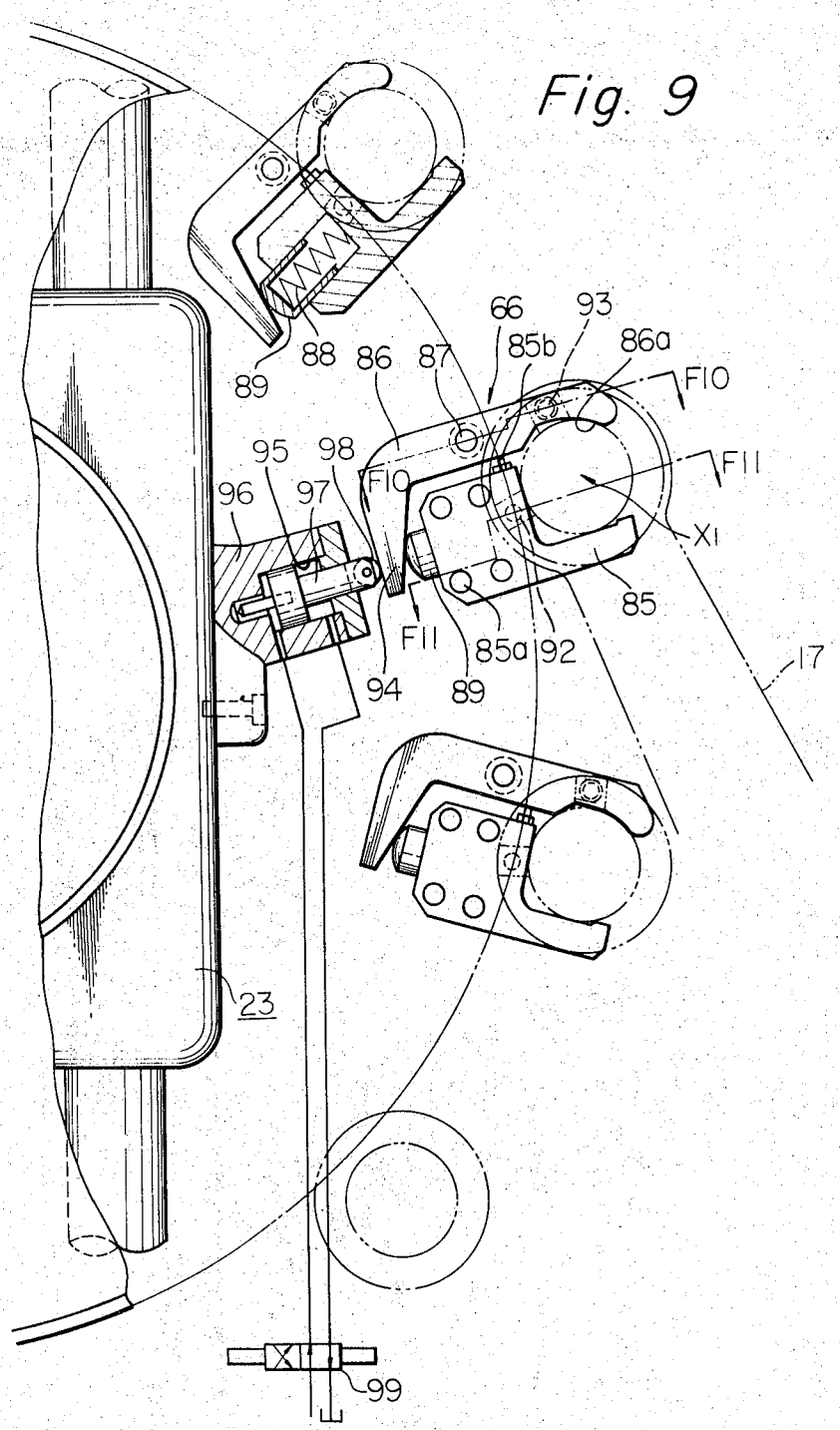
Figure 10:
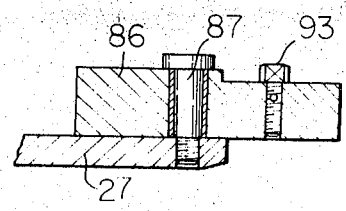
Figure 11:
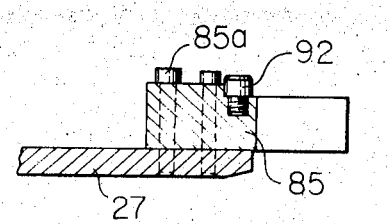
Figure 12:
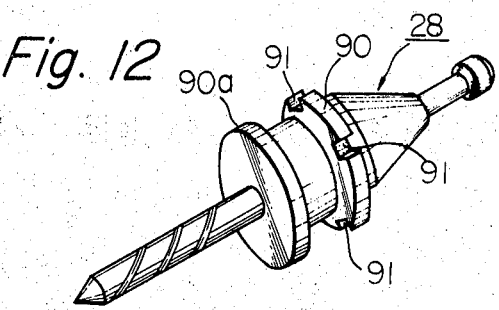
Figure 13:
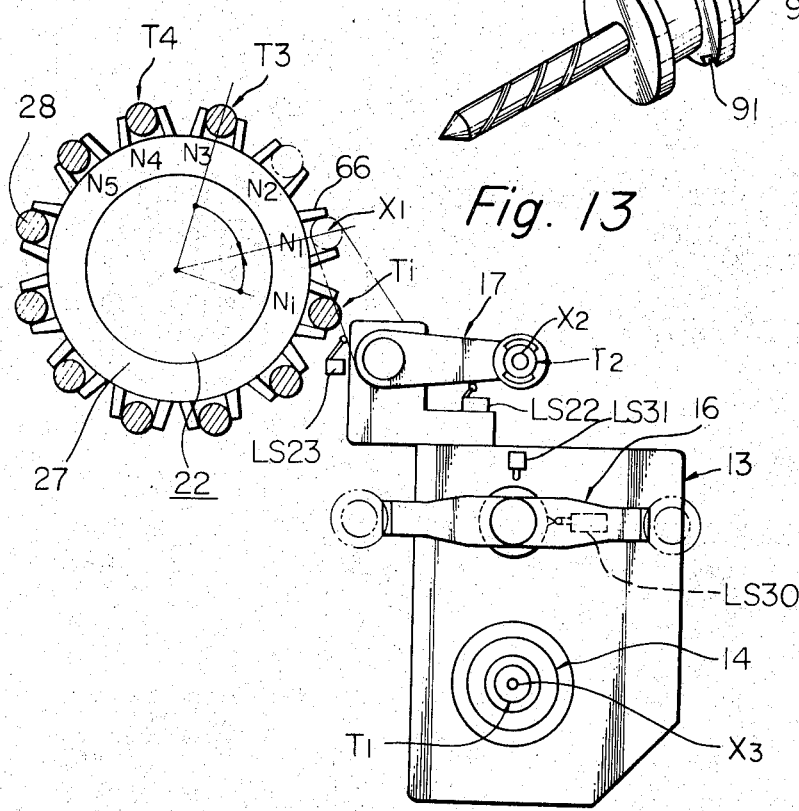
Figure 14:
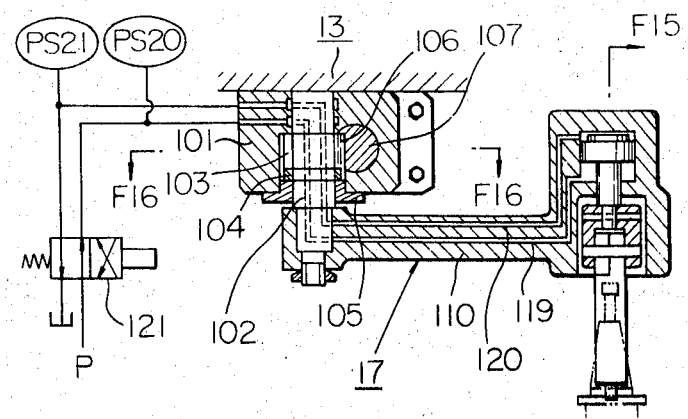
Figure 15:
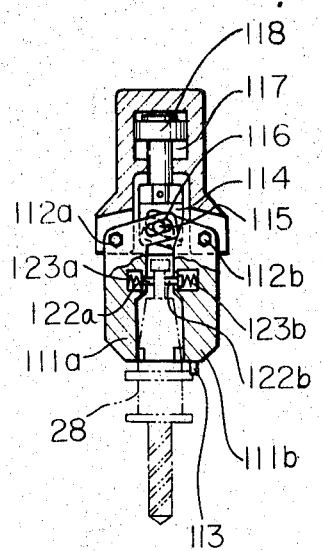
Figure 16:
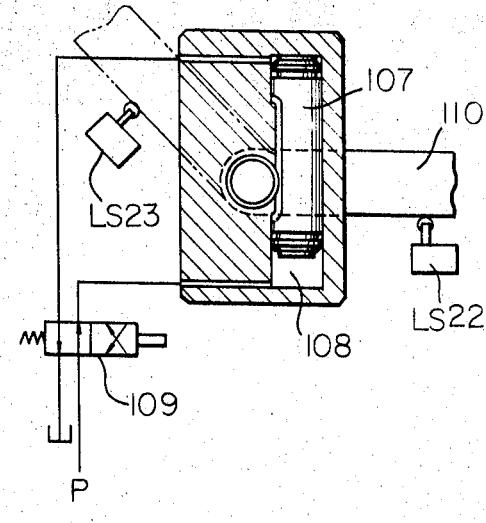
Figure 17:
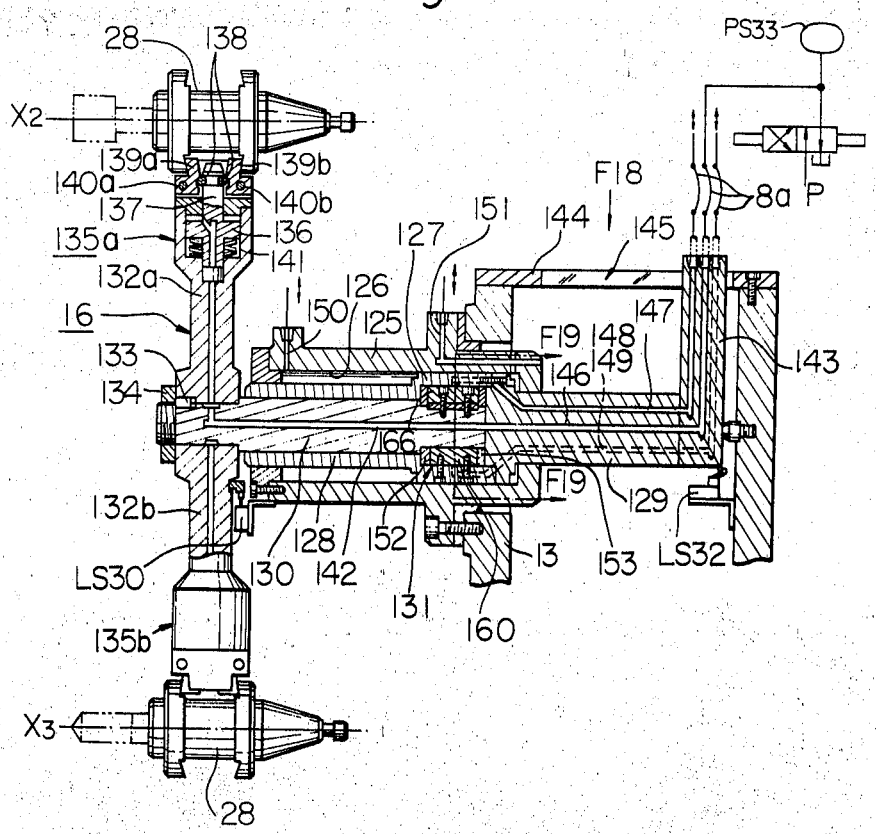
Figure 18:
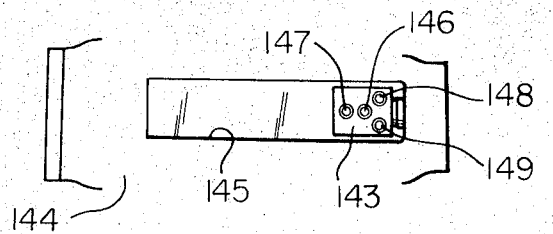
Figure 19:
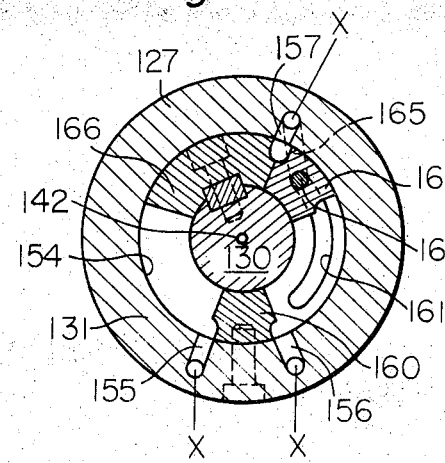
Figure 20:
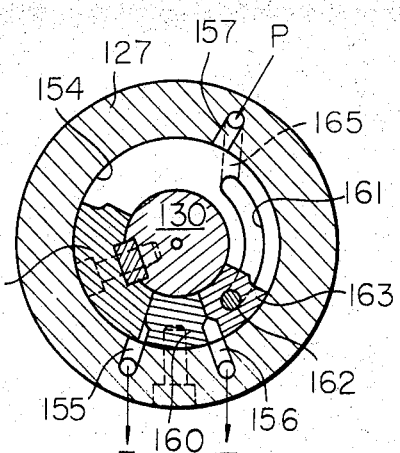
Figure 21:
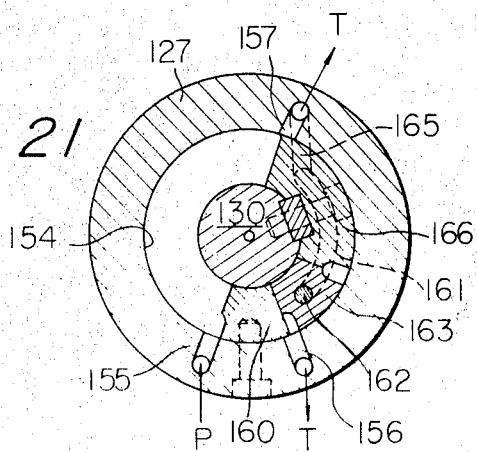
Figure 22:
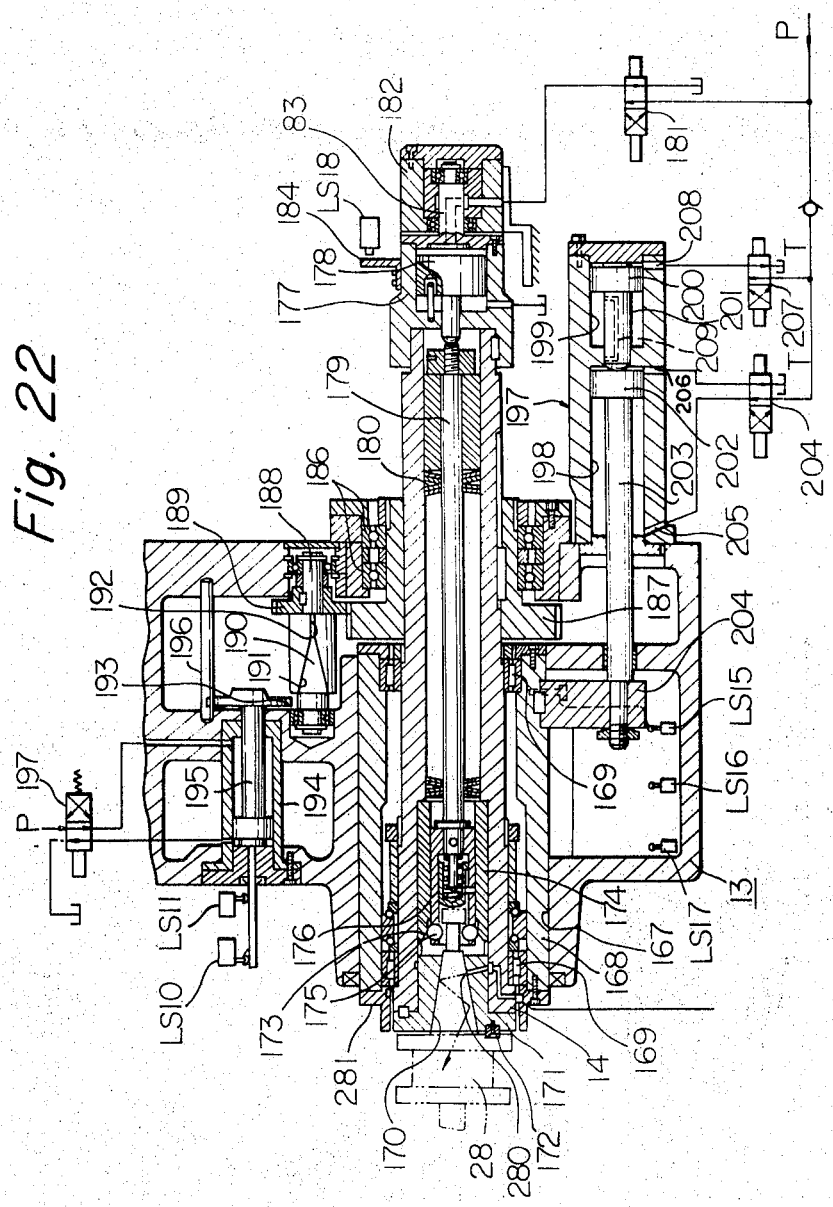
Figure 23:
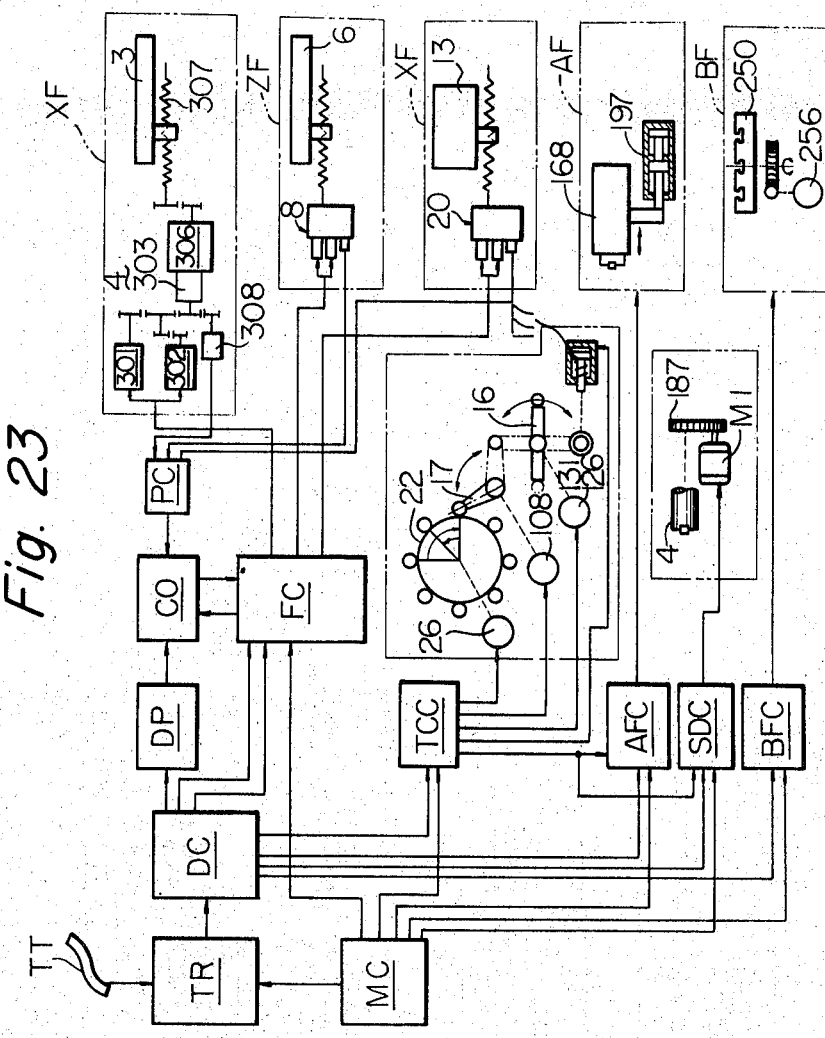
Figure 24:
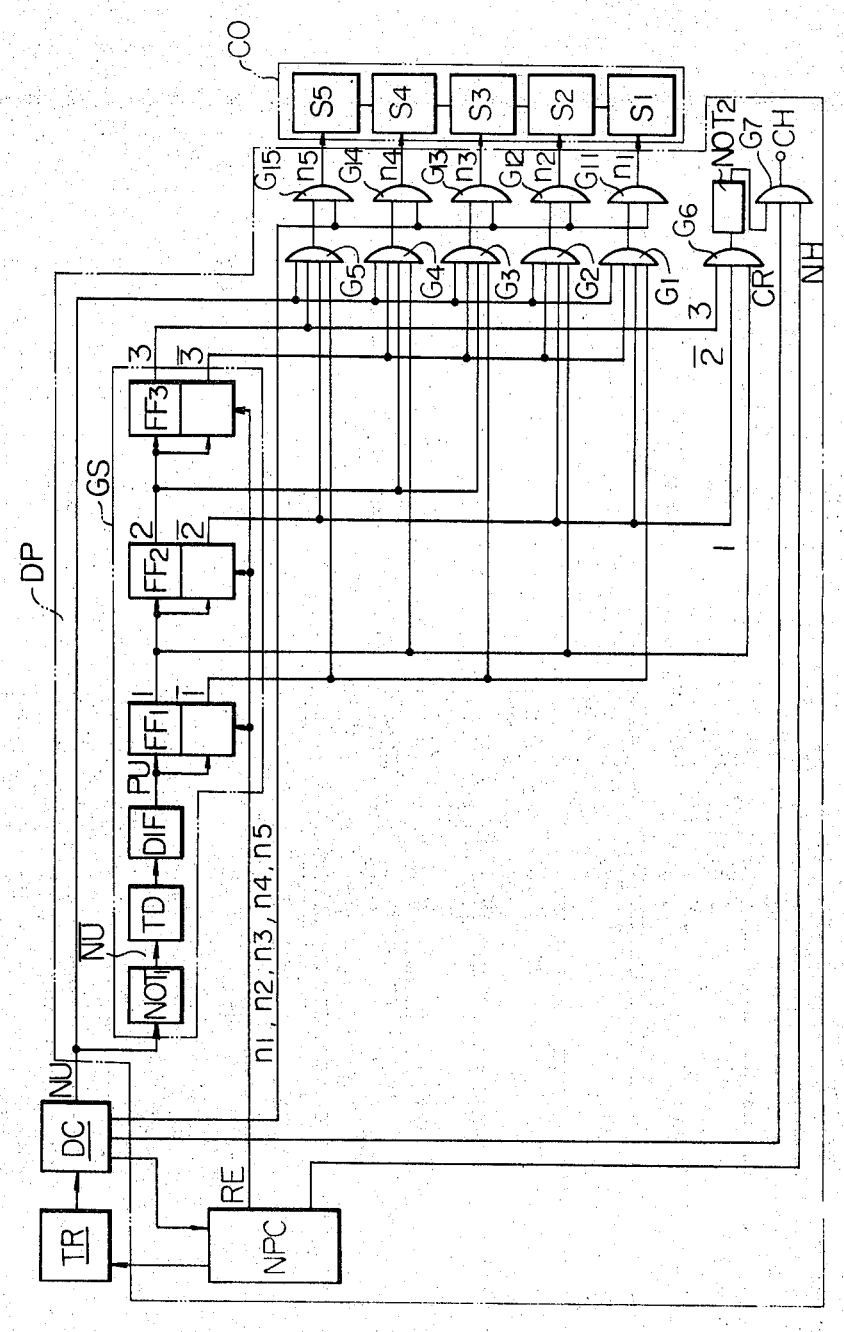
Figure 25:
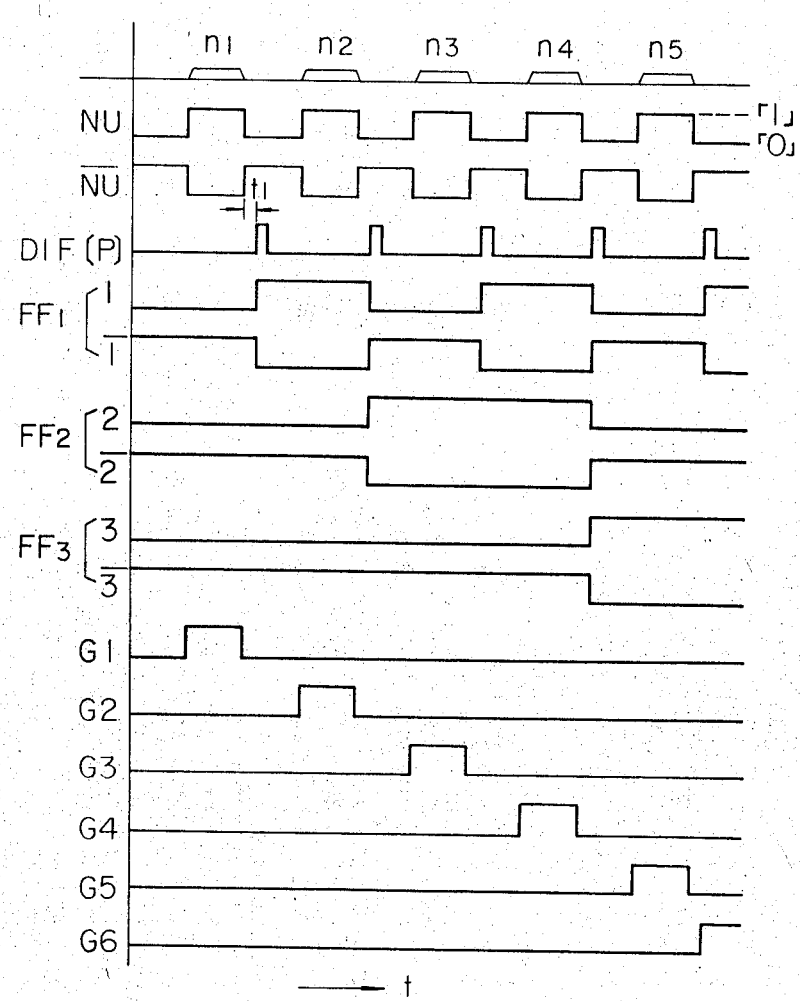
Figure 26:
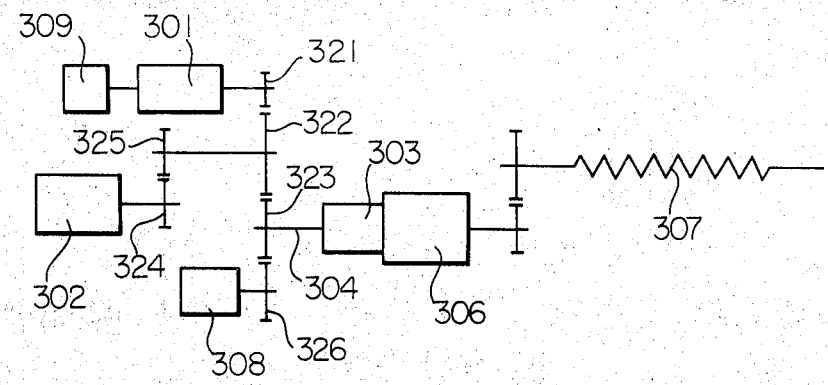
Figure 27:
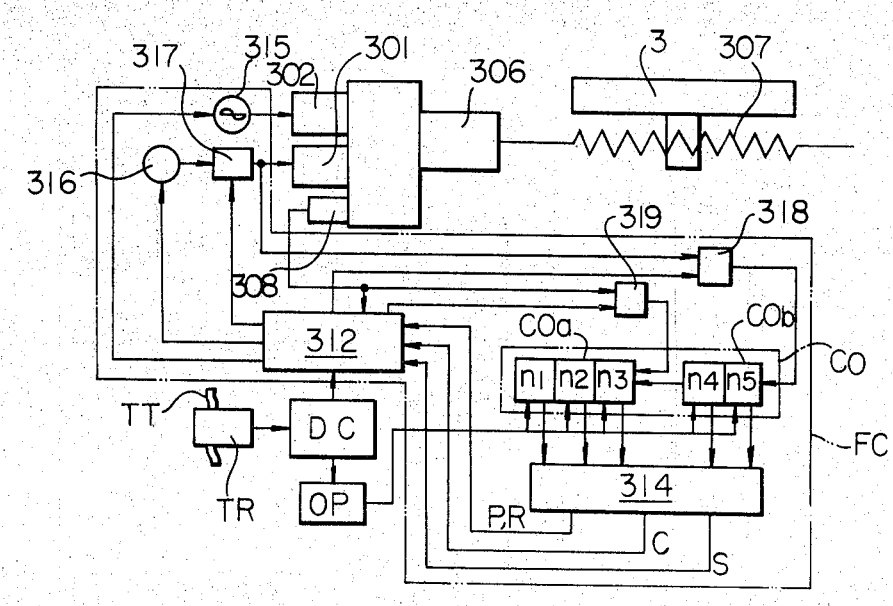
Figure 28:
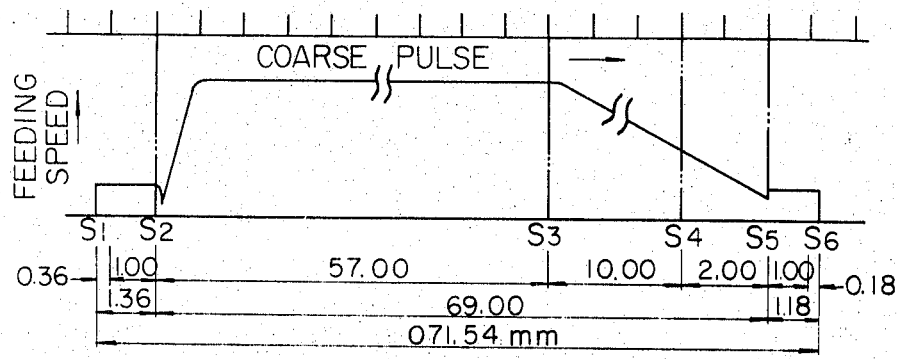
Figure 29:
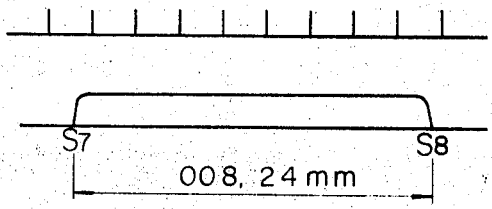
Figure 30:
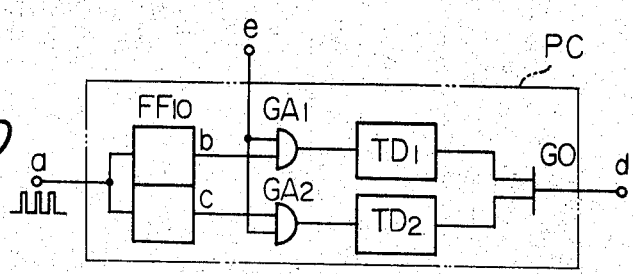
Figure 31:
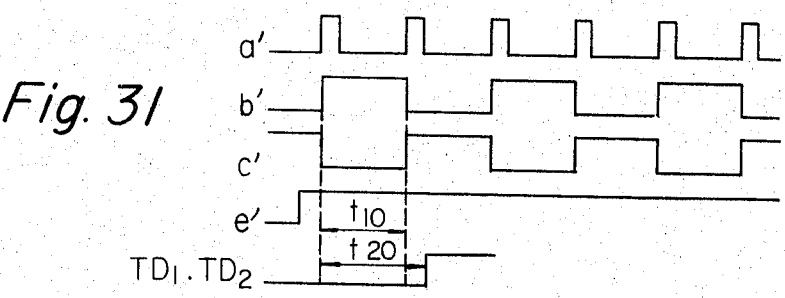
Figure 32:
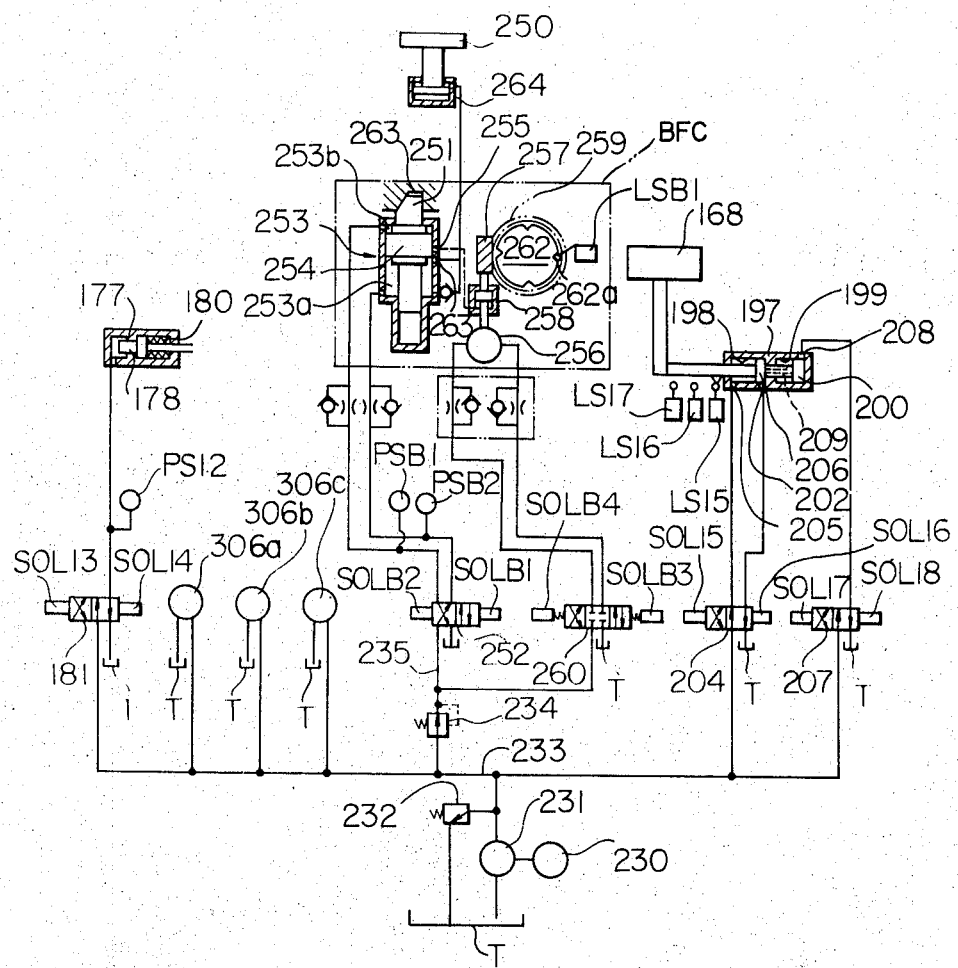
Figure 33:
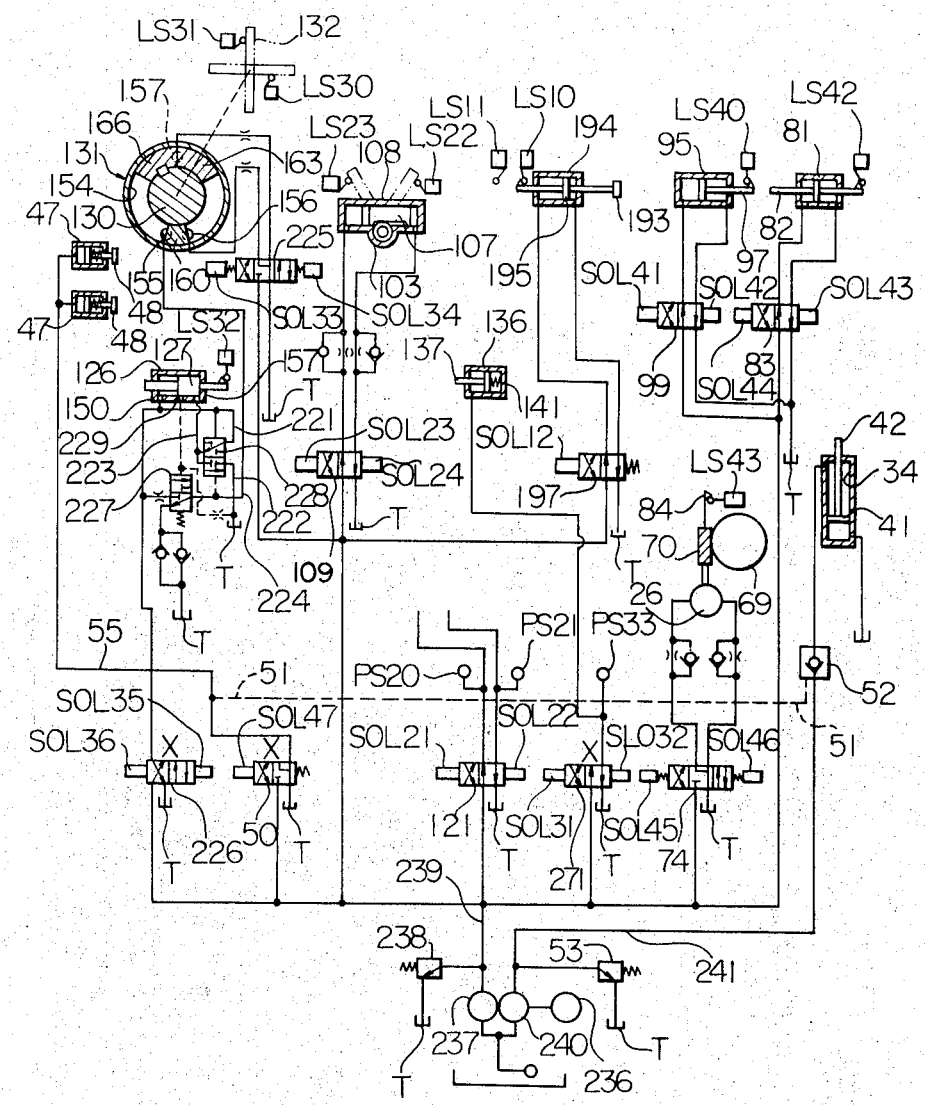
Figure 34:
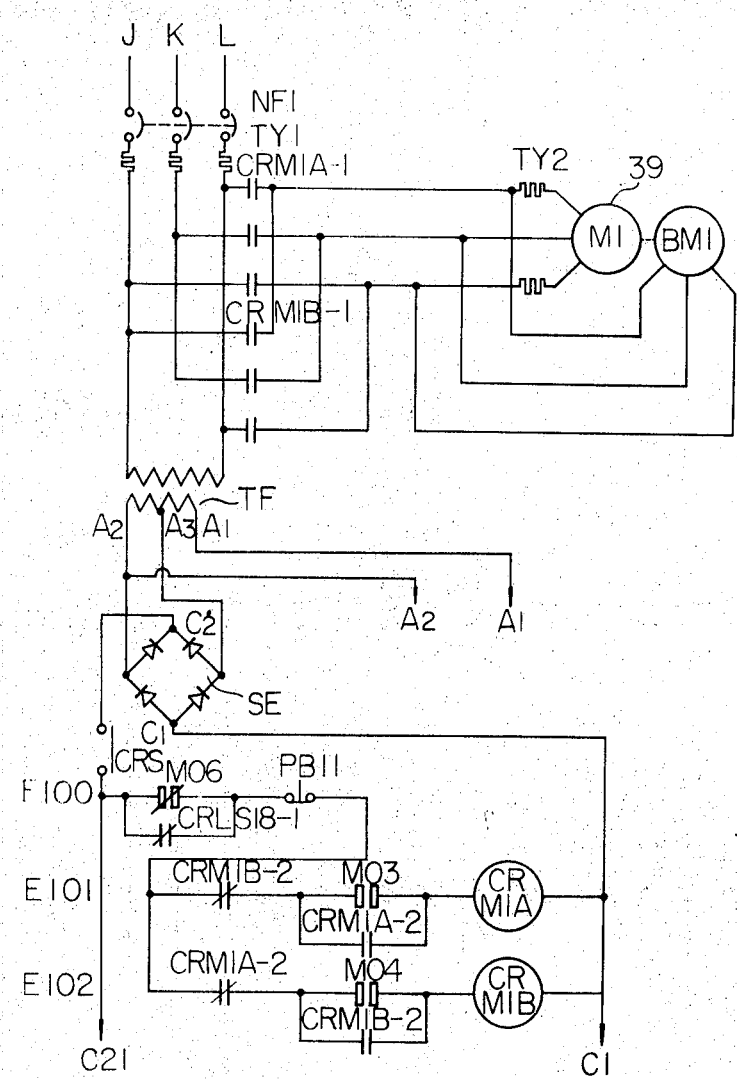
Figure 35:
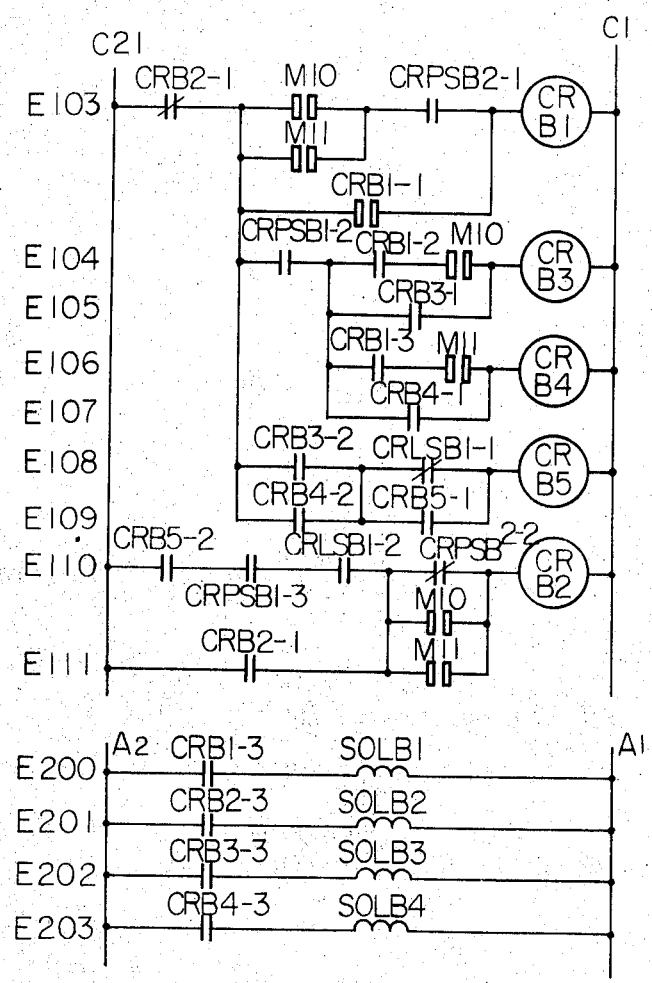
Figure 36:
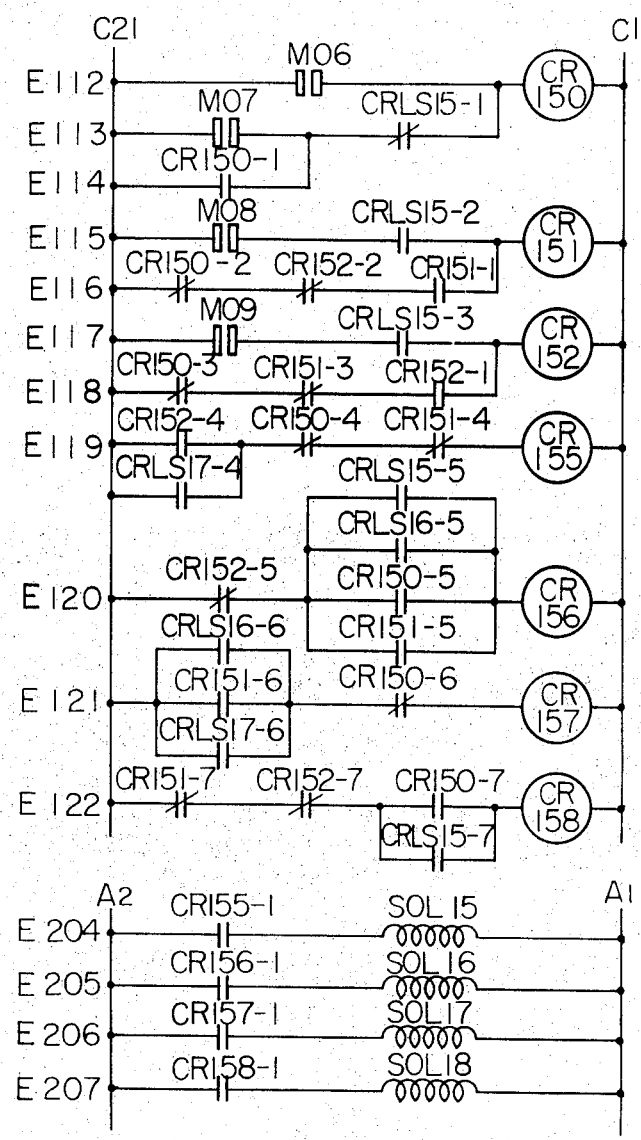
Figure 37:
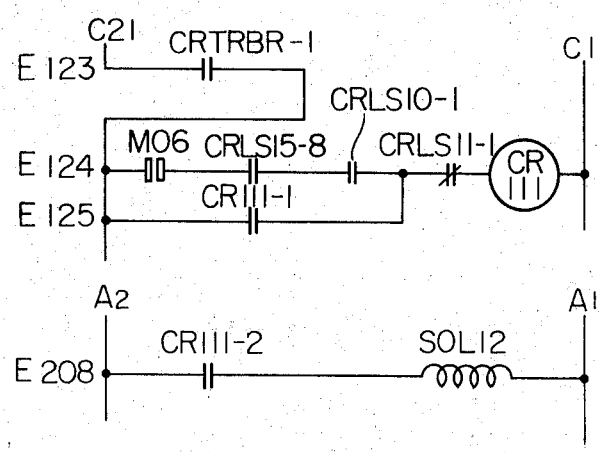
Figure 39:
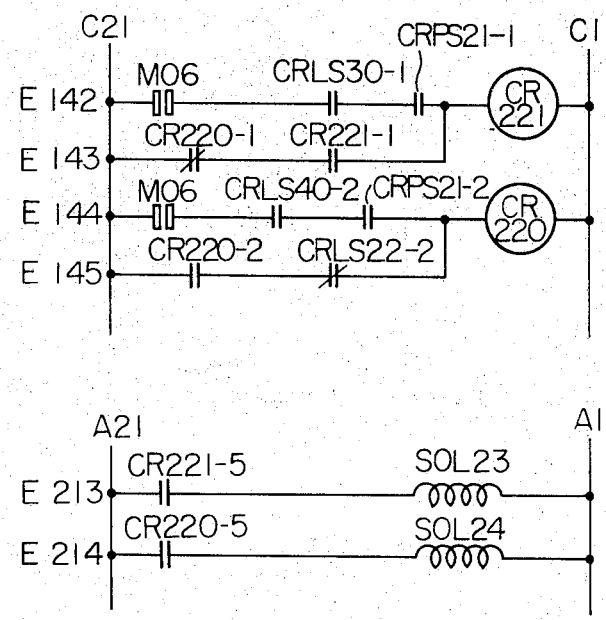
Figure 41:
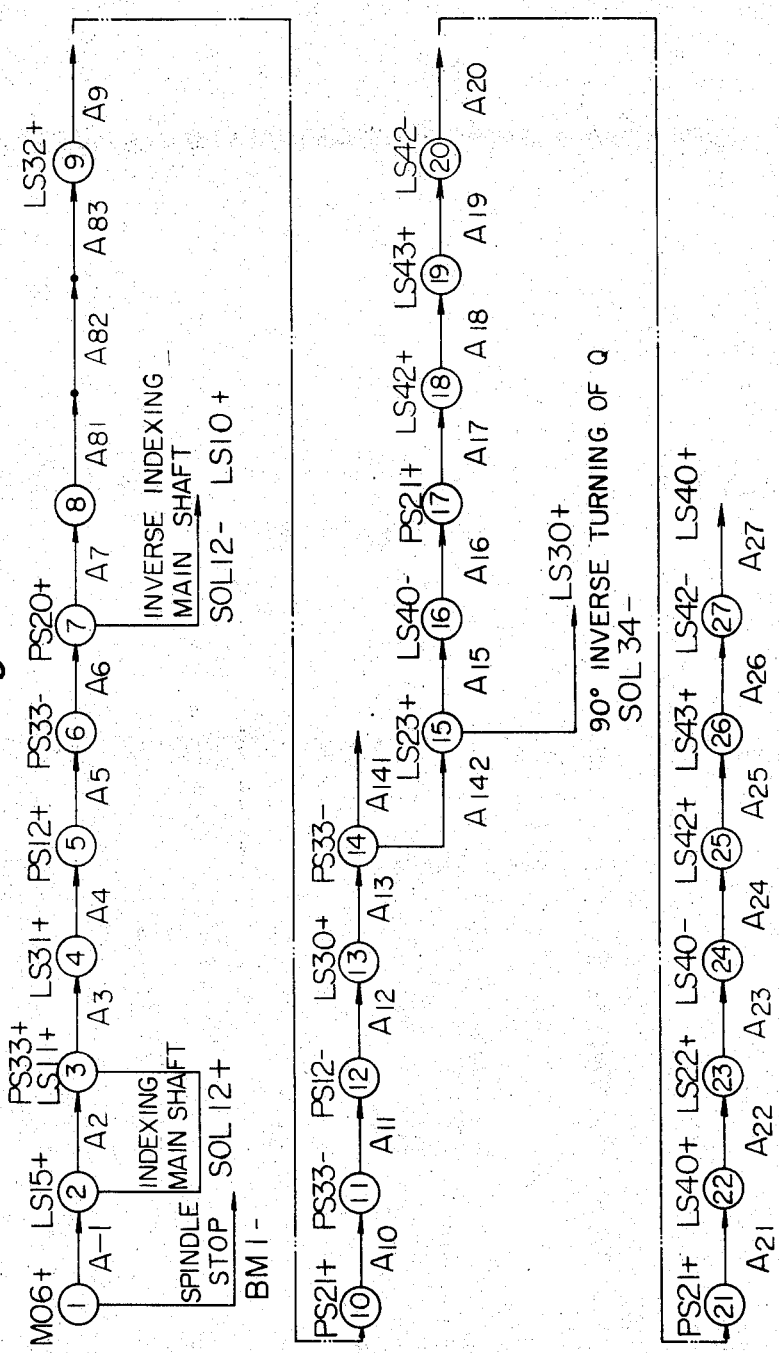

Other objects and advantages will become apparent from the following description together with claims and drawings, in which:

FIG. 1 is a front view, partly-in-section, of a numerically controlled machine tool according to the present invention, FIG. 2 is a fragmentary sectional view of the machine tool as viewed from an arrow F2 in FIG. 1, FIG. 3 is a detailed view showing a portion (a) of the machine tool shown in FIG. 1, together with an operating system of a balancing actuator according to the present invention, FIG. 4 is an operating system of the balancing means of a second embodiment corresponding to the embodiment shown in FIG. 3, FIG. 5 is a front view, partly-in-section of a third embodiment for subjecting a tool magazine to follow a motion of the spindle head of the machine tool according to the present invention, FIG. 6 is a sectional view of the machine, taken along line F6—F6 in FIG. 1, FIG. 7 is a sectional view of the machine, taken along line F7—F7 in FIG. 6, FIG. 8 is a sectional view of the machine tool, taken along line F8—F8 in FIG. 7, FIG. 9 is a detailed fragmentary sectional view of the tool magazine, particularly an adjacent portion of X1 in FIG. 1, FIG. 10 is a sectional view of the tool magazine, taken along F10—F10 in FIG. 9, FIG. 11 is a sectional view of the tool magazine taken along F11—F11 in FIG. 9, FIG. 12 is a perspective view of the tool holder, FIG. 13 is a diagrammatic illustration of a tool interchanging route according to the present invention, FIG. 14 is a cross-sectional view of the numerical controlled machine tool, taken along line F14—F14 in FIG. 1, FIG. 15 is a sectional view of the machine tool, taken along line F15—F15 in FIG. 14, FIG. 16 is a sectional view of the machine tool, taken along line F16—F16 in FIG. 14, FIG. 17 is a sectional view of a portion of the numerical controlled machine tool, taken along line F17—F17 in FIG. 1, FIG. 18 is a plan view of a portion of the machine tool as viewed from an arrow in FIG. 17, FIG. 19 is a sectional view of a spindle portion of the machine tool, taken along line F19—F19 in FIG. 17, illustrating that a tool transfer arm is positioned at its parking position, FIG. 20 is a similar view as FIG. 19, but illustrating the tool transfer arm turned 90° counterclockwise direction from the condition shown in FIG. 19, FIG. 21 is a similar view as FIG. 20, but illustrating the tool transfer arm turned 180° toward a clockwise direction from the condition shown in FIG. 20, FIG. 22 is a longitudinal sectional view of the spindle taken along line F22—F22 shown in FIG. 1, FIG. 23 is a block diagram showing a control system for controlling whole motions of the numerically controlled machine tool shown in FIG. 1, FIG. 24 is a diagram of a numerical data preset circuit of the control system shown in FIG. 23, FIG. 25 is an explanatory diagram for showing the relative operations of the control system shown in FIG. 23, illustrating wave-forms of the respective output signals of the component elements, FIG. 26 is a schematic diagram of the driving means of the feed control mechanism according to the present invention, FIG. 27 is a block diagram of the feed control mechanism shown in FIG. 26, FIG. 28, is a programming diagram of feeding speed of the tools, according to the present invention, FIG. 29 is another programing diagram of feeding speed of the tools, according to the present invention, FIG. 30 is a block diagram showing a detailed circuit for detecting troubles of a feedback pulse detector, according to the present invention, FIG. 31 is an explanatory diagram illustrating the motions of the circuit for detecting troubles of the feedback pulse detector shown in FIG. 30, FIGS. 32 and 33 are main circuits of an electric circuit for actuating elements of the numerically controlled machine tools according to the present invention, FIG. 34 is a diagram of a circuit for controlling the driving of the spindle according to the present invention, FIG. 35 is a diagram of an electric circuit for controlling a motion of a circular table, FIG. 36 is a diagram of an electric circuit for controlling a ram position, according to the present invention, FIG. 37 is a diagram of an electrical control circuit for controlling an angular setting of the spindle, FIG. 38 is a diagram of an electrical control circuit for controlling a motion of the tool magazine, FIG. 39 is a diagram of an electrical control circuit for controlling the motion of an intermediate transfer means, FIG. 40 is a diagram of an electrical control circuit for controlling the motion of a tool transfer mechanism, FIG. 41 is an explanatory drawing of an automatic tool interchange cycle according to the present invention.

While various modifications and alternative forms may be applied for the present invention, certain specific embodiments thereof are shown by way of examples in the drawings and will hereinafter be described in detail.

GENERAL MACHINE ORGANIZATION AND SYNCHRONIZING MEANS OF A TOOL MACHINE

Referring to FIGS. 1 and 2, a saddle 3 is slidably mounted on a horizontal slide ways 2 formed on a base 1 so that the sliding motion of the saddle 3 is carried out by a driving mechanism comprising a feed motor 4 and a gear box 5, a table 6 is slidably engaged with the saddle 3 by means of a pair of slide ways 7a, 7b so that the table 6 is movable in a perpendicular direction with respect to the displacement direction of the saddle 3 by a driving mechanism comprising a motor 8 and a gear box 9, a turn-table 10 for holding a workpiece is rotatably mounted on the table 6. A column 11 is vertically mounted on a top-end portion of the base 1, a spindle head 13 is slidably engaged with a pair of vertical slide ways 12 disposed (or formed) on the column 11 so that the spindle head 13 is capable of sliding in an up and down direction toward the turn-table 10 by means of a feeding mechanism comprising a motor 20 and a gear box 21. The spindle head 13 is provided with a spindle 14 for rigidly mounting tool 15 thereupon and a motor 39 and a gear box 40 for driving the spindle 14, a tool transfer arm 16 is disposed at an upper position of the spindle head 13, and an intermediate transfer means 17 provided with clamp fingers 111a and 111b at one end thereof is situated between the tool transfer arm 16 and the tool magazine 22 so that the means 17 is capable of rotating or angularly displacing by its drive mechanism 19 between the tool transfer positions X1 and X2 for transferring a tool holder 28 to and from the transfer arm 16 and the tool magazine 22.

The tool magazine 22 is mounted on a pair of guide rods 24a, 24b disposed at a front side of the column 11 so that the tool magazine 22 is capable of sliding in an up or down direction. That is, a pair of guide bars 24a and 24b are disposed between a pair of facing support members 25a and 25b rigidly mounted on higher or lower positions, respectively, in front of the column 11 in such a way that the guide rods are arranged in a parallel condition, a slidable body 23a carrying a magazine frame 23 provided with a motor 26 and an index mechanism is slidably mounted on the guide rods 24a and 24b. Also, the magazine 22 is arranged in such a manner that it rotates in a vertical plane almost flush with the plane in which the end of the spindle 14 rotates. A magazine disc 27 is secured to a rotatable shaft 67 which is rotatably supported by antifriction bearings 68a and 68b in the magazine frame 23. A plurality of tool clamp devices, for example of gripping tool holder 28, are radially mounted on a circumferen-tial portion of the magazine disc 27 so that diverse tools, such as tools having different sizes which vary from smaller diameter tools to tools having relatively large diameters, are releasably held by means way of the tool holder 28.

The operative relation between the spindle head 13 and the tool magazine 22 is hereinafter illustrated. An end of a chain 29 is connected with an upper-surface portion of the spindle head 13, the other end of the chain 29 is connected to a bracket 43 pivotably connected to an upper-end of a piston rod of a hydraulic balancing actuator 34 pivoted to a pin 35 located at a central under-portion in the column 11 while the chain 29 is guided by a sprocket 30 supported by a supporting frame 36 secured upon the column 11 and a sprocket 31 supported by the supporting frame 36. Further, an end of a chain 32 is connected to an upper-surface portion of a slidable body 23a supporting the tool magazine 22, while the other end of the chain 32 is connected to the bracket 43 with being guided by sprocket wheels 33a and 33b supported by a supporting frame 37 secured to the upper-portion of the column 11. The detailed construction and function of the above-mentioned connecting portion is hereinafter illustrated in FIG. 3.

The bracket 43 is pivoted by a pin 44 to a force applying means comprising a rod 42 of a piston 41 of the hydraulic balancing actuator 34 a piston rod 42 is connected at one end to the piston 41 and at the other end to the pin 44. The ends of the chains 29 and 32 are connected to the bracket 43 by means of the connecting pins 45 and 46, respectively. The location of the above-mentioned connections are determined as follows; assuming a horizontal distance between an imaginary vertical line or plane passing through a loading center 0 of the pin 44 and an imaginary vertical line passing a loading center of the connecting pin 45 is represented by $L_1$, while a horizontal distance between the imaginary vertical line passing the loading center of the pin 44 and an imaginary vertical line passing a loading center of the connecting pin 46 is represented by $L_2$, a length ratio between $L_1$ and $L_2$ is so defined that $L_1/L_2$ is in inverse proportion to a ratio $W_1/W_2$, where $W_1$ represents a weight of the spindle head 13 while $W_2$ represents a weight of the tool magazine 22. A pressure supply means imparts a predetermined actuating force to press the piston 41 of the hydraulic balancing actuator 34 in a downward direction. This pressure supply means comprises an oil reservoir $T_1$, a connecting conduit 54a for connecting the toil reservoir $T_1$ with an upper aperture 34a of a cylinder of the hydraulic balancing actuator 34 and another connecting conduit 54b for connecting the oil reservoir $T_1$ with a lower aperture 34b of the cylinder of the hydraulic balancing actuator 34, a pump 240 inserted into the connecting conduit 54a, a pilot check valve 52 inserted into the conduit 54a at a portion between the aperture 34a and the pump 240, a pressure-relief valve 53 inserted into a by-pass conduit between the oil reservoir $T_1$ and the portion of the connecting conduit 54a disposed between the pilot check valve 52 and the pump 240. The relief valve 53 operates for setting the pressure of the pressurized liquid supplied by the pump 240 so that the constant pressure of the pressurized fluid is supplied to the cylinder of the actuator 34. The pilot check valve 52 is connected to a branch conduit 51 connected to a conduit 55 for supplying pressurized fluid to a plurality of clamping actuators 47 of the spindle head 13. When the pressurized liquid is fed to the clamping actuators 47, the pressurized liquid is also fed to the pilot check valve 52 by way of the branch conduit 51 so that the pilot check valve 52 is opened to thereby connect the 34 to the reservoir $T^1$ through the relief valve 53. When the pressurized liquid is fed to the clamping actuators 47 so as to displace pistons 48 of the actuator 47 toward left-hand side in FIG. 3, the spindle head 13 is released from its clamping, while, when the supplying of the pressurized liquid to the clamping actuators 47 is stopped, the pistons 48 clamp the spindle head 13 at its predetermined position by means of respective helical springs 49 of the clamping actuators 47. Pressure of the pressurized liquid applied to the hydraulic balancing actuator 34 is defined by an action of the setting of the pressure relief valve 53 in such a way that a force $P \cdot A$ equals the sum of the weights of the spindle head 13 and the tool magazine 22, that is, $P \cdot A = W_1 + W_2$, where $P$ represents a setting pressure of the relief valve 53, $A$ represents the effective area of the piston 41 of the actuator 34. Therefore, when pressurized liquid having a pressure as defined above is applied to the hydraulic balancing actuator 34, as the sum of the weights $W_1 + W_2$ is balanced by the pressurized liquid by means of the function of the actuator 34, the spindle head 13 is balanced with the tool magazine 22 in a balanced condition defined by $W_1 L_1 = W_2 L_2$. In the above-mentioned condition, when the spindle head 13 is subjected to clamping, the pilot check valve 52 operates to prevent the reversible motion, therefore, even though supply of the electric current to the machine is interrupted, the previously situated position of the spindle head 13 is firmly maintained by means of the above-mentioned clamping mechanism and the function of the pilot check valve 52.

Further, when it is required to change the positions of the spindle head 13, pressurized liquid is supplied to the clamping actuator 47 by changing the condition of a changeover valve 50, so that the clamping of the spindle head 13 is released. As already explained, the spindle head 13 and the tool magazine 22 are kept in a balanced condition by the action of the hydraulic balancing actuator 34 and the displacement of the spindle head 13 and tool magazine 22 are carried out very smoothly. As it is easily understood, the mechanism of the connection by means of the bracket 43, the spindle head 13 and the tool magazine 22 are synchronously displaced in an upward or downward direction. According to the clamp releasing motion, pressurized liquid is supplied to the branch conduit 51 so that the pilot check valve 52 is opened thereby preventing the inverse or reverse flow of the liquid. Therefore, when the spindle head 13 is driven by the feed motor 20 in a downward direction, the spindle head 13 and the tool magazine 22 are displaced in a downward direction synchronously. During this downward displacement of the spindle head 13 together with the tool magazine 22, the piston 41 of the hydraulic balancing actuator 34 is loaded by weight of $(W_1 + W_2)$. Consequently, the pressure $P$ of the liquid in the actuator 34 is built up to $(W_1 + W_2)/A$ which is equal to the setting pressure of the pressure relief valve 53, and thus the pressurized liquid in the actuator 34 flows to the reservoir $T_1$, through the pilot check valve 52 and the pressure relief valve 53, whereby the balancing condition between the pressure of the liquid in an actuator 34 and the weight of the spindle head 13 and the tool magazine 22 is always maintained.

The weight $W_1$ of the spindle head 13 is almost constant, while the weight $W_2$ of the tool magazine 22 varies in accordance with types and number of the tools held by the magazine disc 27. Therefore, when the weight $W_2$ varies, the balanced condition moment represented by the equation $W_1 L_1 = W_2 L_2$ is broken. To maintain the above-mentioned balanced condition, the central axial position of the piston rod 42 of the hydraulic balancing actuator 34 is required to be displaced so that the loading center of the bracket 43 satisfies the above-mentioned balanced condition with respect to $L_1$ and $L_2$, otherwise, the piston rod 42 receives a biased load toward a larger side of a moment so that smooth upward or downward displacement of the piston rod 42 is disturbed. In the present invention, the above-mentioned unbalancing of the moment between $W_1L_1$ and $W_2L_2$ is self-adjusting by means of utilizing the pivoted bracket 43 pivotably mounted on a top-end portion of the piston rod 42. The bracket 43 pivoted to the end portion of the piston rod 42 by the pin 44 is connected to the lower ends of the chains 29 and 32 so as to satisfy the equation $W_1L_1 = W_2L_2$ as already illustrated. Therefore, when the weight $W_2$ of the tool magazine 22 is increased, the bracket 43 is turned or pivoted in a clockwise direction, as viewed in FIG. 3, so that the turning angle or angular displacement corresponds to the additioned weight of the tool magazine 22, while the above-mentioned balanced condition represented by the following equation $W_1L_1 = W_2L_2$, with respect to the central vertical line O, is broken. By the above-mentioned turning of the bracket 43, the connecting points of the chains 29 and 32 with respect to the vertical line O are also displaced together with the bracket 43. By the above-mentioned displacement of the connecting points of the chains 29 and 32, the lever ratio about the central axial line O of the pivot pin 44 is changed to $L_1' : L_2'$ so that the moment about the central axial line O of the piston rod 42 can be self-adjusted. Consequently, even though the weight $W_2$ of the tool magazine 22 is changed, the bias of the loading center of the piston rod 42 is negligibly small, so that any troubles disturbing the smooth displacement of the piston rod 42 can be prevented. Moreover, the pivotable supporting of the hydraulic balancing actuator 34 by the pin 35 is also effective for preventing the above-mentioned troubles. As mentioned above, the intermediate transfer means 17 is capable of taking tools from the tool magazine 22 at any position with respect to the column 11 by means of the synchronous motion of the spindle head 13 with the tool magazine 22. By applying the above-mentioned mechanism, the time involved for requiring the tool transfer can be remarkably reduced.

In FIG. 4, another embodiment for synchronously displacing the spindle head 13 and the tool magazine 22 is shown. In the drawing of FIG. 4, the members represented by the same numeral as the elements shown in FIG. 3, are provided with the same function, therefore, the illustrations, with respect to these members in the following illustration, are omitted. In this second embodiment, a balancing dead weight 56 is utilized instead of the hydraulic balancing actuator 34 and the pressurized fluid supplying means. An upwardly projected portion 57 of the dead weight 56 is pivoted to the bracket 43 by means of the pin 44. The net weight of the balancing dead weight 56 equals the sum of the weight $W_1$ of the spindle head 13 and $W_2$ of the tool magazine 22. When the spindle head 13 is displaced to an upward or downward direction by means of the motor 20, the balancing weight 56 is also displaced because of the connection of the chain 29 with the spindle head 13 and the bracket 43, therefore, the tool magazine 22 is also displaced by the motion of the chain 32 connecting the tool magazine 22 with the bracket 43. In the same way as in the first embodiment shown in FIG. 3, the connection of the chains 29 and 32 with the bracket 43 is applied, therefore, the synchronous motion of the spindle head 13 with the tool magazine 22 is stably attained, further, when the weight of the tool magazine 22 varies slightly, the moment balancing condition of the weights of the spindle head 13 and the tool magazine 22 can be automatically adjusted.

In FIG. 5, a third embodiment for synchronously displacing the spindle head and the tool magazine is shown. In this drawing, members represented by the same numerals as that in FIG. 3 have the same operative functions as that in FIG. 3, and in this embodiment, a template 58 is secured to the spindle head 13 in such a way that the template 58 projects from the side of the spindle head 13, and a servo valve 59 is mounted on a side surface of the magazine frame 23 of the tool magazine 22 so as to contact with the template 58. An entrance 64 of the servo valve 59 is connected to a pump 64a, the outlets A and B of the valve 59 are connected with apertures made in upper and lower rooms of a servo actuator 60 disposed in the column 11, and discharging outlets C and D are connected to the oil reservoir T, respectively. A conventional servo valve, provided with an operative function for permitting feeding of the pressurized liquid from the pump 64a to the servo actuator 60 when a spool valve 63 engaging with a valve housing 62 is displaced from its neutral position by a pressing action of the template 58 can be utilized for the present embodiment. A piston rod 65 of the servo actuator 60 is secured to the magazine frame 23 at its projected end portion. When pressurized liquid is fed into the upper or lower room of the servo actuator 60 by way of the servo valve 59, the piston rod is moved. That is, when the spindle head 13 is displaced, the spool valve 63 is displaced from its neutral position, thereby pressurized liquid is fed into the upper or lower room of the servo actuator 60, consequently, the tool magazine 22 follows the motion of the spindle head 13. Further, the liquid from the reservoir T is pressurized by the pump 64a and its pressure is fixed at constant by a relief valve 64b. As mentioned above, the tool magazine 22 is always maintained at a constant relative position with respect to the spindle head 13 so that the tool holders 28 being held by the tool magazine 22 can be removed by the intermediate transfer member 17 at any position of the spindle head 13.

TOOL MAGAZINE AND ITS DRIVING MECHANISM

Referring to FIGS. 6 and 7, the magazine disc 27, provided with tool clamping means comprising tool clamp devices 66 for holding a plurality of tool holders 28 at its circumferential edge portion, is coaxially secured to the rotatable shaft 67. The shaft 67 is rotatably supported at its both end portions by a pair of anti-friction bearings 68a and 68b mounted on the machine frame 23, and a worm wheel 69 is secured to the shaft 67 at its middle portion. A worm 70, which meshes with the worm wheel 69, is secured to a shaft 71 which is rotatably supported at its both end portions by a pair of bearings 72a and 72b mounted on the magazine frame 23. A reversible hydraulic rotary motor 26 is connected to an end of the shaft 71 and the reversible hydraulic rotary motor 26 is actuated to rotate in either a direction of normal rotation or a direction of reversible rotation by means of utilizing energy of a pressurized liquid supplied through a change-over valve 74. An indexing plate 75 and a gear 76 are secured to projected end portions of the shaft 71 projected from the magazine frame 23. As shown in FIG. 8, the indexing plate 75 is provided with a reference hole 80, a plunger 82 for restricting the turning motion of the indexing plate 75 is disposed in a hydraulic actuator 81 mounted on the magazine frame 23 so that, when the reference hole 80 of the indexing plate is in the index position, the plunger 82 is subjected to engagement with the reference hole 80 by means of the pushing force of the hydraulic actuator 81. The hydraulic actuator 81 is actuated by a command signal generated by a limit switch LS43 which actuates when the magazine disc 27 is in an index position defined by a predetermined angle, therefore, when a change-over valve 83 changes the path of the liquid passage of the pressurized liquid, the plunger 82 is advanced toward the reference hole 80 and the limit switch LS42 is operated to confirm the engagement of the plunger 82 with the reference hole 80. A follow gear 78 rotatably mounted on an intermediate shaft 77 secured to the machine frame 23 meshes with the gear 76. The number of teeth of these gears 76 and 78 are so defined that when the magazine disc 27 rotates by one pitch corresponding to a pitch between two adjacent tool clamp devices 66, thereby the one round rotation of the follow gear 78 follows. A dog 84 is adjustably mounted on the side surface of the follow gear 78 so that the mounted position can be adjusted, thereby, the dog 84 is capable to actuate the limit switch LS43 secured to the magazine frame 23. The limit switch LS43 is connected to a counter circuit 84a. When the counter circuit 84a receives a command signal 84b to rotate the magazine disc 27 in a rightward direction (hereinafter referred to as "normal direction"), the counter circuit 84a generates a signal so as to change the working position of the change-over valve 83 by two round rotation of the gear 78, while a command signal 84c for rotating the magazine disc 27 in the reverse direction is applied, the counter circuit 84a generates a signal so as to change the working position of the change-over valve 83 by one round reverse rotation of the gear 78. By the above-mentioned changing over motion of the change-over valve 83, the plunger 82 is inserted into the reference hole 80 of the index plate 75 so that the shaft 71 is temporarily held in a stationary condition together with the magazine disc 27. The magazine disc 27 is capable of rotating two pitch toward the normal direction and one pitch toward the reverse direction. The above-mentioned motion of the magazine disc 27 together with its result is hereinafter illustrated in detail.

Referring to FIG. 9, a plurality of tool clamp devices 66 are radially arranged at a circumferential portion of the magazine disc 27 with equal pitches, each tool clamp device 66 is provided with a pair of pawls, one of these pawls is a stationary or stational pawl 85 secured to the magazine disc 27 with bolts 85a, while the other pawl is a pivotal pawl 86 pivoted to the magazine disc 27 by a pin 87. The pivotal or turnable pawl 86 is provided with a recess 86a at its projected end, which is suitable for clamping a tool holder 28 by means of the recess 86a and the stational pawl 85, while the other end of the turnable pawl 86, is curved in an or L-shaped portion 94. This L-form portion 94 is contacted with a plunger 89 slidably mounted in a blind bore of the stational pawl 85 and is always pushed outward by a spring 88 disposed in the blind bore. Therefore, the turnable pawl 86 is pushed by the plunger 89 so that the turnable pawl 86 turns around the pin 87, so as to narrow the space between projected portions of the pawls 85 and 86, thereby, a tool holder 28, which is brought to the above-mentioned space, can be held by the pawls 85 and 86. A stop 85b for restricting the turning motion of the turnable pawl 86 is threadedly engaged with the stational pawl 85 so as to restrict the over turning of the pawl 86. As shown in FIG. 12, the tool holder 28 is provided with a flange 90, wherein four key grooves 91 are formed with symmetrical arrangement for engaging with a drive key 172 (shown in FIG. 22) disposed to an end surface portion of the spindle 14. The stational pawl 85 and the turnable pawl 86 are provided with positioning pins 92 and 93, respectively, so that the positioning pins 92 and 93 are capable of engaging with the key grooves 91, as clearly shown in FIGS. 10 and 11. Consequently, an angle between the pins 92 and 93 is 90°. The positioning pins 92 and 93 engage with the key grooves 91 of the tool holder 28 so that it is prevented from coming out of the tool holder 28 by its gravity or centrifugal force when the magazine disc 27 is rotating. Further, these positioning pins 92 and 93 prevent the movement of the tool holder 28 in the tool clamping device 66, therefore, the reliable engagement of the key grooves 91 of the tool holder 28 with a pin 113 of the intermediate transfer member 17 can be attained when the tool holder 28 is transferred from the tool clamp device 66 to the intermediate transfer member 17. A pawl releasing device 96 is secured to the magazine frame 23 at a side position facing a corresponding position, whereon the tool holder 28 is taken from the tool magazine 22 by the intermediate transfer member 17. The pawl releasing device 96 is provided with a hydraulic actuator 95, and a press roller 98 is rotatably mounted on an end portion of the piston rod 97 of the hydraulic actuator 95 which is capable of proceeding to, or receding from the L-shaped portion 94 of the turnable pawl 86 so that the turnable pawl 86 is turned by the pushing motion of the piston rod 97 towards the L-shaped portion 94 of the pawl 86 through contacting the press roller 98 with the L-shaped portion 94. The hydraulic actuator 95 is actuated by a change-over motion of a change-over valve 99 which is actuated by a command signal from a pressure switch (PS20) (FIG. 14). The pressure switch (PS20) generates the command signal when the intermediate transfer member 17 holds a shank of the tool holder 28 in accordance with a command signal for removing the tool holder 28 from the tool magazine 22. As mentioned above, in this arrangement, it is sufficient enough to release the desired tool from the tool clamp device 66 at the tool change position (S1) by utilizing only one pawl releasing device 96.

MOTION OF THE TOOL MAGAZINE

The motion of the above-mentioned tool magazine is hereinafter illustrated with reference to FIG. 13. A plurality of tool clamp devices 66 are mounted on the circumferential portion $N_1, N_2, ........ N_i$, of the magazine disc 27 with equal intervals and a plurality of tool holders $T_1, T_2, T_3, ......... T_i$ arranged in the sequence of their utilization are held by the tool clamp devices 66 positioned at $N_1, N_2, ......... N_i$ portions, respectively. Let the position of the spindle 14, tool change position of the intermediate transfer means 17 wherein the tool holder 28 is transferred therefrom to the tool transfer arm 16 and the position for removing the tool holder 28 from the tool magazine 22 by the intermediate transfer means 17 be represented by $X_3, X_2$ and $X_1$, respectively. Firstly, a tool $T_i$ is held by the spindle 14, a tool $T_2$ is held by the intermediate transfer means 17 and the position $N_1$ is adjusted to coincide with the position $X_1$. The above-mentioned positions of the elements of the machine tool are the original positions for starting the operation of the machine.

When the machining operation on the workpiece by the tool $T_1$ mounted on the spindle 14 is completed, the spindle 14 returns to its original position and a limit switch (LS15) (FIG. 22) is energized for generating a command signal for tool exchange so that the tool holder transfer arm 16 turns counterclockwise by 90° and this turning motion is confirmed by a limit switch LS31, and a tool holder of the tool $T_1$ (a tool holder for holding tool $T_i$ is hereinafter referred to as tool $T_i$) and a tool $T_2$ are held by the tool holder transfer arm 16 at its both ends. When a tool gripping member in the spindle 14 (which will be hereinafter illustrated in detail) releases the tool $T_1$, the tool holder transfer arm 16 is displaced along the longitudinal axis of the spindle 14 so that the tools $T_1$ and $T_2$ are taken off from their previous holding position, next, the tool holder transfer arm 16 turns clockwise by 180°, thereafter, the tool holder transfer arm 16 is displaced in the reverse direction along the longitudinal axis of the spindle 14 so that the tool $T_2$ is inserted into the spindle 14, the tool $T_1$ is inserted into the intermediate transfer means 17. Next, the tool holder transfer arm 16 is rotated counterclockwise by 90° so that the arm 16 returns to its original position. At this stage, the tool $T_2$ is subjected to its machining operation by a fresh command signal. On the other hand, the intermediate transfer means 17 holding the tool $T_1$ is turned counterclockwise so that the tool $T_1$ is carried to the position $X_1$. As the motion of the tool magazine 22 is subjected to synchronizing the motion of the spindle head 13, in spite of the machining operation, the tool $T_1$ is carried to the tool clamp device so as to be held by pawls in accordance with the motion of the hydraulic actuator 95. Next, the magazine disc 27 is turned two pitch advance (clockwise) by the index device (shown in FIGS. 7 and 8) so that the position $N_3$ is displaced to the position $X_1$. By a command signal, the fingers of the intermediate transfer means 17 are closed so as to grip the tool $T_3$, next, the intermediate transfer means 17 is turned in a clockwise direction to carry the tool $T_3$ to the original position $X_2$ and thereafter, is stopped. Next, the magazine disc 27 is turned counterclockwise by one pitch so that the position $N_2$ is displaced to the position $X_1$, consequently, the pawl releasing device 96 operates to open the turnable pawl 86. As mentioned above, the tool magazine 22 is turned with one pitch reverse motion and two pitch advance motion during the machining operation carried out by the spindle 14 in a synchronized condition with the spindle head 13, and after the completion of the machining operation, the used tool is returned to its original storage position of the magazine discs and the tool to be used for the succeeding machining operation is transferred to the intermediate transfer means 17. Consequently, a drawback of the conventional machine tool wherein the tools are carried back to their storage positions shifted by one pitch can be eliminated and an idling time required for interchanging tools can be minimized.

Further, any type of hydraulic motor which is capable of rotating the shaft 71 may be applied for the hydraulic motor 73 for driving the magazine disc 27. And any well-known mechanism for indexing the advance turning and the reverse turning with a predetermined pitch may be applied for the present invention.

INTERMEDIATE TRANSFER MEANS

Referring to FIGS. 14, 15 and 16, a rotatable shaft 102 is rotatably mounted in a supporting member 101 secured to an upper surface of the spindle head 13 so that the shaft 102 is arranged in a parallel condition to the spindle axis. A pinion 103 is secured to an intermediate portion of the shaft 102, and a flange 105 is secured to the supporting member 102 so as to fix the position of the pinion 103 with a collar 104. A piston 107 is slidably mounted in a cylindrical chamber 108 constructed in the supporting member 101, and a rack 106 formed at a middle portion of the piston 107 meshes with the pinion 103. The piston 107 is actuated by pressurized liquid supplied through a change-over valve 109 which may introduce the liquid to either side of the cylindrical chamber 108, whereby the pinion 103 and the shaft 102 is turned. An arm 110 of the intermediate transfer means 17 is secured to a projected portion of the rotatable shaft 102 and, a pair of clamp fingers 111a and 111b are turnably pivoted to a top-end portion of the arm 110 by pins 112a and 112b, respectively. Then, the intermediate transfer means 17 is turnable in a plane almost flush with the plane in which the tool magazine 22 or the spindle 14 rotates. Projected end portions of the clamp fingers 111a and 111b are provided with suitable forms for gripping a shank of the tool holder 28, further, a pin 113 for engaging with a key groove 91 of the tool holder 28 is formed to the holding finger 111b. Other end portions of the holding fingers 111a and 111b are provided with L-shaped curved portions are superposed to each other and are formed with a slot 116 through which a pin 115 is provided fixed on a rod 114 with a clearance. The rod 114 is connected to a piston 118 of a hydraulic actuator 117 disposed to the arm 110, therefore, the piston 118 is actuated by pressurized liquid which is controlled by a change-over valve 121 for supplying the liquid through one of conduits 119, 120 and discharging the liquid through the other thereof. The conduits 119, 120 are disposed to the shaft 102 and the arm 110. By the above-mentioned position of the piston 118, the fingers 111a and 111b are opened when the piston rod 114 is displaced downward as in FIG. 15, so that the gripping of the tool holder 28 is released. When the intermediate transfer means 17 is located at the position represented by a solid line, the fingers 111a and 111b are opened in upward and downward directions, respectively, while the fingers 111a and 111b are opened in a radial direction with respect to the tool magazine 22 when the intermediate transfer means 17 is located at the position represented by a chain line shown in FIG. 1. That is, the axis of the intermediate tool transfer means 17 is tangential with respect to the circular path of the tool magazine 22 at the first tool change position $X_1$. Therefore, the opened fingers 111a and 111b allow the free rotation of the tool magazine 22 even if it is loaded with tool holders 28.

Further, engaging pins 122a and 122b are held in the fingers 111a and 111b, respectively, in such a way that these pins 122a and 122b are urged outwardly by the respective compression springs 123a and 123b so that these are engaged with a thinner portion of the tool holder 28 so as to prevent the slipping out of the tool holder 28 from the gripping of the fingers 111a and 111b. Further, the tendency of tilting of the tool holder 28 can be prevented by holding the tool holder 28 at two portions thereof, by means of the holding fingers 111a, 111b and the engaging pins 122a, 122b. The arm 110 operates a pair of limit switches LS22 and LS23 at its terminal of the turning motion. The limit switches LS22 and LS23 are provided to confirm the fact that the intermediate transfer means 17 arrives at the tool change positions $X_1$ and $X_2$, respectively.

TOOL TRANSFER MECHANISM

Referring to FIGS. 17, 18, 19, 20 and 21, the mechanism and operative function of the tool transfer means 16 is illustrated as follows: A tool transfer cylinder 125 is secured to the spindle head 13 and a reciprocating hydraulic actuator 126 is formed in the cylinder 125 as shown in FIG. 17. A piston 127 is slidably mounted in the cylinder 125, piston rods 128 and 129 pass through the cylinder cover so that the outer-end portions of the piston rods 128 and 129 are projected to the outside of the cylinder cover. The piston 127 is capable of reciprocating by changing over the supply of the pressurized liquid by means of operating a change-over valve disposed to liquid passages 150 and 151 connected to rooms of both end sides of the cylinder 126. A turning shaft 130 is turnably engaged with an inside axial bore of the piston rod 128, a rotor member 166 is secured to an inside-end portion of the shaft 130 in an inside cylindrical room of the pistion 127 so as to form a liquid pressure rotation cylinder 131. The tool transfer means 16 comprises a pair of transfer arms 132a and 132b which are secured to the projected end portion of the shaft 130 by means of a key 133 and a nut 134 in such a way that the arms 132a and 132b are symmetrically arranged around the shaft 130 in a radial and are rotatably in a vertical plane almost flush with the plane in which the tool magazine 22 and the spindle 14 rotate. A pair of tool supporting devices 135a and 135b, having equal shape and construction, are mounted at both end portions of the arms 132a and 132b, respectively. Each of tool supporting device 135a and 135b comprises a hydraulic actuator 136 provided with a piston rod 137 disposed in the actuator 136 and a pair of fingers 139a and 139b which are turned by an action of a cam 138 mounted on an end portion of the piston rod 137. The fingers 139a and 139b are provided with an L-formed portion, respectively, and turnably pivoted to the tool transfer arm 132a (or 132b) by pins 140a and 140b, respectively. The insertion of the other ends of the fingers 139a and 139b into a space between the flanges 90 and 90a of the tool holder 28 is possible so that these end portions form a member for supporting the tool holder 28 when the fingers 139a and 139b are opened outwardly. The tool supporting device 135a or 135b supports the tool holder 28 by means of expanding the distance between the fingers 139a and 139b when the piston rod 137 is pushed toward an outward direction by a compression belleville spring 141 inserted behind the piston rod 137. When pressurized liquid is supplied through a liquid conduit 142 passing through the shaft 130 and the transfer arm 132a or 132b and the piston rod 137 so that the piston rod 137 is receded against the spring 141, the fingers 139a and 139b are closed so that the supporting of the tool holder 28 can be released.

At another end of the piston rod 129, a stopper 143 is mounted in such a way that the stopper 143 projects perpendicularly to the piston rod 129. As shown in FIG. 18, the stopper 143 is slidably engaged with a guide groove 145 made in a guide plate 144 secured to the spindle head 13. Therefore, the piston 127 is only capable of sliding toward its axial direction. Four liquid passages 146, 147, 148 and 149 are formed in the stopper 143 and the piston rod 129, the liquid passage 146 is connected to a passage 142 for pressurized liquid which actuates the tool supporting device 135, other liquid passages 147, 148 and 149 are connected with a port of a hydraulic rotary actuator 131. In the hydraulic rotary actuator 131, a pair of slide plates 152 and 153 are disposed at both sides of a circular chamber 154, the rotor member 166 is secured to the rotary shaft 130, while a turnable rotor member 163 is rotationably mounted in the circular chamber 154 so that the rotor member 163 is capable of turning within a predetermined angle. Further, a partition member 160 is secured to the piston 127 so that the circular chamber 154 is substantially divided into two rooms. The side plate 153 is provided with an arcuate groove 161 passing through thereof and extending in a range of 90°, a pin 162 engaging with the arcuate groove 161 is pressed into the turnable rotor member 163. Therefore, the rotor member 163 is capable of moving within the restricted space defined by the groove 161. Three ports 155, 156 and 157 are arranged at both side portions of the partition member 160 and at a contact position where the rotor member 166 and the turnable rotor member 163 are turned from the partition member 160 by 90°, respectively. Further, the port 157 is connected to a passage 165 connected to the arcuate groove 161.

When the transfer arms 132a, 132b are in a horizontal condition, as shown in FIGS. 1 and 9, the circular chamber 154 is filled up with pressurized liquid (particularly pressurized oil), thereby, the outlet of each port is closed. Or, the ports 155 and 156 may be applied by pressure and the port 157 may be connected with the oil reservoir. When the ports 155 and 156 are connected to the oil reservoir T and pressurized liquid is supplied to the port 157, the rotor member 166 is turned counterclockwise while the turnable rotor member 163 is turned clockwise as shown in FIG. 20, thereby the transfer arm 132 is turned counterclockwise so that the arm 132 is in a vertical condition. In this condition, the tools supporting device holds tools at its both ends. Next, the piston 127 is displaced in its axial direction so that the tool are withdrawn from the intermediate transfer means 17 and the spindle 14. When pressurized liquid is supplied to the port 155 and the ports 156 and 157 are connected to the oil reservoir T, the rotor member 166 is turned clockwise by 180° to thereby turn the transfer arms 132a and 132b within the same angle, FIG. 21 showing a state when the rotor member 166 has been turned by 180°. After the above-mentioned operation, the piston 127 is receded so that the tool holders 28 are inserted into the spindle 14 and the intermediate transfer means 17. When the ports 155 and 157 are connected to the oil reservoir T and the port 156 is supplied with pressurized liquid, the rotors 163 and 166 are turned counterclockwise to the state shown in FIG. 19 and when each part is connected to the oil reservoir T to maintain the state shown in FIG. 19, the tool changing cycle is completed. As mentioned above, 90° or 180° turning of the tool, and insertion or taking out of the tool can be carried out. Further, as the tool holder can be supported by expanding the intervened space between the holding fingers 139a and 139b so as to push the flanges of the tool holder 28 in an outward direction consequently, the tool transfer means 16 is capable of rotating even if the intermediate transfer means 17 loaded with a tool holder 28 is located at the tool change position $X_2$.

SPINDLE AND ITS INDEX

Referring to FIG. 22, the spindle 14 is rotatably supported by a pair of anti-friction bearings 169 mounted in a ram 168 slidably engaged with a bore 167 of the spindle head 13. The ram 168 locates at three different positions as hereinafter illustrated. The ram 168 is capable of sliding toward a horizontal direction. The spindle 14 is provided with a bore comprising a larger diametrical portion and a smaller diametrical portion providing a stepped portion therebetween.

A socket 171 for receiving a shank of the tool holder 28 is secured to an outside portion of the larger diametrical portion of the bore and the socket 171 is provided with a key 172 at its outside surface. The socket 171 is provided with a tapered complementary portion 170 as shown in FIG. 22. A sleeve 174 provided with a tapered portion at its entrance is disposed at a position between the socket 171 and the stepped portion of the bore, and a rod 176 is slidably engaged with the inside bore of the sleeve 173. Three balls 175 are supported by the rod 176 in the vicinity of the rod end in such a way that the balls 175 are capable of moving in a perpendicular direction with respect to the longitudinal axis of the rod 176. Further, the rod 176 is connected to a connecting rod 179 which is actuated by a motion of a piston 178 of a hydraulic actuator 177 disposed at a rear end of the spindle 14. When the piston 178 is displaced to push the rod 176 toward the socket 171, the balls 175 are also moved in the same direction and brought at a maximum diametrical portion of the tapered portion 173, on the other hand, when the pressure liquid in the hydraulic actuator 177 is discharged and the connecting rod 179 is receded by the force of a compression belleville spring 180, the rod 176 is also receded and the balls 175 are brought at a minimum diametrical portion of the tapered portion 173. Therefore, when the balls 175 are located at the minimum diametrical portion, the balls 175 are projected toward an inward direction so that the balls 175 are engaged with a constricted portion of the shank of the tool holder 28 and and tool holder 28 may be pulled inward by a force of the compression belleville spring 180, whereby the tool holder 28 is gripped by the spindle 14. And when the rod 176 is pushed, the tight engagement between the balls 175 and the constricted portion of the shank is released and the tool holder 28 may be taken out of the socket 171, since the balls 175 are movable in a perpendicular direction with respect to the longitudinal axis of the rod 176. A shaft 183 is rotatably engaged with a distributor 182 secured to a spindle head 13 in such a way that the shaft 183 is coaxially located behind the piston 178 of the hydraulic actuator 177. A pressurized fluid controlled by a change-over valve 181 is fed to a cylinder chamber of the hydraulic actuator 177 through the distributor 182 and a liquid passage perforated in the shaft 183. A dog 184 of magnet valve is secured on the outside of the hydraulic actuator 177 at a particular angular position with respect to the key 172 on the side surface of the spindle 14, so that a key groove of the tool holder 28 coincides with the key 172 when the tool holder 28 is inserted into the spindle 14 by means of the tool transfer arm 16. An approximate switch LS18 is disposed to a bracket which is secured to the spindle head 13 and situated at a selected position where, when the dog 184 corresponds to the switch LS18, the key 172 is almost brought to a predetermined position so as to coincide with the key groove of the tool holder 28. A gear 187 rotatably supported by the spindle head 13 by anti-friction bearings 186 and keyed on the spindle 14 so that the spindle 14 is driven to turn by the drive motor 39 (FIG. 2) on the workpiece is completed and then, the dog 184 approaches to the approximate switch LS18, the drive motor 39 is stopped. At this moment when the motor 39 is stopped, the angular position of the key 172 on the spindle 14 does not completely coincide with the key groove of the tool holder 28 which is carried to the spindle 14 to be inserted into the socket 171 since it is impossible to stop the spindle 14 precisely by the stop signal from the approximate switch LS18. As the angular position of the spindle 14 is approximately set, the correct angular position of the spindle 14 is indexed as illustrated as follows.

A cam shaft 188 of the spindle index means is rotatably mounted on the spindle head 13 so that the cam shaft 188 is rotated by a gear 189 which is rigidly mounted thereon, by means of meshing with the gear 187. An index cam 190 is formed on a circumferential portion of the cam shaft 188. The index cam 190 comprises a set of tapered portions 191 and a pair of straight portions 192 facing each other. An index pin 193 is secured to a piston rod 195 of a reciprocathydraulic actuator 194 mounted in the spindle head 13 and also slidably engaged with a guide rod 196 disposed to the spindle head 13 in a parallel condition with the spindle 14. The location of the straight portions 192 of the index cam 190 is so designed that the key 172 on the spindle 14 coincides with the key groove of the tool holder 28 when the index pin 193 enters into an intervened gap between two straight portions 192. By changing over the change-over valve 197, a piston 195 of the hydraulic actuator 194 is displaced so that the index pin 193 is displaced within the facing surface of the index cam 190. As already illustrated, the spindle 14 is already stopped at a desired angular position approximately, however, the cam shaft 188 is subjected to turn by contacting the index pin 193 with the tapered portion 191 of the index cam 190 in accordance with the displacement of the index pin 193, consequently, the spindle 14 is turned by way of the gear 189 meshing with the gear 187. When the index pin 193 enters into the gap between the straight portions 192 of the index cam 190, the rotation of these gears is stopped, and this stopped position of the spindle 14 is the desired correct angular position of the spindle 14. A pair of limit switches LS10 and LS11 are mounted on the spindle head 13 so as to confirm the starting position and working position for the precise indexing performance by the index pin 193.

Location of the ram 168 is regulated by means of a three position actuator 197 secured to the spindle head 13. Various tools such as drill, reamer, tap, and milling cutter, etc. are used for the present machine tool. These tools have various lengths, therefore, it must be considered that the length-difference between tools having a maximum and minimum length may be several tens centimeters. To operate the machine tool utilizing the above-mentioned various tools, it is required to move the table for a long distance by a numerical command signal and sometimes to pay a great attention to avoid chattering phenomena. Therefore, it is sometimes quite preferable to adjust the projected position of the spindle 14 for satisfying the above-mentioned requirements. The following is the illustration concerning the construction and the operative function of the mechanism for adjusting the projected position of the spindle 14 according to the present invention. To attain the above-mentioned purpose, a three positioning actuator 197 comprises a series of two straight motion hydraulic actuators 198 and 199 separated by an intervening wall. A piston rod 201 of a piston 200 of the hydraulic actuator 199 is projected into the cylindrical chamber of the actuator 198. A piston rod 203 of a piston 202 of the hydraulic actuator 198 is extended outward and secured to a bracket 204 depending from the ram 168 at its outside-end portion. Pressurized liquid is fed to or discharged from both side portions of the hydraulic actuator 198 through port 205 or 206 by means of change-over valve 204, and the rear-end portion of the hydraulic actuator 199 is provided with a port 208 for feeding and discharging pressurized liquid therethrough by way of a change-over valve 207. Further, the piston rod 201 is provided with a liquid passage 209 connecting the chambers of the actuators 198 and 199 to each other. As shown in FIG. 22, when the pressurized liquid is supplied to the port 205 and other ports are connected to the liquid reservoir T, the spindle 14 is positioned at its retreated position, and when the pressurized liquid is fed to the ports 205 and 208, as the effective area of the piston 200 is larger than that of the piston 202, the piston rod 201 pushes the piston 202 so that the spindle 14 is displaced in an outward direction by a distance which is equal to a stroke of the piston 200. This position is the second position of the spindle 14. Further, when pressurized oil is fed to the port 206, the ports 205 and 208 are connected with the reservoir T, the piston 202 is further displaced toward the advanced direction, the spindle 14 is positioned at its third position which is the most projected position. At this time, the piston 200 is subjected to recede. Limit switches LS17, LS16 and LS15 are disposed to the spindle head 13 to confirm the three positions, advanced position (third position), intermediate position (second position), retreated position (first position). As mentioned above, the positioning of the spindle 14 for driving a tool, automatic interchange of the tool, adjusting the position which is suitable for the tool, is carried out.

Further, the tapered portion 170 of the socket 171 is provided with a plurality of pressurized air blowing apertures 280 and pressurized air is supplied to these apertures 280 by way of a passage formed in a bearing cap 281 and the spindle 14. The jet air stream from the apertures 280 blows to a portion of the tapered surface as shown by a two dot chain line, and forms a spiral flow toward an outward direction so that an air flow in a thin-air layer along the tapered surface is formed. Consequently, dust or chips adhering to the tapered portion 170 and the tool holder 28 (tapered portion) are cleaned away at the time of interchanging tools, and the dust or chips are prevented from entering the tapered portion 170 of the socket 171 at the time when the tool is taken out from the socket 171. As described above, the engagement of a tool holder 28 with the tapered portion 170 of the socket 171 is very close so that degradation of the machining accuracy caused by inferior fitting can be prevented.

As shown in FIGS. 6 and 7, a pair of hinges 210 are secured to the magazine slide 23a and the magazine frame 23, respectively, in which the frame 23 is provided with an indexing mechanism, so that the magazine frame 23 is turnably pivoted by a hinge pin 211 inserted into the superposed hinges 210. By the above-mentioned construction, the magazine frame 23 is normally contacted with the front surface of the magazine slide 23a and can be turned by 90° from the front surface of the magazine slide 23a. A head portion of an engaging pin 213 is inserted in an aperture within an engaging block 215 secured to a side of the magazine slide 23a so that the frame 23 is maintained in its engaging condition with the front surface of the magazine slide 23a when the frame 23 contacts the magazine slide 23a. The pin 213 is restricted in its turning motion by a pin 212 at a side of the magazine frame 23. A rear end of the engaging pin 213 is pivoted by a pin to a top end portion of the arm 219 projected from a boss 218 secured to a branch shaft 216 of lever 217 secured to the base is capable of turning about the branch shaft 216 in a horizontal plane. The connecting pin 213 retreats toward a horizontal rearward direction by a horizontal turning motion of the lever 217 with the arm 219 so that the connecting pin 213 is withdrawn from the aperture of the engaging block 215. The above-mentioned elements form a latch means for holding engagement between the magazine frame 23 and the magazine slide 23a.

It is to be appreciated that the lever 217 may be disposed at a bottom end of the branch shaft 216 so that the engagement of the connecting pin 213 at an elevated position can be easily attained. A limit switch 220 is disposed at an adjacent position to a head of the connecting pin 213 in such a way that an actuating shaft of the limit switch 220 contacts the head of the connecting pin 213. The limit switch 220 is utilized for confirming the complete engagement of the magazine frame 23 with the magazine slide 23a by the complete insertion of the engaging pin 213 into the aperture of the connecting arm 215. As understood from the above-description, when the engaging pin 213 is withdrawn from an aperture of the connecting arm 215, the magazine frame 23 can be turned by 90° so that when the tools stored in the tool magazine are required to be changed due to the changes of machining operation on the workpiece, manual tool change operation can be effected with great ease, since an operator of the machine tool does not required to pay any attentions to the machine tool members such as the table and the saddle to change the tools.

CONTROL MEANS

Control means applied for the numerical controlled machine tool of the invention is hereinafter explained in detail.

In the block diagram of FIG. 23, a tape reader TR sends information on data programmed by means of utilizing magnetism or punching to a decoder (DC) which discriminates to separate the data into several informations such as table positioning, commanding the direction and speed of the feeding operation, commanding the interchange of tools, and other auxiliary informations and sends the required information to the respective control means. The numerical informations for positioning is precisely preset at corresponding places of a counter CO by way of a numerical data preset circuit DP. Further, the informations for commanding the direction and speed of the feeding operation are fed to a feeding control device FC so that operation of each driving system with respect to X, Y and Z axes (represented by XF, YF and ZF, respectively) is controlled. The information for commanding the interchanging of tools is fed to a tool interchanging device TCC so that operations of tool interchanging means comprising such as a tool magazine 22, intermediate transfer mechanism 17, tool transfer mechanism and gripping mechanism in the spindle and other auxiliary mechanism are controlled with a required relationship. Further, the other auxiliary informations such as an information for commanding the position of the ram 168, or rotation number of the spindle 14, and selecting the position of the turn-table 250 etc. are fed to a ram position control unit (AFC) and spindle control unit SDC and turn-table control unit BFC, respectively, to thereby control respective hydraulically and electrically operated parts, thereof. A main control circuit MC controls the start and stop of all the machine elements of the machine tool automatically, and contains means for actuating the start and stop of the tape reader TR, means for actuating the feeding control unit FC, tool interchange control unit TCC, ram position control unit AFC, spindle control unit SDC and turn-table control unit BFC individually.

As a drive motor for each of the above-mentioned driving systems, a hydraulic motor 306 provided with a hydraulic servo-valve controlled by a digital stepping motor 301 and an analogue motor 302 alternatively is utilized. The hydraulic motor 306 is actuated by the analogue motor 302 at high speed rotation thereof while it is actuated by the digital step motor 301 at low speed rotation thereof, the rotation number of the hydraulic motor 306 is detected by a position coder 308 and feedback pulses generated by the position coder 308 and corresponding of the rotation number of the hydraulic motor 306 are fed to the counter CO.

A checking circuit (PC) is disposed in a circuit between the position coder 308 and the counter CO, for responding to the feedback pulse and detecting any trouble of the position coder 308.

Each control circuit and the control system are hereinafter described in order.

NUMERICAL DATA PRESET CIRCUIT

Numerical data preset circuit according to the present invention is capable of reading binary coded numerical information recorded in a form of punched holes upon an information tape or on an information tape by means of magnetism from higher digit or lower digit in order, the read information is precisely preset in the places or digit of the respective counters by means of opening the respective preset gates corresponding to respective digits in sequence from higher digit or lower digit.

The detailed composition of the circuit is shown in FIG. 24.

The numerical data preset circuit comprises a tape reader TR for reading the numerical information or other information recorded upon an information tape, a decoder DC for discriminating or classifying the numerical information from the other informations, a counter CO for presetting the numerical information, a gate shift circuit GS for opening or closing gates $G_1$, $G_2$, ....... $G_5$ corresponding to each digit of the counter CO from higher digit in sequence.

The gate shift circuit GS comprises a NOT-circuit for inversing an output signal of the decoder DC, a delay circuit to delay the output signal of the not-circuit $NOT_1$, a differential circuit DIF for differentiating the output signal of the delay circuit TD so as to transfer the output signal of the delay circuit TD into pulse signals with a constant short duration, flip-flop circuits $FF_1$, $FF_2$ and $FF_3$ which are hereinafter illustrated in their operative function.

At every time when the tape reader TR reads numerals of the numerical information corresponding to certain digits thereof, the tape reader TR generates a signal NU, the output signals of the not-circuit $NOT_1$ corresponding to the inversion of the signals NU thereby, are represented by $\overline{NU}$. Therefore, the output signal $\overline{NU}$ of the NOT-circuit $NOT_1$ exists only when the tape reader TR does not generate the signal NU. An output signal [1] represented by binary coding shows the condition that the output signal exists hereinafter. The rising time of the signal $\overline{NU}$ is delayed for a predetermined time $t$, by the delay circuit TD, the output signal of which is transferred into a pulse signal having a constant short duration by the differentiation circuit DIF. The flip-flop circuits $FF_1$, $FF_2$ and $FF_3$ are inversed by this pulse signal to thereby generate the output [1] at the output terminals thereof $FF_1$-1,$\overline{1}$; $FF_2$-2,$\overline{2}$; $FF_3$-3,$\overline{3}$ alternatively respectively. The flip-flop circuits $FF_1$, $FF_2$ and $FF_3$ are connected to each other in series so that the second flip-flop circuit $FF_2$ is inversed by the output of the first flip-flip circuit $FF_1$, the third flip-flop circuit $FF_3$ is inversed by the output of the second flip-flop circuit $FF_2$ so as to work as a binary counter. The output terminals $FF_1$-1,$\overline{1}$; $FF_2$-2,$\overline{2}$; and $FF_3$-3,$\overline{3}$ are connected to and-gate circuits $G_1$, $G_2$, ......... $G_5$ so that one of these gates is opened or closed when a numerical read signal NU is fed, the opening or closing operation of these gates are sequentially shifted as $G_1$ to $G_2$, $G_2$ to $G_3$, $G_3$ to $G_4$ and $G_4$ to $G_5$ when the signal NU exist, i.e. when the tape reader TR has completed to read numerals corresponding to a digit and generates the signal NU. Numerical preset gates $G_{11}$, $G_{12}$, $G_{13}$, $G_{14}$ and $G_{15}$ are provided in order to correspond to each digit $S_1$, $S_2$, $S_3$, $S_4$ and $S_5$ of the counter CO, binary coded numerals of the numerical information $n_1$, $n_2$, $n_3$, $n_4$ and $n_5$ classified by the decoder DC are fed to the respective gates $G_1$, $G_2$, $G_3$, $G_4$ and $G_5$ so that the numerical preset gates $G_{11}$, $G_{12}$, $G_{13}$, $G_{14}$ and $G_{15}$ are opened or closed in accordance with the output signal of the above-mentioned gates $G_1$, $G_2$, $G_3$, $G_4$ and $G_5$. Consequently, the binary coded numerals $n_1$, $n_2$, ...... $n_5$ are preset to each digit $S_1$, $S_2$, $S_3$ $S_4$ and $S_5$ corresponding to the counter CO in sequence from higher digit. A control circuit NPC generates a reset signal RE at a time of completion of the numerical preset operation so that whole flip-flop circuits $FF_1$, $FF_2$ and $FF_3$ are inversed in negative sides $FF_1$-$\overline{1}$, $FF_2$-$\overline{2}$ and $FF_3$-$\overline{3}$. $G_6$ represents an and-gate circuit for confirming the above-mentioned preset operation, the input terminal of the and-gate $G_6$ is connected to the gate shift circuit GS so that when the succeeding five pulse signals PU are counted, in other words, when the flip-flop circuits $FF_1$, $FF_2$ and $FF_3$ generate their output signals [1]

at their output terminals $FF_1\text{-}\overline{1}$, $FF_2\text{-}\overline{2}$, $FF_3\text{-}\overline{3}$, respectively, the and-gate circuit $G_6$ is subjected to open. The output terminal of the and-gate circuit $G_6$ is connected to a not-circuit $NOT_2$ so that the output signal of the not-circuit $NOT_2$ is fed to a gate circuit $G_7$ for confirming the above-mentioned preset operation. A signal CR at a time of reading a final signal or boundary signal of a sequential data grouped as one block in the information tape and a signal NH for classifying the numerical information from the other auxiliary informations are fed to the gate $G_7$ so that, only when the numerals $n_1$, $n_2$, $n_3$, $n_4$ and $n_5$ given by the information tape are not properly preset to the digits corresponding to the counter CO at the time of reading the boundary signal of one block of datum, the gate $G_7$ is opened so as to inform the occurrence of trouble. Next, the process of presetting the command numerals $n_1, n_2, \ldots\ldots n_5$ to the counter CO by means of the above-mentioned circuit is hereinafter illustrated by way of a diagram shown in FIG. 25.

In a reset condition of the gate shift circuit GS by the reset signal RE, the flip-flop circuits $FF_1$, $FF_2$ and $FF_3$ are inversed to the negative sides or undersides in FIG. 24 so that outputs [1] are generated at the output terminals $FF_1\text{-}\overline{1}$, $FF_2\text{-}\overline{2}$ and $FF_3\text{-}\overline{3}$. In this condition, as the reading operation by the tape reader TR is not commenced, the numerical reading signal NU is in a condition [0], which represents the state that output does not exist, so that all the gates keep their closed condition. When the tape reader TR reads the numeral $n_1$ of the highest digit, the output of NU becomes [1] and the output terminals $FF_1\text{-}\overline{1}$, $FF_2\text{-}\overline{2}$ and $FF_3\text{-}\overline{3}$ is in [1] condition so that the gate $G_1$ is opened, next the gate $G_{11}$ is also opened, thereby the numeral $n_1$ is preset to a highest digit $S_1$ of the counter 10. When the reading of the numeral $n_1$ is completed, the inversed signal $\overline{NU}$ of the $NOT_1$ becomes a condition represented by [1], the output signal of the not-circuit $NOT_1$ is transferred to the pulse signal PU by means of the differential circuit DIF after delaying for a predetermined delay time by the delay circuit TD, then the flip-flop circuit $FF_1$ is inversed immediately. By the above-mentioned operation, when a numeral $n_2$ of the followed or second digit, the gates $G_2$ and $G_{12}$ are opened, thereby the numeral ($n_2$) is preset to the followed or second digit, as the outputs [1] are generated at the terminals $FF_1\text{-}\overline{1}$, $FF_2\text{-}\overline{2}$, $FF_3\text{-}\overline{3}$. When the reading of the numeral $n_2$ is completed, a pulse signal PU is applied to the flip-flop $FF_1$ so that the flip-flop circuit $FF_1$ is inversed to the negative side and the second flip-flop circuit $FF_2$ is inversed to the positive side or upperside in FIG. 24 by the output pulse of the flip-flop circuit $FF_1$. Consequently, the gates $G_3$ and $G_{13}$ are opened by the next read signal so that the numeral $n_3$ is preset to the $S_3$ digit of the counter CO. As mentioned above, the pulse signal PU is fed to the flip-flop circuits in accordance with the reading of the sequential numerals $n_4$ and $n_5$ so that the gate $G_4$, $G_{14}$ and the gate $G_5$, $G_{15}$ are opened in sequence, thereby the numeral $n_4$ is preset to the $S_4$ digit while the numeral $n_5$ is preset to the $S_5$ digit. When the reading of the minimum order digit $n_5$ is completed, the flip-flop circuits are inversed by the fifth pulse signal, thereby output signals represented by [1] are generated at the output terminals $FF_1\text{-}\overline{1}$, $FF_2\text{-}\overline{2}$, $FF_3\text{-}\overline{3}$, respectively, so that the gate $G_6$ is subjected to open. The output signal of the gate $G_6$ is inversed by a not-circuit ($NOT_2$) so that the signal is changed to a signal represented by [0]. If, the boundary signal CR is read by the tape recorder TR in a condition of presetting only numerals for four digits to the counter CO, the output signal represented by [1] of the not-circuit $NOT_2$ is added to the gate $G_7$, because the output of the gate $G_6$ is in a condition represented by 0, the gate $G_7$ is opened so that the output signal represented by [1] is generated at the terminal (CH), thereby, an occurrence of trouble is informed. As mentioned above, the gate for presetting numerals to the counter (CO) are shifted at every time of reading the numerical data, the data are properly preset to the respective digits corresponding to the digits of the read numerals, respecively, further the preset condition is detected whether the preset operation is carried out properly or not, and if any inadequate presetting is detected, the trouble is informed to the operator of the machine tool.

DRIVING MOTOR FOR FEEDING AND ITS CONTROL MEANS.

Referring to FIG. 26, the motor 301 is a digital type electric motor which is capable of turning with a unit angle in accordance with the input pulse, while the motor 302 is an analogue electric motor which is suitable for continuously rotating at high speed and any DC or AC servo-motor may be used for the purpose. These two electric motors 301 and 302 are connected to an input shaft 304 of a rotary servo-valve 303 by way of gear trains 321, 322, 323 etc. A pair of rotary valve means is incased in the servo-valve 303 so that the feeding direction of the pressurized oil and its flow rate are controlled when an input power for turning thereof is imparted, and one of the rotary valve means is connected to the input shaft 304 while the other rotary valve means is connected to an output shaft of the hydraulic motor 306 so that a mechanical feed-back is attained and the hydraulic motor 306 is rotated. Consequently, the turning direction of the hydraulic motor 306 is controlled together with speed in accordance with the input power imparted to the input shaft 304 so that the rotation of the hydraulic motor 306 follows the rotation of the input shaft 304 so as to carry out the feedback action toward a negative side, thereby the relative deviation between the above-mentioned pair of rotary valve means can be eliminated. And when the relative deviation between the above-mentioned pair of rotary valve means becomes zero, conduits which are provided in the servo-valve 303 for supplying pressurized liquid to the hydraulic motor 306 are closed and thus the rotation of the hydraulic motor 306 is stopped, the hydraulic motor 306 can be stopped with high positioning accuracy and controlled rapidly, since the rotation of the hydraulic motor 306 due to the inertia thereof does not exist so that the motor 306 is actuated by the pressurized liquid controlled by the servo-valve 303. Further, a small input force by the electric motor is amplified by the hydraulic pressure, thereby a large output torque can be obtained. The step motor 301 is preferably used in a zone of low speed rotation so that the motor 301 is capable of turning precisely by a predetermined angle in accordance with the input pulse, further, its accuracy of stopping is very fine. The above-mentioned analogue motor 302 is suitably used for high speed rotation, which is difficult to attain by the step motor 301, therefore, by means of utilizing the above-mentioned combination of the digital and analogue motors, a driving means, being suitable for high speed driving with extreme accuracy of positioning, and having high output torque which is easy to control, is constructed. A feeding screw 307 is connected to the output shaft of the above-mentioned hydraulic motor 306 so that the movable elements such as the table are displaced. The displacement of the movable elements is measured by means of a position coder 308 connected to the input shaft 304 through a meshing engagement between gears 323 and 326 or to one of the above-mentioned gear trains. In the above-mentioned combination of the digital and analogue motors, a damper 309 is additionally used for gradually decreasing the oscillating output of the step motor 301, if it is necessary to apply. Further, it may be possible to insert a clutch at a position between the analogue motor 302 and the input shaft 304 so that the connection between the rotation shaft of the motor 302 and the input shaft 304 is capable of being interrupted, thereby inertial moment of a rotor at a time of driving the step motor 301 is capable of being decreased.

The control system for controlling the feeding mechanism utilizing the above-mentioned servo-motor is illustrated by the following example with respect to a shaft represented by X. The same control system is applied to another shaft and a common control system (FC) for controlling the feeding control unit is operated so that one of these shafts is actuated. In a control system shown in FIG. 27, the numerical information numeral and speed command signal or other command signals are read by the tape reader TR, and discriminated by means of the decoder DC. The high digits (for example, the higher digits than the unit's place) of the numerical information are preset in a first digit counter COa of the counter CO while the low digits (for example, the lower digits than the unit's place) of the numerical information are preset in a low counter COb of the counter CO. Other numerical informations are fed to a control circuit 312. The above-mentioned position coder 308 generates coarse pulses at every displacement of the saddle 3 by 1 mm. When the second coarse pulse is generated by the above-mentioned position coder 308 after the start motion of the saddle 3 at a low speed, the displacement speed of the saddle 3 is changed from a low speed to a high speed i.e., the hydraulic motor 306 is actuated by the analogue motor 302 instead of the digital motor 301. The high digit counter COa counts the coarse pulses generated by the position coder 308 so that the numerals stored therein are subtracted one by one. And an operation of a comparator 314 is illustrated by the following example, that is, when the numerals $N_1$, $N_2$ and $N_3$ stored, COa become predetermined values 013, respectively, in the high digit counter, the comparator 314 is arranged to generate a reduced signal P for gradually decreasing the rotation number of the analogue motor 302, when the numerals become 003, the circuit 314 generates a signal R for releasing the reduced signal P, further, when the numerals becomes 001, the comparator 314 generates a signal C to change the analogue motor 302 to the digital motor 301, whereby the rotation of the hydraulic motor 306 is changed frmo high to low.

The above-mentioned condigit counter COb counts an input pulse fed to the digital motor 301 and subtracting preset numerical data from the lower digit numerals in sequence. And, when the subtracted numerals of the second counter COb and the first counter COa become zero, the second counter COb generates a stop signal S. These signals P, R, C and S are fed to the connected elements when the numerals in the counter CO coincide with the preset numerals of the comparator 314. In the above-mentioned composition of the circuit, the indexing operation of the saddle 3 is hereinafter illustrated; the numerals $n_1$, $n_2$, $n_3$ which are considered as a higher digit numerals of a series of numerals $n_1$, $n_2$, $n_3$, $n_4$ and $n_5$ are preset in the high digit counter COa while the numerals $n_4$ and $n_5$, which belong to lower digits, are preset in the second counter COb. Now, supposing a case of commanding the feeding represented by numerical information 071.54, the numerical information of 071 is preset in the first counter COa and that of 54 is preset in the second counter COb. In accordance with a start signal, a pulse gate 317 is opened so that pulses from a pulse generator 316 are fed to the digital motor 301, thereby the digital motor 301 is commenced to rotate. The input shaft 304 is rotated by the digital motor 301 through the gear train and thus, the servo valve 303 connected to the shaft 304 is actuated by the digital motor 301 resulting in the introduction of pressurized liquid to the hydraulic motor 306 so that the hydraulic motor 306 is rotated following the rotation of the digital motor 301 at a low speed. Thus, the low speed feeding motion of the saddle 3 is commenced. The digital motor 301 operates for displacing the saddle 3 by 0.01 mm in accordance with receiving every one pulse. The pulses which are the same in the pulse number applied to the digital motor 301 are supplied to the second counter COb through the gate 318 so that the numerals stored in the counter COb are subtracted in accordance with the supplied pulses. When a point for actuating the motion is located at a point $S_1$ which is situated before a position for detecting the first coarse pulse by 0.36 mm, the numeral of the second counter COb is subtracted by 136 during a period between the point $S_1$ and a point $S_2$ located at a position for detecting a second coarse pulse. By the above-mentioned operation, the numeral of the counter CO become 070 in higher digit counter COa and 18 in lower digit counter COb. When the second coarse pulse is generated at the point $S_2$ by means of the position coder 308 the gate 318 is closed while a gate 319 is opened. The control circuit 312 simultaneously interrupts the supply of the pulses to digital motor 301 so that a rotor thereof is subjected to be free, and an electric circuit 315 is connected to the analogue motor 302. When the servo valve 303 is actuated by the analogue motor 302, the large displacement between a pair of the valve elements incased in the servo valve 303 is produced and thus, the large quantity of pressurized liquid is supplied to the hydraulic motor 306, whereby the hydraulic motor 306 is rotated at high speed in a following condition to the analogue motor 302 resulting in high speed feeding motor of the saddle 3. In the above-mentioned operation, a rotor of the digital motor 301 is synchronously rotated in accordance with the rotation of the analogue motor 302. When the coarse pulse is detected by the position coder 308, the numerical preset to the first counter COa is subtracted at every detection of one pulse generated by the position coder 308. These coarse pulses are generated one by one, for example, at every 1 mm displacement of the saddle 3. When the coarse pulses are counted 57 times and the saddle 3 arrives at position $S_3$, the numeral of the first counter COa becomes 013 which coincides with the preset value in the comparator 314, and a command signal P is generated by the comparator to reduce the rotation speed of the analogue motor 302 gradually by a DC damping device or antiphase damping device provided in the motor 302. When the numeral of the first counter CO$a$ becomes 003 at a position S$_4$, in accordance with gradually reducing the rotation speeds of the analogue motor 302 and the hydraulic motor 306 and detecting the coarse pulses in sequence by means of the position coder 308, the DC damping or antiphase damping imparted to the analogue motor 302 is released and the hydraulic motor 306 continues to rotate by its inertia. And when the coarse pulse at a position S$_5$ is generated by the position coder 308 and the numeral of the first counter CO$a$ becomes 001, the pulse gate 317 is opened so that a pulse is fed from the pulse generator 316 to the digital motor 301. When the pulses are fed to the digital motor 301, the motor 301 commences to rotate so that the rotation of the hydraulic motor 306 follows the step motor 301 at lower speed. During the low speed feeding of the saddle 3, the remaining numeral of the second counter CO$b$ is reduced one by one at every one pulse in accordance with the input driving pulse, imparted to the digital motor 301. That is, numeral 18 is preset to the second counter CO$b$ while the numeral 001 is preset to the first counter CO$a$. When the pulses corresponding to the numeral 118 are fed to the digital stepping motor 301 after generating the coarse pulse at a position S$_5$, in other words, when the saddle 3 is displaced at a low speed by 1.18 mm from the position S$_5$, the preset numerals of the first and second counters CO$a$, CO$b$ become zero whereby the comparator 314 generates a command signal S for stopping the motion of the digital motor 301. By this signal for stopping, the control circuit 312 closes the pulse gate 317, thereby the driving of the step motor 301 is instantly stopped and the indexing of the saddle 3 is carried out. In the same way as mentioned above, the succeeding indexing operation is also positioned, therefore, the indexing of the saddle 3 is accurately carried out at a predetermined position even though the motion of the saddle 3 commences at any starting position. That is, a distance between the positions S$_1$ and S$_2$, and a distance between positions S$_5$ and S$_6$ are controlled by counting the driving input pulse, the distance between the positions S$_2$ and S$_5$ are controlled by counting the coarse pulse, the operations between the positions S$_1$ and S$_2$, S$_5$ and S$_6$ are carried out by utilizing the digital motor such as the electric step motor 301 which is capable of stopping its rotation instantly with high accuracy, while the operation between the positions S$_2$ and S$_5$ is carried out by utilizing an analogue motor such as an AC or DC motor, which is capable of rotating at high speed together with the common hydraulic motor 306, which follows the rotation of these motors.

When the saddle 3 is displaced from S$_7$ to S$_8$, for example, displaced by 8.24 mm as shown in FIG. 29, the electric step motor 301 continues to rotate at only a low speed by means of imparting pulses corresponding to 824 until the numerals 008 and 24 preset to the first counter CO$a$ and the second counter CO$b$ becomes zero. Further, in case application of a so-called straight line cutting operation is carried out in a predetermined distance of displacement of the saddle 3 without applying a high speed displacement of the saddle 3, it is easily carried out in the following way, that is, the command information of low speed feeding is only recorded in the information tape, therefore, when the information of low speed feeding is applied, the electric circuit for high speed feeding contained in the control circuit 312 is diengaged so as to cnacel the high speed feeding operation.

In the above-mentioned embodiment, the feeding speed of the movable member such as the saddle 3 at a low speed is controlled by the action of the second counter CO$b$ actuated by the input pulse imparted from the pulse generator 316, however, the above-mentioned control may be carried out by a position coder which is capable of generating so-called density of fine pulses. Further, in the above-mentioned embodiment, the low speed feeding of the saddle 3 is changed over to a high speed feeding when the second coarse pulse is generated by the position coder 308, however, it is also possible to change the feeding speed of the saddle 3 from a low speed to a high speed at a time of detecting the first coarse pulse.

The above-mentioned driving means comprises the digital motor such as an electric step motor having an excellent ability for stopping the driving of the motor at a precise condition and at least one analogue motor such as an AC motor or DC motor which is capable of rotating at a high speed, a servo-valve is actuated by one or both of the motors so that the servo-valve is actuated for distributing the pressurized oil to the hydraulic motor, and the hydraulic motor rotated for following the above-mentioned electric motor, thereby the movable member is moved by the rotation of the output shaft of the hydraulic motor.

Therefore, the high speed rotation for a high speed feeding and an accuracy for stopping the rotation in the positioning operation are satisfied by utilizing the above-mentioned combined motor and a servo-motor provided with a hydraulic motor. It is one of characteristic features of the numerically controlling machine tool of the present invention that the capacity of the analogue motor such as an AC ro DC motor may be sufficiently small because it only requires a small capacity to actuate the servo-valve. The digital motor such as an electric pulse motor having a small rotation torque may be used for the present invention. Therefore, the driving means utilizing a compact and economic servo motor may be applied for the present invention.

POSITION CODER TROUBLE DETECTING CIRCUIT

A circuit of a position coder trouble detecting circuit of the present invention is shown in FIG. 30. Generally, by utilizing the position corder trouble detecting circuit, a period of generating pulse by the position corder is compared with a predetermined set time, if after lapse of a period between a starting signal or starting signal of the machining operation and the set time, there is no pulse, an information of occurring trouble, such as lighting an alarm light, is given. Referring to FIG. 30, the circuit comprises a flip-flop circuit FF$_{10}$ which is inversed by a pulse generated at the position coder 308 so as to generate an output signal corresponding to the pulse from the position coder 308, and-gate circuits GA$_1$ and GA$_2$ for receiving the output signal from the flip-flop circuit FF$_{10}$ and a signal such as a starting signal or starting signal for the machining operation applied from an input terminal (e), a pair of delay circuits TD$_1$ and TD$_2$ for delaying the set time, an or-gate circuit connected with the output terminals of the delay circuits $TD_1$ and $TD_2$. The output pulse generated by the position coder 308 is fed to an input terminal (a) of the flip-flop circuit $FF_{10}$.

Each time a pulse arrives at the input terminal (a), the flip-flop circuit $FF_{10}$ is inversed so that output an equal signals of square form represented by (b') and (c') in FIG. 31 corresponding to pulse period $t_{10}$ are generated. Command signals, such as a starting signal or signal for commanding the machining operation are fed to the input terminal (e) having an input wave form E' shown in FIG. 31. If an input signal is imparted to the input terminal (e), the and-gate circuit $GA_1$ or $GA_2$ is opened so that the delay circuit $TD_1$ or $TD_2$ is energized. However, as the set period $t_{20}$ of the delay circuit $TD_1$ and $TD_2$ is set in a condition of longer than the maximum value of the pulse period $t_{10}$ in a normal operating condition, the delay circuits $TD_1$, $TD_2$ are disenergized in every pulse period $t_{10}$ so that any output signal is not generated at the output terminal (d). If, the input terminal (a) does not receive any input pulse because of a certain trouble of the position coder, the flip-flop circuit $FF_{10}$ is not subjected to inverse so that the and-gate circuit $GA_1$ or $GA_2$ is maintained in its opened condition and when the set time of the delay circuit $TD_1$ or $TD_2$ is up, the output signal is generated at the output terminal (d), thereby, the information of the trouble can be obtained. The and-gated $GA_1$ and $GA_2$ are disconnected when the input terminal (e) does not receive any command signal, therefore, the delay circuits $TD_1$ and $TD_2$ are not energized so that the detecting circuit PC is not actuated. The pulse period $t_{10}$ of the pulse generated by the position coder 308 is varied in accordance with the displacement speed of the movable members, however, the maximum period is restricted. That is, the pulse period generated at a time of minimum feeding speed of the movable members becomes maximum. As the set time $t_{20}$ of the delay circuits $TD_1$, $TD_2$ is set in a larger condition than the maximum period of the pulse $T_{10}$, alarming information is generated only at a time of position coder trouble.

In the above-mentioned embodiment, as the generated pulse of the position coder is directly detected and its period is compared with the predetermined set period, any troubles of the position coder can be detected without fail. Moreover, the detecting circuit PC according to the present invention may be applied to find the position coder trouble without anything to do with the kind and type of the position coder, if it generates pulses in accordance with the rotation of the hydraulic motor 306.

HYDRAULIC CIRCUIT

The hydraulic circuit applied to the numerically controlled machine tool of the present invention is hereinafter illustrated. Referring to FIGS. 32 and 33, the hydraulic circuit is composed of four hydraulic circuit systems. One of these systems is a high pressure circuit comprising a hydraulic pump 231 driven by an electric motor 230 so that a liquid is sucked from the reservoir T for supplying pressurized oil to a conduit 233 after adjusting the liquid pressure by a pressure relief valve 232. The pressurized liquid is fed to hydraulic motors 306a, 306b and 306c, and the hydraulic actuator 177 for clamping the tool in the spindle and a hydraulic actuator 197 for controlling the ram position, from the pressure relief valve 232. Another system is a medium pressure circuit provided with a pressure reducing valve 234 for reducing pressure of liquid supplied from the conduit 233, the medium pressurized liquid being fed to hydraulically operated portions of a turn table central means BF through a conduit 235. Another system is supplied with pressurized liquid of middle pressure and provided with a pump 237 driven by an electric motor 236 for sucking liquid from the reservoir T and a pressure relief valve 238 for regulating the liquid pressure fed by the pump 237. The medium pressurized liquid is supplied to each hydraulic actuator of the automatic tool interchange device of the invention through a conduit 239. Still another system comprises a pump 240 driven by the electric motor 236 for sucking liquid from the reservoir T, and a conduit 241 for supplying pressurized liquid to the hydraulic balancing actuator 34. The pressure of pressurized liquid discharged from the pump 240 is regulated by the relief valve 53 so that the total weight of the spindle head 13 and the total magazine 22 is balanced with a force produced by the hydraulic balancing actuator 34.

ELECTRIC CIRCUIT

The electric circuit for controlling the operation of the machine tool of the present invention is shown in FIGS. 34 to 40. AC power lines J, K and L are connected to a motor circuit by way of a no-fuse switch NF and a thermal relay TY1 and the supplied AC voltage is transferred by a transformer TF. Power lines $A_1$ and $A_2$ are applied with the transferred AC voltage, a solenoid for changing over a change-over valve of the hydraulic actuator is connected to the power lines $A_1$ and $A_2$. The AC current applied to power lines $A_2$ and $A_3$ is rectified into DC current by a rectifier SE so that the DC voltage is applied between lines $C_2$ and $C_1$. The line $C_2$ is connected in series to a contact CRS which is capable of being closed by a start signal. Further, a line $C_{21}$ is connected in series to the contact CRS. The lines $C_{21}$ and $C_1$ are connected to electric elements, respectively.

In FIGS. 34 to 40, numerals are indicated at each left power line of the electric circuits for convenience to find electric elements to be connected and designated hereinafter as, for example, (position 100), (position 101) etc. Further, each relay coil is represented by a mark CR surrounded by a circle and the contact or contacts of each relay coil are represented by the same mark as the relative coil together with the contact number. Further, each of limit switches is connected to a relay coil (not shown in FIGS.), whose relay contact or contacts are shown in Figs. with the reference mark representing the relative limit switch together with the mark CR. Each of limit switches is also connected to a relay coil (not shown in Figs.), whose relay contact or contacts are shown in Figs. with reference marks representing the relative limit switch together with the mark CR. Further, contacts which are opened or closed in accordance with a command signal from the tape are shown by a mark –☐ ☐– so as to discriminate them from the other relay contacts. So-called interlock contacts are almost omitted and only main elements required to construct the electric circuit are shown.

SPINDLE DRIVING CONTROL MEANS

Reffering to FIG. 34, a motor for driving the spindle 14 is represented as M1 which corresponds to the motor 39. Normal or inverse direction and its stopping operation of the motor M1 are controlled by information recorded on the tape, a relay CRMIA is energized by closing a contact MO3, and a contact CRMIA-1 of an electric source of the motor M1 is closed so that a circuit for rotating the motor M1 toward a normal direction is connected to the electric source, thereby, the spindle 14 is rotated toward a normal direction. When a contact MO4 is closed, a relay CRMIB is energized and a contact CRMIB-1 is closed so that a circuit for rotating the motor M1 towards a reverse direction is connected to the electric source, thereby, the spindle 14 is rotated towards a reverse direction. In the above-mentioned conditions, a brake coil BM1 is connected to the electric source so that the braking action of the brake coil BM1 is released.

During the operation of the tool interchange, it is required to stop the rotation of the spindle 14. A normally closed command contact MO6 to generate the automatic tool interchange operation is provided at a line designated as E100 and connected to a pair of relays CRMIA and CRMIB in series. A normally closed contact CRLS18-1 of the switch LS18 for responding to the magnetic dog 84 is connected to the line (E100) in a parallel condition with the normally closed command contact MO6. By tape information, the contact MO6 is opened and the switch LS18 is opened in a condition responding to the motion of the magnetic dog 84 so that both relays CRMIA and CRMIB are deenergized and their relative contacts are opened so as to interrupt a circuit which connects the motor M1 to the electric source and simultaneously to disengergize the brake coil BM1, thereby, the spindle 14 is subjected to stop instantly at its predetermined position. After stopping the spindle 14, the indexing operation at a predetermined position of the spindle 14 is carried out as hereinafter illustrated.

MEANS FOR INDEXING THE TURN-TABLE

A hydraulic circuit for carrying out the indexing operation of a turn-table 250 and its electric circuit are shown in FIGS. 32 and 35, respectively.

In the block diagram shown in FIG. 32, the above-mentioned hydraulic and electric control circuits are represented as turn-table control unit BFC. The indexing operation of the turn-table 250 is carried out in accordance with a command signal by means of tape information. In the electric circuit of FIG. 35, a command contact M10 for sending a command signal for carrying out the normal indexing operation and a command contact M11 for carrying out the inverse indexing operation are inserted. Now, when the command contact M10 is closed by a command signal from the tape, the indexing operation of the turntable 250 is carried out as follows.

A knock pin 251 for the turn-table 250 is disposed in the hydraulic circuit shown in FIG. 32. Pressurzied liquid supplied from the hydraulic pump 231 is fed to a lower chamber 253a of a hydraulic actuator 253 through a change over valve 252 so that a piston 254 is pushed in an upward direction to engage with an indexing groove 263 formed on the turn-table 250. By the engagement between the knock pin 251 and the groove 263, the pressure is built up in a conduit to the lower chamber 253a to thereby actuate a pressure switch PSB2 resulting in closing of a relative contact CRPSB2-1 located at a line E103 in FIG. 35. A normally closed contact CRB2-1 is closed when the normally closed contact CRPSB2-2 of the pressure switch PSB2 is opened so that the relay CRB2 is disenergized (at a position E110). As a normally closed contact CRPSB2-2 associated with a pressure switch PSB2 is opened so that the relay CRB2 is disenergized, the normally closed contact CRB2-1 is closed. A relay CRB1 arranged at a position designated by E103 is energized in accordance with closing of the command contact M10 or M11 and the energized condition of the relay CRB1 is held by means of its contact CRB1-1 (the continuation of energization of a relay coil by means of its contact is referred to as "self-held" hereinafter) CRB1-3 arranged at a pposition designated by E200 is closed so that a solenoid SOLB1 is energized to change over a change-over valve 252 to the left hand direction, thereby, liquid is supplied to an upper chamber 253b of the hydraulic actuator 253 so that the piston 254 is pushed in a downward direction so as to release the engagement of the knock pin 251 from the indexing groove 263 of the turn-table 250. A port 255 located at an intervened wall of the hydraulic actuator 253 is opened in accordance with the displacement of the piston 254, liquid is supplied to a cylinder 258 for connecting a shaft of a hydraulic motor 256 and a worm 257 so that the axial displacement of the shaft of the hydraulic motor 256 and the worm 257 are prevented. The confirmation of releasing the knock pin 251 from the indexing groove 263 is carried out by a pressure switch PSB1 so that a contact CRPSB1-2 arranged at a position designated by E104 is closed. A relay CRB3 is energized and self-held, whereby a solenoid SOLB3 arranged at a position designated by E202 is also energized. By changing-over a change-over valve 260 toward a left direction in FIG. 32, liquid is supplied to a left side port of the hydraulic motor 256, the turn-table 250 is rotated toward the normal direction by way of the worm 256 and a worm gear 259 meshing with the worm 257. A disc 262 is provided with recesses 262a at indexing positions of the turn-table 250 so that a limit switch LSB1 is actuated by the recesses 262a at every turning of approximatly 90°, thereby, a contact CRLSB1-2 arranged at a position represented by E110 is closed. Before opening a normally close contact CRLSB1-1 arranged at a position represented by E108, a contact CRB5-2 of a circuit including the contact CRLSB1-2 is closed because a relay CRB5 is energized by self-holding, a pressure switch contact CRPSB1-3 is also closed for confirming the releasing of the knocking motion of the knock pin 251 so that the relay CRB2 is energized and a solenoid SOLB2 arranged at a position represented as E201 is energized. By changing over the change over valve 252 toward a right direction in FIG. 32, the liquid is fed to the lower chamber 253a so that the knock pin 251 is pushed in an upward direction. Consequently, the knock pin 251 is inserted into the indexing groove 263 of the turn-table 250 so that the angular position of the turn-table is adjusted to a regular position defined by the above-mentioned engagement of the knock pin 251. In accordance with the above-mentioned adjustment, the upper chamber 253b and the port 255 of the hydraulic actuator 253 are connected to the reservoir T by way of the change-over valve 252, and the liquid in the cylinder 258 is led to the reservoir T so that the axial displacement of the worm 257 is permitted and delicate movements of the turn-table 250 and the worm gear 259 are also permitted. When the knock pin 251 is completely engaged with the indexing groove 263, the liquid pressure in the lower chamber 253a of the hydraulic actuator 253 is increased so that the contact CRPSB2-2 of the pressure switch arranged at a position represented by E110 is opened, however, the above-mentioned opened condition is kept by the command contact M10 or M11, and the condition of the change-over valve 252 is also maintained so that the knock pin 251 continues to be pushed upward. When the piston 254 is engaged with the engaging groove 263, the liquid is supplied to a clamp actuator 264 from an opened port 263 so that the turntable 250 is clamped. As mentioned above, the command contact M10 or M11 is closed in accordance with the command signal from the tape, the normal indexing or inverse indexing operation of the turn-table 250 is carried out by approximately 90°, very precise indexing operation is carried out by floating of the worm 257 in accordance with the above-mentioned compensating action to the regular indexing position by the knock pin 251.

MEANS FOR CONTROLLING POSITION OF THE RAM

The hydraulic circuit for controlling the position of the spindle ram 168 is shown in a right half portion of the drawing of FIG. 32, while the electric circuit related to the ram is shown in FIG. 36. The position of the spindle ram 168 can be regulated at three-stepped positions. Hydraulic actuating means comprising a pair of hydraulic cylinders having different strokes and arranged in a series is utilized for the hydraulic actuating means adopted for the machine tool according to the present invention. The three position actuator 197 of the above-mentioned hydraulic actuating means is provided with triple liquid supply conduits which are changed over in accordance with command contacts MO7(contacts used for rotation of the ram 168 toward original position thereof), MO8 (contacts used for rotation of the ram 168 at an intermediate position) and MO9(contacts used for rotation of the ram 168 at an advanced end position thereof). Further, it is capable of retracing the ram 168 toward the original position thereof by means of utilizing a command contact M06 arranged at a position represented by E112 for actuating the automatic tool interchange operation.

Next, the ram position control operation without providing a command signal for actuating the automatic tool interchange operation is hereinafter illustrated. When a command contact MO7 is closed by a command signal, a relay CR150 arranged at a position represented by E112 is energized, contacts CR150-5 and CR150-7 arranged at positions E120 and E122, respectively, are closed so that relays CR156 and CR158 are energized, and solenoids SOL16 and SOL18 arranged at positions represented by E205 and E207, respectively, are energized.

The change-over valve 204 is changed over to the left side in FIG. 32 so that liquid is supplied to a front chamber of the hydraulic cylinder 198 provided with a longer stroke, further, the change-over valve 207 is changed over to the left side in FIG. 32 so that a rear chamber of the hydraulic cylinder 199 provided with a shorter stroke is connected to the reservoir T, thereby, the pistons 202 and 200 are pushed backwards, when these pistons 202 and 200 come to their rear-end positions, a dog disposed to a piston rod of the piston 202 pushes the limit switch LS15 so that a normally closed contact CRLS15-1 associated with LS15 is opened and the relay CR150 is disenergized. By the above-mentioned operation, contacts CR150-5 and CR150-7 are opened, but, the energization of the relays CR156 and CR158 are kept by the contacts CRLS15-5 and CRLS15-7 associated with the limit switch LS15 which is operated at the time when the ram 168 is located at the original position so that the energized conditions of the solenoids SOL16 and SOL18 and the conditions of the change-over valves 204 and 207 are maintained, thereby, the original position of the ram is maintained. Further, in case the command contact MO6 used for effecting the automatic tool interchange operation is closed, similar operations to the above-mentioned one is also carried out.

Next, a case of closing the command contact MO8 is considered. In this case, a limit switch contact CRLS15-2 arranged at a position represented by E115 is closed at the original position of the ram so that a relay CR151 is energized and self-held. A relay contact CR151-6 arranged at a position represented by E121 is closed so that a relay CR157 and a solenoid SOL17 arranged at a position represented by E206 are energized. Therefore, the change over valve 207 is changed over to a right side in FIG. 32 so that liquid is supplied to a rear chamber of the hydraulic actuator 199. A pushing force applied to the piston 200 is largar than that applied to the piston 202 because the working area of the piston 200 is larger than that of the piston 202 by a cross-sectional area of the piston rod. Therefore, the ram 168 is displaced toward a left side in FIG. 32 and stopped at an intermediate position defined by an end of the stroke of the piston 200. At this time, the dog leaves its original position from the limit switch LS15 and pushes a limit switch LS16 positioned at an intermediate position. Therefore, a limit switch contact LS15-3 arranged at a position represented by E117 is in an opened condition. Consequently, even though a command contact MO9 is closed in its intermediate condition, a relay CR152 is not energized. The ram 168 is displaced to its advanced end position only in the case where the dog has retraced its original position so as to close the contact CRLS15-3. An operation for displacing the ram 168 to its advanced-end position is carried out as follows: that is, first, a relay contact CR152-4 arranged at a position represented by E119 is closed by energizing the relay CR152 so that a relay CR155 and a solenoid SOL15 arranged at a position represented by E204 are energized, and the change-over valve 204 is changed over to a right side in FIG. 32 so that liquid is supplied to a rear chamber of the hydraulic actuator 198 provided with a longer stroke. By the above-mentioned operation, the piston 202 is displaced to its advance position so that the ram 168 is displaced to its advanced-end position, thereby, the limit switch LS17 is pushed, and a contact CRLS17-4 arranged at a position represented by E119 is closed so that the connected condition of the relay CR155 is maintained. In spite of locating the ram 168 at its intermediate position or its advanced-end position, the ram 168 is retraced to its original position by means of energizing the relay CR150 when the command contacts MO6 or MO7 are closed. And the automatic tool interchange operation is carried out after completion of the above-mentioned retracing operation of the ram 168. When the tool interchange operation is completed, the ram 168 is displaced by a command signal from the tape so that the ram 168 is positioned at a predetermined accurate position defined by strokes of the pistons 200 and 202.

MEANS FOR CONTROLLING SPINDLE INDEXING OPERATION

In the automatic tool interchanging operation, it is required to angularly index the spindle at its required position to engage a key groove of a tool holder with a drive key projected from a side surface of the spindle. The means operated by operating pressurized liquid for indexing the spindle is shown as a hydraulic actuator 194 and the change-over valve 197 in FIG. 33, and its electrical control circuit is shown in FIG. 37. The operation for indexing the spindle is operated by closing the command contact MO6 as hereinafter illustrated.

The spindle 14 is stopped approximately at its predetermined position by means of the spindle drive control circuit shown in FIG. 34, then after, a delay timer contact CRTRBR-1 of a timer coil for confirming stopping the spindle 14 and arragned at a position represented by E123 is closed with a predetermined delaytime. A retracing operation of the ram 168 is simultaneously carried out so that the limit switch LS15 is pushed at the original position of the spindle 14, thereby, a contact CRLS15-8 is closed. As a contact CRLS10-1 of a limit switch LS10 is closed at the original position of the piston rod 195 of the hydraulic actuator 194, a relay CR111 arranged at a position represented by E124 is energized, thereby, its contact CR111-2 is closed so that a solenoid SOL12 is energized. The changed over valve 197 is changed over to a right side in FIG. 33, so that the liquid is supplied to a right-side chamber of the hydraulic actuator 194, thereby, the piston rod 195 is displaced to a left side. Consequently, the index pin 193 is engaged with a cam which moves together with the spindle 14 so that the cam is turned and the indexing of the spindle 14 at the predetermined position is carried out at the stroke end of the piston rod 195. A limit switch LS11 is pushed at the stroke end of the piston rod 195 so that a normally closed contact CRLS11-1 arranged at a position represented by E124 is opened, thereby, a relay CR111 is disenergized. Consequently, the relay contact CR111-2 is opened so that the solenoid SOL12 is disenergized. The change-over valve 197 is changed over to a right side by means of a spring, the liquid is supplied to a left side chamber of the hydraulic actuator 194, thereby, the piston rod 195 is displaced to a right side in FIG. 33, so that the piston rod 195 is returned to its original position. As mentioned above, the spindle 14 is stopped approximately at a predetermined position by means of utilizing the limit switch LS18 which is actuated by the dog 184 and this indexing operation of the spindle 14 is carried out after completion of the retracing motion of the ram 168 to its original position.

SPINDLE TOOL CLAMPING MEANS

The spindle tool clamping means according to the present invention is operated so as to clamp or unclamp the tools in a related condition to each operation of the automatic tool interchange means. The hydraulic actuator of the spindle tool clamping means is shown as the hydraulic actuator 177 in FIG. 32. The clamping operation is carried out by utilizing a spring force while the unclamping operation of the tool is carried out by means of utilizing a liquid pressure applied to the piston 178 of the hydraulic actuator so as to compress the spring. The above-mentioned clamping or unclamping operation of the tool is carried out by changing over the change-over valve 181 actuated by a motion of solenoids SOL13 or SOL14 which is controlled in its motion by an electrical signal, a confirmation of the above-mentioned operation is carried out by means of a pressure switch PS12 connected to a supply conduit of the hydraulic actuator 177.

MEANS FOR CONTROLLING AUTOMATIC TOOL INTERCHANGE OPERATION

The automatic tool interchange operation according to the present invention comprises the following three main operations, that is, an indexing operation of the tool magazine 22, turning and reciprocal motion of the tool transfer means 16, and a swing motion of the intermediate transfer means 17. These operations are controlled in their related conditions. A tool taken from the tool magazine 22 is transferred to a second tool change position for transferring from the intermediate transfer means 17 to the transfer arm 132. The transferred tool is gripped by the fingers of the transfer means at one end thereof and the tool inserted in the spindle is gripped by the fingers of the transfer arm at the other end thereof, and thereafter the interchange of the tools is carried out. A hydraulic motor 26 and electric control circuit for controlling the indexing of the magazine are shown in FIGS. 33 and 38, respectively. Further, a hydraulic actuator of the intermediate transfer arm 17 is shown as a hydraulic chamber 108 in FIG. 33, and its electric control circuit is shown in FIG. 39. Means for operating the swing motion of the transfer arms 132a and 132b is shown as a rotary actuator 131 in FIG. 33, and means for operating the reciprocal motion is shown as a hydraulic actuator 126 and its electrical control circuit is shown in FIG. 40. Functions of these means are hereinafter illustrated as follows.

1. Tool magazine control circuit

The tool magazine 22 is rotated by two pitches toward normal direction at the time of taking the tool therefrom and rotated by one pitch toward an inverse direction at the time of restoring the tool thereto so that the tool are taken in accordance with a predetermined order in sequence and the used tools are restored to the respective previous position in the tool magazine 22. The above-mentioned two pitch rotation toward the normal direction and one pitch rotation toward the inverse direction of the tool magazine 22 are discriminated by means of utilizing a limit switch LS43 which is actuated by a pushing action of the rotary dog 84 driven by the worm 70 driven by the hydraulic motor 26, and by means of utilizing the counter circuit 85 arranged at a position represented by E136 to E141 in FIG. 38, thereby, the engaging time of the knock pin 82 is provided in accordance with carrying out the above-mentioned normal and inverse rotations.

The positioning operation of the tool magazine 22 is hereinafter illustrated as follows: when the tool interchange operation is directed by the tape information, the command contacts MO6, arranged at positions represented by E126, E132 and E135, are closed. As one of the limit switch contacts CRLS23-1 or CRLS22-1 arranged at the respective positions E126 or E127 are closed at an advanced end position or an original position of the intermediate transfer means 17, a relay CR421 is energized and a relay contact CR421-5 arranged at a position represented by E209 is closed so that a solenoid SOL43 is energized. The change-over valve 83 is changed over toward a left side in FIG. 33, liquid is supplied to a left side chamber of the hydraulic actuator 81 so that the piston of the hydraulic actuator 81 is displaced toward a right side, the knock pin 82 is released from the engagement with the reference hole 80, and a limit switch LS42 is pushed so that the releasing of the knock pin 82 is confirmed. A relay contact CR421-3 arranged at a position represented by E132 is simultaneously closed, a contact CRLS23-3 associated with the limit switch LS23 is closed at an advanced-end of the intermediate transfer means 17, consequently, a relay CR430 is energized and contacts CRLS42-3 and CR430-3 arranged at a position represented by E133 is closed so as to continue the energization of the relay CR430 and to energize, a solenoid SOL45 arranged at a position represented by E211, The change-over valve 74 is changed over toward right so that the liquid is supplied to the hydraulic motor 26, the magazine 22 is turned toward a normal direction by way of the worm 70 and the worm wheel 69. Consequently, the rotary dog 84 pushes the limit switch LS43 in accordance with the rotation of the worm 70. An electric voltage is applied to the counter circuit by way of a contact CRLS42-1 which is closed at the time when the knock pin 82 is retraced from the reference hole 80 so that a counting operation is commenced. The rotary dog 84 is formed in a shape of an arcuate dog 84 so as to push the limit switch LS43 in a predetermined range of a turning angle. Therefore, after turning of the arcuate dog 84 by the predetermined range of the turning angle, a normally closed contact CRLS43-1 associated with the limit switch LS43 arranged at a position represented by E136 is closed, thereby, a relay CR41 is energized and self-held in its condition so that a turning of the magazine 22 by one-half pitch is memorized. When a contact CRLS43-2 arranged at a position represented by E138 is closed in accordance with one round turning of the arcuate dog 84, a relay CR42 is energized and in a self-held condition thereof, by way of a relay contact CR41-2 which is already closed, thereby, a command signal for one pitch turning is generated. Since a relay contact CR42-1 is connected to a relay contact CR431-2 (position E130) of a relay coil CR431 (position E134), which is energized at the time of inverse turning of the magazine 22, in series and further connected to the relay coil CR423 for actuating the knocking operation of the knock pin 82, when the magazine 22 is turned toward an inverse direction, a command signal for actuating the knocking operation is generated by one pitch rotation of the magazine 22. But when the magazine 22 is turned in its normal direction, the relay coil CR423 is not energized by means of the open contact CR431-2 (position E130) so that its normal turning operation is continued. When the limit switch LS43 is released from the contact with the dog 84 after normal turning of the magazine by 1½ pitch thereof, a relay coil CR43 is energized through a relay contact CR42-3 already closed by the relay coil CR42 and a normally closed contact CRLS43-3 associated with the limit switch LS43, whereby 1½ pitch turning of the magazine or 1½ round rotation of the dog 84 is memorized. CRLS43-4 arranged at a position represented by E141 is closed by two round rotation of the dog 84, a relay CR44 is energized by way of the relay contact CR43-4, thereby, a relay contact CR44-1 arranged at a position represented by E129 is closed so that the relay CR423 for actuating the knock-in operation is energized. By means of opening the normally closed contact CR423-1 arranged at a position represented by E126, the relay CR421 is disenergized and the contact CR421-5 arranged at a position represented by E209 is opened so that a solenoid SOL43 is disenergized. A contact CR423-5 arranged at a position represented by E210 is closed so that a solenoid SOL44 is energized. The change-over valve 83 is changed over to right side in FIG. 33 so that the liquid is supplied to the right side chamber of the hydraulic actuator 81 so as to engage the knock pin 82 with the reference hole 80, thereby, the magazine 22 is locked by two pitch indexing operation. Further, a time for actuating the hydraulic actuator 81 for the knock pin 82 is so designed, that the time energizing the knock pin 82 is just before the pin 82 faces the reference hole 80. By the above-mentioned knock-in operation, the connection of the electric circuit of the limit switch LS42 is opened so that the limit switch contact CRLS42-3 arranged at a position represented by E133 is opened, and the relay CR430 is disenergized.

The self holding of the relay CR423 is released when a limit switch contact CRLS40-2 arranged at a position represented by E131 is opened when the limit switch LS40 is operated by the pawl releasing device 96. Then, the intermediate transfer means 17 is retraced to its retracing-end position so that the limit switch CRLS22-4 is pushed, thereby, contacts CRLS22-1 and LS22-4 arranged at the respective positions represented by E127 and E135 are closed so that the relay CR421 is energized and the knockout operation of the knock pin 82 is carried out and the relay contact CR421-4 arranged at a position represented by E135 is closed so that a relay CR431 is energized and a solenoid SOL46 arranged at a position represented by E212 is energized. Consequently, the change-over valve 74 is changed over toward left side in FIG. 33, so that the magazine 22 is turned in an inverse direction. During the above-mentioned inverse turning of the magazine 22, a relay contact CR431-2 arranged at a position represented by E130 is closed, therefore, the counter circuit 85 is actuated so that a relay contact CR42-1 is closed after confirming one round rotation of the dog 84, and the relay CR423 is energized so as to effect the knock-in operation. Consequently, the turning of the magazine 22 is stopped after one pitch indexing toward the inverse direction. The pawls of the selected tool clamping device on the magazine 22 are opened by the pawl releasing device 96 in a related condition with the above-mentioned indexing operation. A hydraulic actuator of the pawl releasing device 96 comprises the hydraulic actuator 95 and the change-over valve 99 shown in FIG. 33 and the operation of the pawls of the tool clamping device on the magazine 22 is controlled by an electric signal applied to a solenoid SOL41 or a solenoid SOL42.

2. Control circuit of the intermediate transfer means

The turning motion of the intermediate transfer means 17 is carried out by means of a turning mechanism comprising the hydraulic chamber 108 and a rack and pinion so that the tool is transferred between the first tool change position $X_1$ and the second tool change position $X_2$. The operation of the intermediate transfer means 17 is hereinafter illustrated. Referring to FIG. 39, a command contact MO6 is closed for starting the interchanging operation of the tool by a signal from the information tape. A limit switch contact CRLS30-1 arranged at a position represented by E142 is closed at a horizontal position of the tool transfer arm 132 (this position is referred hereinafter to as an original position), a contact CRPS21-1 associated with the pressure switch 21 is closed when the clamp fingers 111a and 111b of the intermediate transfer means 17 clamp the tool, then the relay CR221 is energized and self-held so that a solenoid SOL23 arranged at a position represented by E213 is energized. Consequently, the change-over valve 109 is changed over toward right side in FIG. 33, the liquid is supplied to the right side chamber of the cylindrical chamber so that the piston 107 is displaced toward a left side direction. Therefore, the pinion 103 is rotated in accordance with the displacement of the rack, thereby, the intermediate transfer means 17 is turned in a forward direction. When the intermediate transfer means 17 arrives at the first tool change position $X_1$, the limit switch LS23 is pushed thereby, so that the transfer means 17 is stopped. During the above-mentioned operation, a relay CR221 and the solenoid SOL23 are maintained in their energized condition. Thereafter, normal turning motion of the magazine 22 are carried out and then a limit switch LS40 is pushed by the pawl releasing device 96 at pawl releasing operation, whereby a contact CRLS40-2 arranged at a position represented by E114 is closed. When the pressure switch PS21 confirms the pressure rise in the actuator 117, i.e., the fact that the clamp fingers 111a and 111b clamp the tool holder to thereby close the associated contact CRPS21-2, the relay CR220 (position E144) is energized. Self holding of a relay CR221 for advance movement of the intermediate transfer means is released and thus a solenoid SOL24 is energized simultaneously with disenergizing of the solenoid SOL23. The change-over valve 109 is changed over toward left in FIG. 33, so that the pressurized liquid is supplied to a left side chamber of the cylindrical chamber 108, thereby, the piston is displaced to a right side so that the intermediate transfer means 17 is turned toward a retraced direction. When the transfer means 17 arrives at a retracing end, that is, the second tool change position $X_2$, the limit switch LS22 is pushed so that a normally close contact CRLS22-2 arranged at a position represented by E145 is opened and the self-holding of the relay CR220 is released, thereby, the solenoid SOL24 is disenergized. The clamping operation of the clamping fingers 111a and 111b is controlled in a related condition with the turning and transfer motion of the intermediate transfer means 17 and the magazine 22. A hydraulic actuator 117 for the clamping pawl 111a and 111b is shown in FIG. 33, and the above-mentioned clamping operation is controlled by an electric signal applied to solenoids SOL21 and SOL22 of the change-over valve 121.

3. Control circuit of the tool transfer arm

Motion of the transfer arms 132a and 132b comprises a turning motion of 90° from its original or horizontal position to vertical position, and a turning motion of 180° for interchanging a tool held by the spindle 14, and a tool held by the intermediate transfer arm 16, and a reciprocal motion along a turning shaft of the tool transfer arms 132a and 132b. The above-mentioned turning motion of 90° is carried out by means of a change-over valve 225 which is capable of being changed over by the solenoids SOL33 and SOL34, The turning motion of 180° and the reciprocal motion of the transfer arms 132a and 132b are carried out by means of a change-over valve 226 which is capable of being changed over by solenoids SOL35 and SOL36, a turning motion of 180° of the transfer arms 132a and 132b after the advancing straight motion is carried out by means of a sequence valve 227 while the retracing straight motion after 180° turning is carried out by means of a sequence valve 228 which is actuated by liquid pressure.

Next, the above-mentioned operations of the tool transfer arms 132a and 132b are hereinafter illustrated in detail. First, the command contact MO6 for actuating the tool transfer operation is closed by a command signal from the information tape. The limit switch LS22 is pushed at the original position of the intermediate transfer means 17 so that a contact CRLS22-1 arranged at a position represented by E146 is closed. As a contact CRLS32-1 of the limit switch LS32 is closed at the original position of the transfer arms 132a and 132b, the relay CR321 is energized and the energization thereof is self-held, and thus the solenoid SOL33 arranged at a position represented by E215 is energized. Consequently, the change-over valve 225 is changed over toward right in FIG. 33 so that the pressurized liquid is supplied to the port 157 of the rotary hydraulic actuator 131, thereby, the port 156 is connected to the liquid reservoir T. The rotor member 166 is turned counterclockwise (FIG. 33) together with the shaft 130 connected to the transfer arms 132a and 132b and is stopped when the rotor member 166 contacts a left side surface of the partition member 160 of the hydraulic rotary actuator 131. When the transfer arms 132a and 132b are turned counterclockwise in FIG. 33 by 90°, the limit switch LS31 positioned on the spindle head 13 to confirm the transfer arms arrival to the vertical position is pushed thereby. And a turnable rotor member 163 having a function of an intermediate stopper simultaneously turns in a clockwise direction with the above-mentioned turning of the transfer arm 132 and is stopped when the turnable rotor member 163 contacts with a right-side surface of the partition member 160.

Next, when a contact CRPS12-3 arranged at a position represented by E150 is closed at a time of confirming the releasing of the tool clamping, in the spindle 14, while a contact CRPS21-3 is closed at a time of confirming the releasing motion of clamping pawls 111a and 111b, a relay CR323 is energized so that the solenoid SOL35 is also energized. Thereby the change-over valve 226 is changed over toward left in FIG. 33 so that the liquid is supplied to a left side chamber of the hydraulic actuator 126 and to the right side chamber thereof through a port of the sequence valve 228. As the effective area of the right side of the piston 127 is larger than that of the left side thereof, in other words, the force applied to the right side by pressurized liquid is larger than that of the left side surface, the piston 127 is displaced toward left in FIG. 33. By this displacement of the piston 127, the transfer arms 132a, 132b are displaced to its advanced position, when the transfer arm 132 arrives at its advanced end position, a port 229 made in wall of the hydraulic actuator 126 at an intermediate position thereof is opened and the sequence valve 227 is changed over downwardly so that a port of the valve 227 is changed over downwardly, thereby, the liquid is supplied to the port 155 of the hydraulic rotary actuator 131 by way of a restrictor. When the intermediate transfer means 17 arrives at the second tool change position X₂, the limit switch LS22 is pushed, whereby the associated normally closed contact CRLS22-1 (position E 147) is opened. Consequently, the relay CR321 is disenergized, the solenoid SOL33 is disenergized so that the change-over valve 225 is positioned at its intermediate position, ports 156 and 157 of the rotary hydraulic actuator 131 are connected to the liquid reservoir T. When the rotor member 166 is commenced to turn in a clockwise direction and turned by approximately 90°, the port 157 is covered, however, the liquid in a space between the turnable rotors 166 and 163 is discharged through a conduit (not shown) and the port 157, the rotor 166 turns to its turning end position contacting with the turnable rotor 163 so that the transfer arms 132a and 132b are turned by 180°. When the rotor member 166 comes to its turning end position, the liquid pressure in a conduit 224 is elevated so that the sequence valve 228 is pushed upward so that a port connecting conduits 221 and 223 to each other is closed and the conduit 223 is connected to a feed back conduit 222 connected to the liquid reservoir T. As the liquid in the right side chamber of the hydraulic actuator 126 is discharged to the liquid reservoir T, the piston 127 is retraced by the liquid pressure applied to the left side chamber of the actuator 126, thereby, the transfer arms 132a and 132b are retraced to its original position of the reciprocal motion, the limit switch LS32 is pushed. During the retracing motion of the transfer arms 132a and 132b after its advancing straight motion, a limit switch contact CRLS32-4 arranged at a position represented by E151 is once closed, and a the relay CR324 is energized and the energization thereof is self-held as the relay contact CR323-4 has been closed already thereby, a relay contact CR324-5 arranged at a position represented by E152 is closed. The limit switch LS32 is again pushed in accordance with the retracing motion of the transfer arm 132 to its original position, a contact CRLS32-5 arranged at a position represented by E152 is closed so that a relay CR325 is energized, and the self-holding of the relay CR323 arranged at a position represented by E150 is released, the solenoid SOL36 arranged at a position represented by E218 is energized so that the change-over valve 226 is changed over toward right side in FIG. 33. A limit switch contact CRLS32-2 arranged at a position represented by E148 is simultaneously closed, a normally closed contact CRPS12-2 is closed, when the inserted tool into the spindle 14 is clamped by means of the compression spring 180 and when contact CRPS33-2 is closed at a time of releasing the clamping operation of the clamping fingers of the transfer arm 132, a relay CR320 is energized, to thereby energize a solenoid SOL34, whereby the change-over valve 225 is changed over toward left in FIG. 33 so that the liquid is fed to the port 156 of the hydraulic rotary actuator 131. As the port 155 of the hydraulic rotary actuator 131 is connected to the liquid reservoir T through the conduit 224 and a port of the sequence valve 227, the liquid discharged by the displacement of the rotor member 166 is discharged to the liquid reservoir T. The rotor member 166 and the transfer arm 132 are turned by 90° by means of a pushing operation of the rotatable rotor member 163 and then stopped, so that the transfer arms 132a and 132b are returned to its original position. Thereafter, the retraced displacement of the intermediate transfer means 17 is carried out and when the intermediate means 17 arrives at the first tool change position X₁ and pushes the limit switch LS23, the associated normally closed contact CRLS23-2 arranged at a position represented by E149 is opened so that the self-holding of the relay CR320 is released and the change-over valve 225 is returned to its intermediate position. The clamping operation of the clamping pawls 139a and 139b of the transfer arms 132a and 132b together with its releasing operation are carried out in a related condition with the above-mentioned turning and reciprocal motion of the transfer arm 132. The hydraulic actuator for the fingers 139a and 139b provided in the tool transfer arm 132a is shown as the hydraulic actuator 136 in FIG. 33, the clamping and releasing operations of the above-mentioned fingers 139a and 139b are controlled by an electrical signal applied to solenoids SOL31 and SOL32 of a change-over valve 271.

AUTOMATIC TOOL INTERCHANGE CYCLE

By the above-mentioned means or mechanisms, when a command signal from the information tape is applied, the command contact MO6 is closed so that the motions for interchanging tools are carried out in the following series of tool interchanging cycles as shown in FIG. 41. Relative motions of the electric elements with respect to the steps shown in FIG. 41 are illustrated in Table 1.

TABLE 1

| Step in FIG. 4 | | Motion of electric elements | Motion |
|---|---|---|---|
| 1 | A₁ | MO6+ SOL16+, SOL18+ | restoring ram |
| 2 | A₂ | LS15+ SOL32−, SOL31+ | releasing Q_f |
| 3 | A₃ | PS33+, LS11+ SOL33+ | 90° normal turning of Q |
| 4 | A₄ | LS31+ SOL13+ | releasing the clamping of a tool by spindle |
| 5 | A₅ | PS12+ SOL32+, SOL31− | clamping motion of Q_f |
| 6 | A₆ | PS33− SOL21+, SOL22− | releasing clamping motion of S_f |
| 7 | A₇ | PS21+ SOL33− | intermediate position of Q |
| 8 | A₈₁ | SOL35+, SOL36− | (No.1) Advance straight movement of Q |
|  | A₈₂ |  | (No.2) 180° turning of Q |
|  | A₈₃ |  | (No.3) Straight return movement of Q |
| 9 | A₉ | LS32+ SOL36+, SOL22+, SOL35−, SOL21−. | clamping motion S_f |
| 10 | A₁₀ | PS20+ SOL32−, SOL31+ | releasing clamping motion of Q_f |
| 11 | A₁₁ | PS33+ SOL14+, SOL13− | tool clamping motion of spindle |
| 12 | A₁₂ | PS12− SOL34+ | 90° inverse turning of Q |

| | | | |
|---|---|---|---|
| 13 | A13 | LS30+<br>SOL31−, SOL32+ | clamping motion of Q_f |
| 14 | A_141<br>A_142 | PS33−<br>SOL23+, SOL24− | information from |
| 15 | A_15 | LS23+,<br>SOL41+, SOL42− | clamping motion of M_f |
| 16 | A_16 | LS40−<br>SOL21+, SOL22− | releasing clamping motion of S_f |
| 17 | A_17 | PS21+<br>SOL43+, SOL44− | knocking out of M |
| 18 | A_18 | LS42+<br>SOL45+, | normal turning of M |
| 19 | A_19 | LS43+<br>SOL44+, SOL43− | knock-in of M |
| 20 | A_20 | LS42−<br>SOL22+, SOL21− | clamping motion of S_f |
| 21 | A_21 | PS20+<br>SOL42+, SOL41− | releasing clamping motion of M_f |
| 22 | A_22 | LS40+<br>SOL24+, SOL23− | inverse turning of S |
| 23 | A_23 | LS22+<br>SOL41+, SOL42− | clamping motion of M_f |
| 24 | A_24 | LS40−<br>SOL43+, SOL44− | knocking out of M |
| 25 | A_25 | LS42+<br>SOL46+ | inverse turning of M |
| 26 | A_26 | LS43+<br>SOL44+, SOL43− | knock-in of M |
| 27 | A_27 | LS42−<br>SOL42+, SOL41− | releasing clamping motion of M_f |

Wherein, Q represents tool transfer arm; $Q_f$, Holding fingers of the tool transfer arm; S, intermediate transfer means; $S_4$, figers of the intermediate transfer means; M, tool magazine; $M_f$, pawl of the tool magazine. + represents an energized condition; −, dienergized condition.

1. By a command signal for actuating the tool interchange operation, the electric connection of the spindle drive motor M1 with the electric source is opened so that the brake BM1 is disenergized and the spindle 14 is stopped. The retracing motion of the ram 168 to its original position is simultaneously carried out by means of energizing the solenoids SOL16 and SOL18.
2. At the original position of the ram, the limit switch LS15 is pushed so that the solenoid SOL12 is energized, thereby, the indexing operation of the spindle 14 is carried out and the limit switch LS11 is pushed at the advanced end position the index pin 193. The solenoid 31 is simultaneously energized so that the pawls of the transfer arms 132a and 132b are subjected to relax.
3. At the position for confirming the above-mentioned relaxing operation of the pawls of the transfer arms, the pressure switch PS33 is switched on so that a solenoid SOL33 is energized, thereby, the rotary actuator 131 is actuated so that the transfer arms are turned counterclockwise (in FIG. 33) by 90° from its original position.
4. When both clamping members of the transfer arm 132 arrive at the positions corresponding to the second tool change position $X_2$ and the spindle 14, a limit switch LS31 is pushed so that the solenoid SOL13 is energized. Thereby, liquid is fed to the hydraulic cylinder 177 for unclamping the tool.
5. When the tool is unclamped by the hydraulic actuator 177, the pressure switch PS12 is switched on so that the solenoid SOL32 is energized. Thereby, the liquid in the hydraulic actuator 136 is discharged to the liquid reservoir T so that the fingers 139a and 139b of the transfer arm 132 clamp the tool by means of the force of the spring 141.
6. When the fingers 139a and 139b clamp the tool perfectly, a pressure switch PS33 is switched off and the solenoid SOL21 is energized so that the clamping fingers 111a and 111b of the intermediate transfer means 17 are released from their clamping operation. Therefore, the tool is transferred from the intermediate transfer means 17 to the transfer means 16.
7. When the clamping by the clamping fingers 111a and 111b is released perfectly, the pressure switch PS21 is switched on and the solenoid SOL12 is disenergized so that the inverse indexing operation of the index pin 193 is carried out. Thereby, the index pin 193 is retraced to its original position resulting in pushing the limit switch LS10. Further, the solenoid SOL33 is also disenergized so that the change-over valve 225 is retracted to its intermediate position.
8. When the solenoid SOL33 is disenergized, the solenoid SOL35 is energized so that the advance straight motion of the transfer arms 132a and 132b is carried out. The sequence valve 227 is changed over at the end of the above-mentioned advance motion so that the rotary actuator 131 is actuated and the transfer arm 132 is turned in a clockwise direction (in FIG. 33) by 180°. When the transfer arm 132 comes to the end of the clockwise turning motion, the sequence valve 228 is changed over and the straight retracing motion of the transfer arm 132 is carried out. During the above-mentioned motion, the tools positioned at the second tool change position and held by the spindle 14 are taken and interchanged with each other so that the tool interchanging operation is simultaneously carried out.
9. When the limit switch LS32 (see FIG. 17) is pushed, the solenoid SOL22 is energized so that the clamp fingers 111a and 111b are actuated to clamp the tool.
10. When the clamp fingers 111a and 111b clamp the tool perfectly, the pressure switch PS20 is switched on so that the solenoid SOL32 is energized and the clamping by the fingers 139a and 139b of the tool transfer means 16 is released. By the above-mentioned motion, the tool taken from the spindle 14 is transferred from the transfer means 16 to the intermediate transfer means 17.
11. When the clamping of the tool by the fingers 139a and 139b is released perfectly, the pressure switch PS33 is switched on so that the solenoid SOL14 is energized, thereby, the tool inserted into the spindle 14 is clamped.
12. When the tool is clamped by the compression spring 180 in the spindle 14, a pressure switch PS12 is switched off, so that the solenoid SOL34 is energized, thereby, the change-over valve 225 is changed over toward a left in FIG. 33 so that the liquid is fed to the rotary actuator 131, thereby, the transfer arm 132 is turned counterclockwise (in FIG. 33) by 90° from the end of the clockwise turning motion so as to retrace to the original position (horizontal position) thereof.

13. By the above-mentioned retracing motion, a limit switch LS30 is pushed so that the solenoid SOL32 is energized and the pressurized liquid in the hydraulic actuator 136 is discharged. The clamping operation by the fingers 139a and 139b is carried out, however, the transfer means 16 is positioned at the original position thereof, consequently, this clamping operation is not effective.

14. When the above-mentioned clamping operation is completed, the pressure switch PS33 is switched off and the solenoid SOL23 is energized so that the cylindrical chamber 108 is actuated.

Therefore, the intermediate transfer means 17 is turned from the second tool change position $X_2$ to the first tool change position $X_1$ by means of the engagement of the rack 106 with the pinion so that the tool taken from the spindle 14 is transferred to the tool magazine 22. At this time, the spindle head 13 is moved to perform the machining operation by a command signal from the information tape.

15. At the terminal of the turning motion of the intermediate transfer means 17, the limit switch LS23 is pushed, the solenoid SOL34 is disenergized so that the change-over valve 225 for controlling pressurized liquid supplied to the rotary hydraulic actuator 131 is returned to its intermediate position. At this time, the solenoid SOL41 is energized so that the clamping motion of the clamp device 66 provided on the magazine 22 is carried out.

16. When the clamping device 66 clamps the tool perfectly, the limit switch LS40 is switched off so that the solenoid SOL21 is energized. Thereby, the clamping fingers 111a and 111b are opened, therefore, these fingers do not interfere with the tool even though the tool magazine 22 is turned.

17. When the clamp fingers 111a and 111b are fully opened, the pressure switch PS21 is switched on so that the solenoid SOL43 is energized and the knock pin 82 is disengaged with the reference hole 80 on the indexing plate 75.

18. When the knock pin 82 is disengaged with the reference hole 80 perfectly, the limit switch LS42 is switched on so that the solenoid SOL45 is energized, thereby, the tool magazine 22 is turned toward a normal direction. Relative to the above-mentioned position for taking back the tool, a tool for utilizing the successive machining operation is held at a position being successive to the next position, therefore, the magazine 22 is subjected to turn toward the normal direction by two pitch. To carry out the above-mentioned operation, the time for engaging the knock pin 82 with the reference hole 80 is controlled by a limit switch LS43 and the counter circuit 85.

19. When a limit switch LS43 is pushed twice, the solenoid SOL44 is energized, so that the knock pin 82 is inserted into the reference hole 80 resulting in the stopping of the tool magazine 22 at the desired position.

20. By means of engaging the knock pin 82 with the reference hole 80, the limit switch LS42 is switched off so that the solenoid SOL22 is energized, thereby, the clamping fingers 111a and 111b of the intermediate transfer means 17 are closed.

21. When the clamping operation of the fingers 111a and 111b is completed by means of switching-on of the pressure switch PS20, the solenoid SOL42 is energized and the clamp device 66 on the tool magazine 22 is turned to its releasing position. Thereby, a tool used in the successive machining operation is transferred to the intermediate transfer means 17.

22. When the turnable pawl 86 of the clamp device 66 is turned to its releasing position completely, the limit switch LS40 is pushed, and consequently the solenoid SOL24 is energized, therefore, the intermediate transfer means 17 is turned to the second tool change position $X_2$ so that the tool used in the successive machining operation is transferred to the second tool change position $X_2$.

23. When the tool used in the successive machining operation is transferred to the second position $X_2$, the limit switch LS22 is pushed so that the solenoid SOL41 is energized so as to release the engagement between the turnable pawl 86 and the press roller 98 of the pawl releasing device 96 and leave the spring 88 to close the turnable pawl 86 (see FIG. 9).

24. After completion of closing of the turnable pawl 86, the limit switch LS40 is switched off so that the solenoid SOL43 is energized, thereby, the engagement of the knock pin 82 with the reference hole 80 is released.

25. Thereafter, the limit switch LS42 is switched on so that the solenoid SOL46 is energized. Thereby, the tool magazine 22 is turned to the inverse direction by one pitch to restore the tool carried from the spindle 14 to the very same position where the carried tool had been stored previously.

26. When the tool magazine 22 is turned in the inverse direction by one pitch, the solenoid SOL44 is energized by the limit switch LS43, the knock pin 82 is inserted into the reference hole 80 to thereby stop the turning of the tool magazine 22.

27. Consequently, the limit switch LS42 is switched off to thereby energize the solenoid 42, so that the clamp device 66 of the magazine 22 is turned to open, and the tool magazine 22 is waiting to receive a tool in the above-mentioned opened condition until the successive interchange of the tool is carried out by the successive command signal for tool interchange operation, thereby, the above-mentioned tool interchanging operations from 1 to 27 are repeated.

As mentioned above, the tool interchange operation according to the present invention is characterized by the normal turning of the tool magazine by two pitch with the inverse turning thereof by one pitch, therefore, tools are held by the clamping means disposed at circumferential portions of the circular tool magazine 22 in a predetermined sequential condition and a tool used for the successive machining operation is positioned at the second tool change position $X_2$. When a machining operation by a preceding tool is completed, the tool positioned at the second tool change position $X_2$ is interchanged by the preceding tool held by the spindle 14, and after the retracing motion of the transfer arm to the original position thereof, the machining operation commences again. Therefore, the idling time of the spindle required to the tool interchange operation can be reduced remarkably. Further, after the used tool or preceding tool is returned to the tool magazine 22 from the second tool change position $X_2$ during the next machining operation, the tool magazine 22 is turned to an inverse direction so as to index the original holding position of the used tool to the first tool change position $X_1$. Therefore, the used tool is returned to the original holding position thereof, so that the holding position of the tools upon the tool magazine is always fixedly maintained. By the above-mentioned characteristic function, it is not required to change the holding positions of the tools upon the tool magazine during the machining operation.

What is claimed is:

1. In a machining apparatus: a spindle head having a rotatably mounted spindle including thereon means for releasably holding a work tool; a rotatable tool magazine removably storing a plurality of work tools having various weights; means mounting said spindle head and said tool magazine for vertical reciprocal movement along respective vertical axes; drive means for vertically reciprocating said spindle head along said vertical axis; balancing means for counterbalancing the combined weight of said tool magazine and spindle head; connecting means interconnecting said balancing means with both said tool magazine and spindle head and coaching with said balancing means for effecting continuously synchronous vertical movement of said spindle head and tool magazine in response to vertical movement of said spindle head by said drive means, said connecting means comprising a pin having a longitudinal axis, a bracket pivotal about said longitudinal axis of said pin, a first flexible member interconnecting said tool magazine with said bracket at a portion thereof disposed on one side of said vertical plane passing through said longitudinal axis, a second flexible member interconnecting said spindle head with said bracket at a portion thereof disposed on the other side of said vertical plane and said balancing means comprising force applying means connected to said pin for applying a predetermined force to said pin counterbalancing the combined weight of said tool magazine and spindle head whereby said bracket undergoes pivotal movement about said pin as a function of the particular weight of said tool magazine relative to the weight of said spindle head; and tool transfer means operable when said tool magazine and spindle head are at any position along their respective vertical axes for transferring a work tool from said tool magazine to said spindle head and for transferring a work tool from said spindle head to said tool magazine.

2. In a machining apparatus according to claim 1: wherein said force applying means comprises a dead weight suspended from said pin.

3. In a machining apparatus according to claim 1: wherein said force applying means comprises a cylinder, a piston slidably mounted in said cylinder and having a piston rod connected to said pin, and fluid supply means for supplying fluid at a predetermined pressure to said cylinder to bias said piston in one direction with a force equal to said predetermined force.

4. In a machining apparatus according to claim 3: including means mounting said cylinder for pivotal movement to facilitate the synchronous movement of said tool magazine and spindle head.

5. A numerically controlled machine tool comprising: a base; a first table slidably mounted on said base for sliding motion along a first axis; a first feed motor connected to said first table operable to slidably feed same along said first axis; a second table slidably mounted on said first table for sliding motion along a second axis extending crosswise to said first axis; a second feed motor connected to said second table operable to slidably feed same along said second axis; a spindle head; means mounting said spindle head for sliding movement along a third axis perpendicular to both said first and second axes; a third feed motor connected to said spindle head operable to slide same along said third axis; a spindle rotatably supported by said spindle head and having means thereon for interchangeably holding diverse tools to be used for performing respective machining operations; a tool magazine having a plurality of tool clamping means thereon for removably storing a plurality of diverse tools in a predetermined array; means mounting said tool magazine for both sliding movement along a fourth axis extending parallel to said third axis and rotational movement to individually position each of the diverse tools in a first tool change position; intermediate tool transfer means for transferring a desired tool from its first tool change position on said tool magazine to a second tool change position adjacent said spindle and for transferring a used tool carried by said spindle from said second tool change position to said first tool change position; tool magazine indexing means coacting with said tool magazine for indexing the desired tool to said first tool change position; tool transfer means for interchanging the used tool held by said spindle with the desired tool held by said intermediate tool transfer means when same has transferred the desired tool to said second tool change position; balancing means for synchronizing the movement of said tool magazine along said fourth axis with the movement of said spindle head along said third axis comprising a pin, a bracket pivotally connected to said pin, a first flexible member interconnecting said spindle head with said bracket, a second flexible member interconnecting said tool magazine with said bracket, and wherein the connected positions of said tool magazine and said spindle head define balanced positions with respect to moments taken about said pin; and control means for controlling the tool change operation between said tool magazine and said spindle and the motions of said three feed motors according to a predetermined program.

6. A numerically controlled machine tool according to claim 5, wherein said plurality of tools are arranged in said predetermined array in their sequence of utilization for performing machining operations; and wherein said tool magazine indexing means comprises a drive motor for rotating said tool magazine, an indexing plate connected to and rotationally driven by said drive motor, a plunger engageable with said indexing plate for substantially restricting rotational movement of said indexing plate, detecting means for detecting the angular displacement of said drive motor and providing corresponding output signals, and a counter circuit for generating control signals in response to output signals from said detecting means when said tool magazine angularly displaces by two pitch angular distance between two adjacent tool clamping means in one direction and when said tool magazine angularly displaces by one pitch in a reverse direction, whereby said plunger is actuated in response to said control signals to engage with said indexing plate for controlling said drive motor to stop the angular displacement of said tool magazine.

7. A numerically controlled machine tool according to claim 5, wherein said tool magazine comprises: a rotatable shaft connected to said tool magazine indexing means; a magazine disc secured to said shaft; and wherein said plurality of tool clamping means comprise a plurality of tool clamp devices mounted on a peripheral portion of said magazine disc with equiangular distance between one another, each of said tool clamp devices comprising a stationary pawl secured to said magazine disc, a pivotal pawl pivotably mounted on said magazine disc cooperative with said stationary pawl to hold a tool therebetween, and resilient means for urging said pivotal pawl towards said stationary pawl to clamp a tool therebetween, and clamp releasing means engageable with said pivotal pawl for releasing a tool from said tool clamp device.

8. A numerically controlled machine tool according to claim 7, wherein said pivotal pawl has a clamp portion at one end thereof and an L-shaped portion engageable with said resilient means at one surface thereof to be urged to clamp a tool and engageable with said clamp releasing means at the opposite surface thereof to release a tool positioned at said first tool change position.

9. A numerically controlled machine tool according to claim 5, wherein said tool magazine comprises a magazine slide mounted for slidable movement, a magazine frame pivotably connected to said magazine slide and latch means for effecting releasable latching engagement between said magazine frame and magazine slide, a shaft turnably supported by said magazine frame, and a magazine disc secured to said shaft, whereby said magazine frame may be angularly displaced a predetermined extent when said latch means is operated to release said latching engagement.

10. A numerically controlled machine tool according to claim 5, wherein said intermediate tool transfer means comprises drive means mounted on said spindle head; and an intermediate transfer arm connected to said drive means at one end thereof, said intermediate transfer arm being provided at the other end thereof with a pair of clamp fingers for clamping said tool in its shank portion and arranged in the longitudinal direction of said tool for engaging with said shank portion and a finger operating means for alternatively opening and closing said clamp fingers, said pair of fingers being opened by said finger operating means in a radial direction with respect to a circular path of said tool transfer means when said intermediate transfer arm arrives at said second tool change position, whereby the opened fingers allow the free rotation of said transfer means loaded with tools.

11. A numerically controlled machine tool according to claim 5, wherein said tool transfer means comprises a hydraulic reciprocating actuator comprising a cylinder secured to said spindle head a piston slidably mounted in said cylinder, means defining a cylindrical bore coaxially formed in said piston, a rotary actuator disposed in said piston, a rotary shaft rotatably and coaxially disposed in said cylindrical bore and connected to be rotated by said rotary actuator, a pair of transfer arms symmetrically and rigidly secured to a projected end portion of said rotary shaft, each transfer arm being provided with a tool clamping means comprising a pair of turnable fingers and a hydraulic actuator for alternatively opening and closing said turnable fingers.

12. A numerically controlled machine tool according to claim 11, wherein said rotary hydraulic actuator comprises a partition secured in said cylindrical bore of said piston, a rotor member rotatably mounted in said cylindrical bore and connected to said rotary shaft, and a turnable rotor member disposed between said partition and said rotor member to turn to a restricted extent in said cylindrical bore.

13. A numerically controlled machine tool according to claim 5, further comprising spindle indexing means including stop means for stopping said spindle at a predetermined angular position, and precise indexing means comprising a shaft rotatably disposed in said spindle head and having means therein defining a recess disposed in a predetermined relationship with respect to said spindle, and means including a gear train and an indexing pin which reciprocates to engage and disengage with said recess for connecting said shaft with said spindle, whereby the stopped spindle is precisely indexed when said indexing pin is engaged with said recess.

14. A numerically controlled machine tool according to claim 5, wherein each of said three feed motors comprises a hydraulic pressure motor, a servo-valve for controlling the pressurized liquid supplied to said hydraulic pressure motor, an electric digital motor having a rotary output controlled by an electric digital input signal and connected to said servo-valve, and an electric analog motor rotatable at a higher speed of rotation than said electric digital motor and connected to said servo-valve, whereby said pressurized liquid is controlled in accordance with the rotation of one of said digital and analog electric motors.

15. A numerically controlled machine tool according to claim 5, wherein said balancing means further comprises a hydraulic balancing actuator.

16. A numerically controlled machine tool according to claim 5, wherein said balancing means further comprises a dead weight.

17. A numerically controlled machine tool according to claim 5, wherein each of said three feed motors comprises, driving means, an electric digital motor and an electric analog motor connected with said driving means, and a position coder connected with said driving means to generate coarse pulses in accordance with the rotation thereof; and wherein said control means includes a pulse generator for generating fine pulses to energize said digital motor, and control circuits for controlling said digital and analog motors in accordance with said coarse pulses, whereby said driving means is actuated by said digital motor at a low speed and when a predetermined number of pulses are generated by said position coder, the driving of said driving means is changed by said control circuits from said digital motor to said analog motor to attain a high speed rotation.

18. A numerically controlled machine tool according to claim 5, wherein each of said three feed motors comprises, driving means, an electric digital motor and an electric analog motor connected with said driving means, and a position coder connected with said driving means to generate coarse pulses in accordance with the rotation thereof; and wherein said control means includes a pulse generator for generating fine pulses to energize said digital motor, and control circuits for controlling said digital and analog motors in accordance with said coarse pulses, whereby said driving means is actuated by said analog motor at a high speed and when a predetermined number of coarse pulses are generated by said position coder, the driving of said driving means is changed by said control circuits from said analog motor to said digital motor to attain a low speed rotation.

19. A numerically controlled machine tool according to claim 18, wherein said control means is further provided with means for generating numerical information having higher digits and lower digits with respect to each of said feed motors, high digit counters for presetting said higher digits, low digit counters for presetting said lower digits, and means connecting said low digit counters with said fine pulse generators and said high digit counters with said position coder.

20. A numerically controlled machine tool comprising: a base; an upright column mounted on said base and having connected thereto first and second guide means; a spindle head vertically slidably mounted on said first guide means; a spindle rotatably supported by said spindle head and having means thereon for interchangeably holding diverse tools required for machining operations; a tool magazine removably storing a plurality of diverse tools and vertically slidably mounted on said second guide means; means mounting said tool magazine for rotation in a vertical plane for indexing a desired tool to a first tool change position thereon; hydraulic balancing means including a first flexible member connected with said spindle head and a second flexible member connected with said tool magazine for hydraulically developing a force substantially equal to and opposing the total weight of said spindle head and tool magazine to balance the weights thereof and including means for synchronizing the vertical movement of said tool magazine with the vertical movement of said spindle head; intermediate tool transfer means for transferring a tool positioned in said first tool change position to a second tool change position adjacent to said spindle and for transferring a tool in said second tool change position to said first tool change position; tool transfer means for interchanging a tool held by said spindle with a tool held in said second tool change position; and means mounting said intermediate tool transfer means and tool transfer means for rotation in substantially the same plane as said vertical plane; in which a tool is indexed in said tool magazine; whereby said intermediate tool transfer means and said tool transfer means are operable when said tool magazine and spindle are at any position along their respective vertical axes for transferring a tool in such manner that the tool is transferred from said tool magazine to said spindle within the same vertical plane while keeping the tool in the same attitude it had when stored in said tool magazine.

21. A numerically controlled machine tool according to claim 20, wherein said balancing means comprises a pin, a bracket movably connected to said pin and also connected with said tool magazine and spindle head by means of respective ones of said first and second flexible members, and wherein the connected positions of said tool magazine and said spindle head with said bracket are defined by balanced positions with respect to moments taken about said pin.

22. A numerically controlled machine tool comprising: a base; an upright column mounted on said base and having connected thereto first and second guide means; a spindle head vertically slidably mounted on said first guide means on said upright column; a spindle rotatably supported by said spindle head and having means thereon for interchangeably holding diverse tools required for machining operations, said diverse tools each having a tool holder provided with a shank portion and two flange portions; a tool magazine removably storing a plurality of diverse tools and vertically slidably mounted on said second guide means; means mounting said tool magazine for rotation in a vertical plane for indexing a desired tool to a first tool change position thereon; balancing means including flexible members connected with said spindle head and said tool magazine, and hydraulic means for hydraulically developing a force applied to said tool magazine and spindle head for balancing the total weights thereof; connecting means connecting said flexible members with said hydraulic means and coacting therewith for effecting continuously synchronous vertical movement of said tool magazine and spindle head in response to vertical movement of said spindle head; intermediate tool transfer means engageable with a tool shank portion for transferring a desired tool with said shank portion being engaged thereby from said first tool change position to a second tool change position adajcent to said spindle; tool transfer means on said spindle head engageable with the two flange portions of a tool to interchange a used tool held by said spindle with said desired tool held in said second tool change position; and means mounting said intermediate tool transfer means and tool transfer means for rotation in substantially said vertical plane; whereby said desired tool is transferred in substantially the same plane as said vertical movement plane from said tool magazine to said spindle while the tool is maintained in the same attitude it had when stored in said tool magazine.

23. A numerically controlled machine tool according to claim 22, wherein said intermediate tool transfer means comprises drive means mounted on said spindle head, an intermediate transfer arm connected to said drive means at one end thereof, said intermediate transfer arm being provided at the other end thereof with a pair of clamp fingers arranged in the longitudinal direction of said tool holder for engaging with said shank portion, finger operating means for alternatively opening and closing said clamp fingers, and wherein said pair of fingers are opened by said finger operating means in a radial direction with respect to said magazine disc when said intermediate transfer arm arrives at said first tool change position.

24. A numerically controlled machine tool according to claim 22, wherein said tool transfer means includes means for transferring a tool along a circular path; said intermediate tool transfer means comprises drive means mounted on said spindle head, and an intermediate transfer arm connected at one end to said drive means and being provided at the other end with a pair of clamp fingers arranged in the longitudinal direction said tool holder and engageable with said shank portion; finger operating means for alternatively opening and closing said clamp fingers alternatively, whereby said pair of fingers are opened by said finger operating means in a radial direction with respect to said circular path of said tool transfer means when said intermediate transfer arm arrives at said second tool change position.

25. A numerically controlled machine tool comprising: a base; an upright column mounted on said base and having connected thereto first and second guide means; a spindle head vertically slidably mounted on said first guide means; a spindle rotatably supported by said spindle head and having means thereon for interchangeably holding diverse tools required for machining operations; a tool magazine removably storing a plurality of diverse tools and vertically slidably mounted on said second guide means; means mounting said tool magazine for movement to effect indexing of a desired tool to a first tool change position along a first circumference path; balancing means including a first flexible member connected with said spindle head and a second flexible member connected with said tool magazine for synchronizing the vertical movement of said tool magazine with the vertical movement of said spindle head; tool transfer means for interchanging a tool between a second tool change position and said spindle along a second circumference path; and intermediate transfer means for transferring a tool from said first tool change position to said second tool change position along an arc path terminating at said first and second tool change positions, said intermediate transfer means being substantially tangential at said first and said second tool change positions with said first and second circumference paths, respectively.

26. A numerically controlled machine tool according to claim 25, wherein said balancing means comprises hydraulic means for hydraulically developing a force substantially equal to and opposing the total weight of said tool magazine and said spindle head to support the weights thereof, and connecting means connecting said first and second flexible members with said hydraulic means for effecting continuously synchronous vertical movement of said tool magazine and spindle head in response to vertical movement of said spindle head.

27. A numerically controlled machine tool according to claim 26, wherein said connecting means comprises a bracket pivotally connected to said hydraulic means and also connected to said first and second flexible members, and wherein the connected positions of said first and second flexible members are defined by balanced positions with respect to moments taken about the pivotal point of said bracket.

28. A numerically controlled machine tool according to claim 25, wherein said balancing means comprises a suspended weight counterbalancing the total weight of said tool magazine and said spindle head, and connecting means connecting said first and second flexible members with said weight for effecting continuously synchronous vertical movement of said tool magazine and spindle head in response to vertical movement of said spindle head.

29. A numerically controlled machine tool according to claim 25, wherein said intermediate transfer means is provided at one end thereof with a pair of relatively movable clamp fingers, and finger operating means for alternatively opening and closing said clamp fingers in radial directions with respect to said first and second circumference paths when said intermediate transfer means arrives at said first and second tool change positions respectively.

30. In a machining apparatus having a spindle head including a rotatably mounted spindle having means for releasably holding a tool: a rotatable tool magazine removably storing a plurality of tools; means mounting said spindle head and tool magazine for vertical reciprocal movement along respective vertical axes; drive means for vertically reciprocating said spindle head along said vertical axis; first and second flexible members respectively connected to said spindle head and tool magazine; hydraulic force applying means for applying a force to said tool magazine and spindle head effective to support the total weight of said tool magazine and spindle head, said hydraulic force applying means including a hydraulic cylinder, a piston slidably mounted in said cylinder, a piston rod, and fluid supply means for supplying pressurized hydraulic fluid to said cylinder to bias said piston in one direction with a force equal to the total weight of said tool magazine and spindle head; connecting means connecting said first and second flexible members to said hydraulic force applying means and cooperative therewith to effect continuously synchronous vertical movement of said tool magazine and spindle head in response to vertical movement of said spindle head by said drive means, said connecting means comprising a pin connected to said piston rod, a bracket pivotally connected to said pin and connected to said spindle head and tool magazine by way of respective ones of said first and second flexible members, and wherein the connected positions of said tool magazine and said spindle head with said bracket are defined by a balanced position with respect to moments taken about said pin; and tool transfer means operable when said tool magazine and spindle head are at any position along their respective vertical axes for transferring a tool from said tool magazine to said spindle and for transferring a tool from said spindle to said tool magazine.

* * * * *